(12) United States Patent
Fukagawa et al.

(10) Patent No.: US 8,017,199 B2
(45) Date of Patent: Sep. 13, 2011

(54) CELLULOSE ACYLATE FILM, PROCESS FOR PRODUCING CELLULOSE ACYLATE FILM, POLARIZING PLATE AND LIQUID CRYSTAL DISPLAY DEVICE

(75) Inventors: Nobutaka Fukagawa, Minami-Ashigara (JP); Osamu Ochida, Minami-Ashigara (JP); Shigeki Uehira, Minami-Ashigara (JP); Tomohiro Ogawa, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1098 days.

(21) Appl. No.: 11/666,972

(22) PCT Filed: Dec. 15, 2005

(86) PCT No.: PCT/JP2005/023443
§ 371 (c)(1),
(2), (4) Date: May 1, 2007

(87) PCT Pub. No.: WO2006/064967
PCT Pub. Date: Jun. 22, 2006

(65) Prior Publication Data
US 2007/0298194 A1     Dec. 27, 2007

(30) Foreign Application Priority Data
Dec. 15, 2004   (JP) .................. 2004-362747

(51) Int. Cl.
*C09K 19/00* (2006.01)
*G02F 1/1335* (2006.01)

(52) U.S. Cl. ......... 428/1.1; 349/117; 349/118; 349/119; 349/120; 349/121

(58) Field of Classification Search ................. None
See application file for complete search history.

(56) References Cited

U.S. PATENT DOCUMENTS

| 6,630,973 B1 * | 10/2003 | Matsuoka et al. | 349/117 |
| 2004/0161551 A1 * | 8/2004 | Tasaka et al. | 428/1.3 |
| 2005/0123693 A1 | 6/2005 | Ito | |
| 2006/0093759 A1 * | 5/2006 | Fukagawa | 428/1.31 |

FOREIGN PATENT DOCUMENTS

| JP | 2001-166144 A | 6/2001 |
| JP | 2002-306643 A | 10/2002 |
| JP | 2002-363343 A | 12/2002 |
| JP | 2003-344655 A | 12/2003 |
| JP | 2004-004550 A | 1/2004 |
| JP | 2004-050516 A | 2/2004 |

(Continued)

OTHER PUBLICATIONS

International Search Report dated Mar. 20, 2006.
Written Opinion of the International Searching Authority dated Mar. 20, 2006.

(Continued)

*Primary Examiner* — David R Sample
*Assistant Examiner* — Nicole T Gugliotta
(74) *Attorney, Agent, or Firm* — Buchanan, Ingersoll & Rooney, PC

(57) ABSTRACT

A cellulose acylate film comprising at least one retardation raising agent having specific rod-like polarizability anisotropy or specific plane polarizability anisotropy, and specific distance between terminals of a molecule in a specific amount; a process for producing the same; and a polarizing plate and liquid crystal display using the same.

10 Claims, 3 Drawing Sheets

FOREIGN PATENT DOCUMENTS

| | | |
|---|---|---|
| JP | 2004-243628 A | 9/2004 |
| JP | 2006-022311 A | 1/2006 |
| JP | 2006-045468 A | 2/2006 |
| JP | 2006-154803 A | 6/2006 |

OTHER PUBLICATIONS

Office Action issued in Japanese Patent Application No. JP 2005-356882, dated Nov. 2, 2010, and English translation thereof.

* cited by examiner

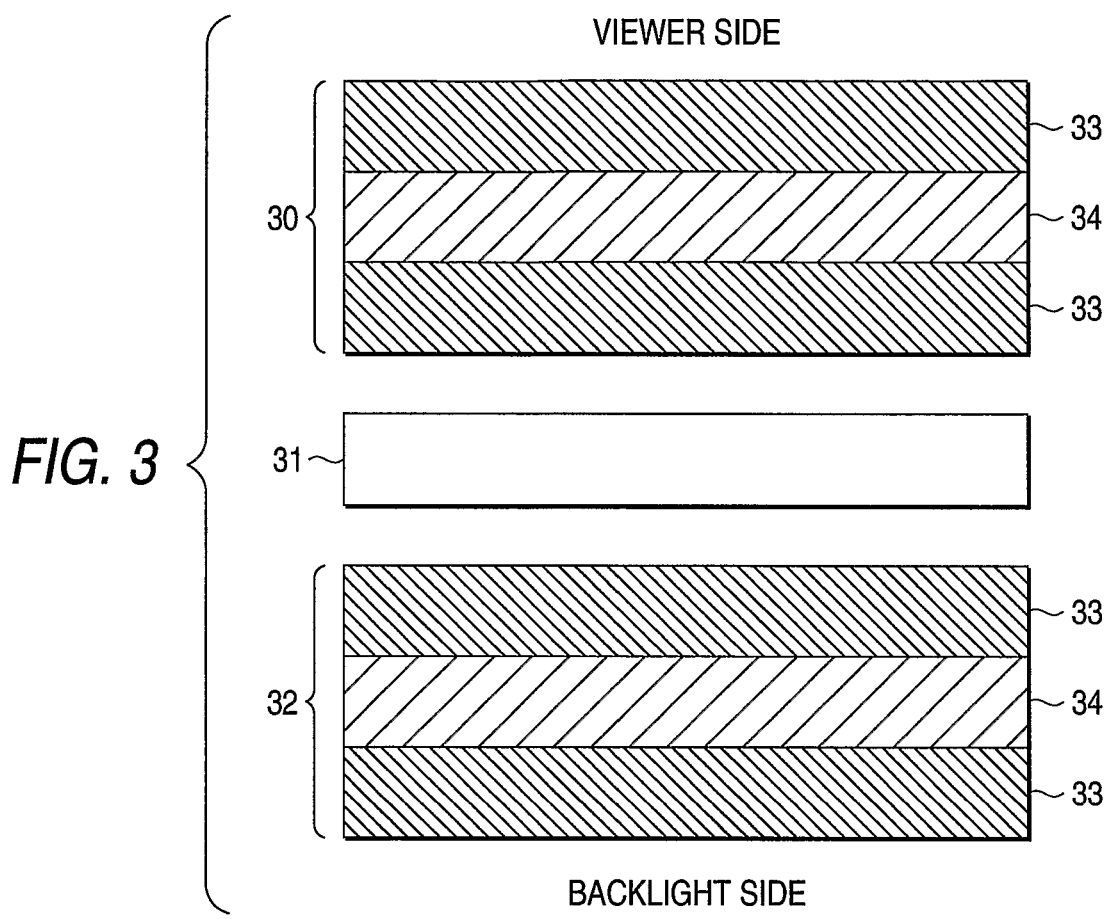

US 8,017,199 B2

CELLULOSE ACYLATE FILM, PROCESS FOR PRODUCING CELLULOSE ACYLATE FILM, POLARIZING PLATE AND LIQUID CRYSTAL DISPLAY DEVICE

TECHNICAL FIELD

The present invention relates to a cellulose acylate film, a process for producing a cellulose acylate film, and a polarizing plate and a display device using the same.

BACKGROUND ART

Liquid crystal displays are widening the usage year by year as image display apparatus requiring low consumption of electric power and a small space. Having large viewing angle dependency of images is a big defect of liquid crystal displays, however, liquid crystal modes such as VA mode and IPS mode having high angle of visibility have been put to practical use in recent years. As a result, the demand for liquid crystal displays is rapidly spreading also on the market requiring high angle of visibility such as televisions.

With such a tendency, optical compensating films for use in liquid crystal displays are required to exhibit a broader range of retardation. A method of making a cellulose acylate film exhibit retardation to thereby impart the cellulose acylate film two functions of the protective film and the retardation film of a polarizing plate at the same time can greatly simplify the producing process of a polarizing plate with an optical compensation function, so that many methods have been investigated.

For imparting retardation to a cellulose acylate film, a method of using cellulose acylate having a low degree of acylation, and a method of the addition of a compound having a specific shape are known. The latter method is especially advantageous in that retardation can be controlled merely by the addition amount of an additive, so that various films different in retardations can be easily produced at will, and a method of using a disc-like compound is disclosed in JP-A-2003-344655 (The term "JP-A" as used herein refers to an "unexamined published Japanese patent application".), and a method of using a rod-like compound is disclosed in JP-A-2002-363343.

DISCLOSURE OF THE INVENTION

However, although a certain effect can be obtained with these methods, a great amount of additive must be used when further higher retardation is required, so that there arises a problem that the exhibition of retardation and the prevention of bleed-out are difficult to be compatible. Further, there is another drawback that in-plane retardation becomes not uniform.

An object of the invention is to provide a cellulose acylate film free from the occurrence of facial failure such as bleed-out and having uniform and high retardation.

Another object of the invention is to provide a cellulose acylate film free from the occurrence of facial failure such as bleed out, having high retardation, and uniform in in-plane retardation.

A further object of the invention is to provide a liquid crystal display having high angle of visibility and high grade display in which a polarizing plate using the cellulose acylate film is used.

The present inventors have found that retardation can be greatly exhibited without causing facial failure such as bleed-out by the addition of a retardation raising agent having polarizability anisotropy and the distance between terminals of a molecule respectively in specific ranges to a cellulose acylate film in an amount of from 0.1 to 30 mass %. (In this specification, mass % and mass parts are equal to weight % and weight parts, respectively.) It has also been found that the degree of orientation of the retardation raising agent conspicuously increases, so that it becomes possible to greatly and uniformly exhibit retardation by stretching the cellulose acylate film containing the retardation raising agent on specific conditions. The present invention has been achieved on the basis of the knowledge.

That is, one aspect of the invention concerns the following cellulose acylate film.

(1) A cellulose acylate film comprising:
 a cellulose acylate; and
 at least one retardation raising agent in an amount of from 0.1 to 30 mass % based on the cellulose acylate,
 wherein the at least one retardation raising agent has a rod-like polarizability anisotropy represented by expression (1) of from $300 \times 10^{-25}$ cm$^3$ to $2,000 \times 10^{-25}$ cm$^3$, and a distance between terminals of a molecule of from 2 to 10 nm:

$$\Delta\alpha = \alpha x - (\alpha y + \alpha z)/2 \qquad \text{Expression (1)}$$

wherein $\alpha x$ is the largest constituent of characteristic values obtained after a polarizability tensor is made diagonal; $\alpha y$ is the constituent next to the largest constituent of characteristic values obtained after a polarizability tensor is made diagonal; and $\alpha z$ is the smallest constituent of characteristic values obtained after a polarizability tensor is made diagonal.

(2) A cellulose acylate film comprising:
 a cellulose acylate; and
 at least one retardation raising agent in an amount of from 0.1 to 30 mass % based on the cellulose acylate,
 wherein the at least one retardation raising agent has a plane polarizability anisotropy represented by expression (2) of from $300 \times 10^{-25}$ cm$^3$ to $1,500 \times 10^{-25}$ cm$^3$, and a distance between terminals of a molecule of from 2 to 10 nm:

$$\Delta\alpha = (\alpha x + \alpha y)/2 - \alpha z \qquad \text{Expression (2)}$$

wherein $\alpha x$ is the largest constituent of characteristic values obtained after a polarizability tensor is made diagonal; $\alpha y$ is the constituent next to the largest constituent of characteristic values obtained after a polarizability tensor is made diagonal; and $\alpha z$ is the smallest constituent of characteristic values obtained after a polarizability tensor is made diagonal.

(3) A cellulose acylate film comprising:
 a cellulose acylate;
 at least one first retardation raising agent in an amount of from 0.1 to 30 mass % based on the cellulose acylate; and
 at least one second retardation raising agent in an amount of from 0.1 to 30 mass % based on the cellulose acylate,
 wherein the at least one first retardation raising agent has a rod-like polarizability anisotropy represented by expression (1) of from $300 \times 10^{-25}$ cm$^3$ to $2,000 \times 10^{-25}$ cm$^3$, and a distance between terminals of a molecule of from 2 to 10 nm; and the at least one second retardation raising agent has a plane polarizability anisotropy represented by expression (2) of from $300 \times 10^{-25}$ cm$^3$ to $1,500 \times 10^{-25}$ cm$^3$, and a distance between terminals of a molecule of from 2 to 10 nm:

$$\Delta\alpha = \alpha x - (\alpha y + \alpha z)/2 \qquad \text{Expression (1)}$$

$$\Delta\alpha = (\alpha x + \alpha y)/2 - \alpha z \qquad \text{Expression (2)}$$

wherein $\alpha x$ is the largest constituent of characteristic values obtained after a polarizability tensor is made diagonal; $\alpha y$ is the constituent next to the largest constituent of characteristic values obtained after a polarizability tensor is made diagonal; and αz is the smallest constituent of characteristic values obtained after a polarizability tensor is made diagonal.

(4) The cellulose acylate film as described in any of (1) to (3) above, which has Re and Rth satisfying following relationships:

$$20 \leq Re \leq 200$$

$$70 \leq Rth \leq 400$$

$$1 \leq Rth/Re \leq 10$$

wherein Re represents an in-plane retardation at a wavelength of 590 nm; and Rth represents a retardation in a thickness direction at a wavelength of 590 nm.

(5) The cellulose acylate film as described in any of (1), (3) and (4) above, wherein the at least one retardation raising agent having a rod-like polarizability anisotropy represented by expression (1) of from $300 \times 10^{-25}$ cm$^3$ to $2,000 \times 10^{-25}$ cm$^3$ and a distance between terminals of a molecule of from 2 to 10 nm is a compound represented by formula (1):

$$Ar^1-L^1-X-L^2-Ar^2 \quad \text{Formula (1)}$$

wherein $Ar^1$ and $Ar^2$ each independently represents an aryl group or an aromatic heterocyclic ring; $L^1$ and $L^2$ each independently represents —C(=O)O— or —C(=O)NR— (where R represents a hydrogen atom or an alkyl group); and X represents formula (2) or (3):

Formula (2):

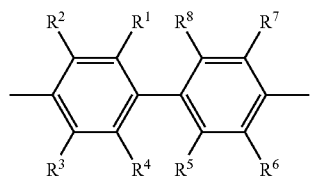

wherein $R^1$, $R^2$, $R^3$, $R^4$, $R^5$, $R^6$, $R^7$ and $R^8$ each independently represents a hydrogen atom or a substituent; and Formula (3):

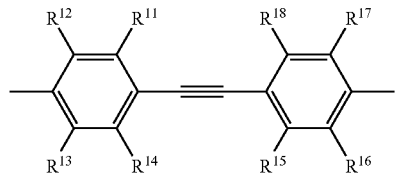

wherein $R^{11}$, $R^{12}$, $R^{13}$, $R^{14}$, $R^{15}$, $R^{16}$, $R^{17}$ and $R^{18}$ each independently represents a hydrogen atom or a substituent.

(6) The cellulose acylate film as described in any of (1), (3) and (4), wherein the at least one retardation raising agent having a rod-like polarizability anisotropy represented by expression (1) of from $300 \times 10^{-25}$ cm$^3$ to $2,000 \times 10^{-25}$ cm$^3$ and a distance between terminals of a molecule of from 2 to 10 nm is a compound represented by formula (4):

Formula (4)

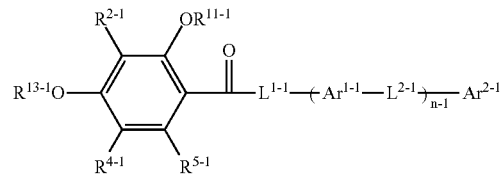

wherein $R^{2-1}$, $R^{4-1}$ and $R^{5-1}$ each independently represents a hydrogen atom or a substituent; $R^{11-1}$ and $R^{13-1}$ each independently represents a hydrogen atom or an alkyl group; $L^{1-1}$ and $L^{2-1}$ each independently represents a single bond or a divalent connecting group; $Ar^{1-1}$ represents an arylene group or an aromatic heterocyclic ring; $Ar^{2-1}$ represents an arylene group or an aromatic heterocyclic ring; n–1 represents an integer of at least 3; and $L^{2-1}$ and $Ar^{1-1}$, both existing in a number of n–1, may be the same or different, provided that $R^{11-1}$ and $R^{13-1}$ are different from each other, and the alkyl group represented by $R^{13-1}$ does not contain a hetero atom.

(7) The cellulose acylate film as described in any of (1), (3) and (4), wherein the at least one retardation raising agent having a rod-like polarizability anisotropy represented by expression (1) of from $300 \times 10^{-25}$ cm$^3$ to $2,000 \times 10^{-25}$ cm$^3$ and a distance between terminals of a molecule of from 2 to 10 nm is a compound represented by formula (5):

Formula (5)

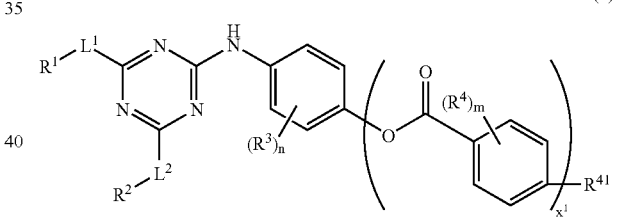

wherein $L^1$ and $L^2$ each independently represents a single bond or a divalent connecting group; $R^1$ and $R^2$ each independently represents a hydrogen atom or a substituent; $R^3$ and $R^4$ each independently represents a substituent; n represents an integer of from 0 to 4, and when n is 2 or more, $R^3$'s may be the same or different, and, if possible, may bond together to form a ring; m represents an integer of from 0 to 4, and when m is 2 or more, the plural $R^3$'s existing in a plural number may be the same or different, and if possible, may bond together to form a ring; $X^1$ represents an integer of from 1 to 5, and when $X^1$ is 2 or more, $(R^4)_m$ existing in a plural number may be the same or different; and $R^{41}$ represents a hydrogen atom or a substituent.

(8) The cellulose acylate film as described in any of (2), (3) and (4) above, wherein the at least one retardation raising agent having a plane polarizability anisotropy represented by expression (2) of from $300 \times 10^{-25}$ cm$^3$ to $1,500 \times 10^{-25}$ cm$^3$ and a distance between terminals of a molecule of from 2 to 10 nm is a compound represented by formula (6):

Formula (6):

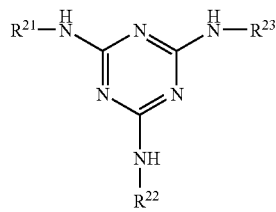

wherein $R^{21}$, $R^{22}$ and $R^{23}$ each independently represents an alkyl group, an alkenyl group, an aromatic ring group or a heterocyclic group.

(9) A process for producing a cellulose acylate film as described in any of (1) to (8) above, the process comprising:
stretching the cellulose acylate film at a stretching rate of 100% or less per a minute at a stretching magnification of from 3 to 200%; and
retaining the stretched cellulose acylate film at a stretching magnification of from 50 to 99% of the maximum stretching magnification for from 1 to 120 seconds.

(10) The cellulose acylate film as described in any of (1) to (8) above, which is produced by a process as described in (9) above.

(11) A polarizing plate comprising:
a polarizer; and
at least two protective films disposed on both sides of the polarizer,
wherein at least one of the at least two protective films is a cellulose acylate film as described in any of (1) to (8) and (10) above.

(12) The polarizing plate as described in (11) above, which further comprises an optically anisotropic layer on at least one side of the at least two protective films.

(13) The polarizing plate as described in (11) above, wherein a retardation film is disposed on at least one side of the at least two protective films.

(14) A liquid crystal display comprising:
a liquid crystal cell; and
two polarizing plates disposed on both sides of the liquid crystal cell,
wherein at least one of the two polarizing plates is a polarizing plate as described in any of (11) to (13) above.

BRIEF DESCRIPTION OF THE DRAWING

FIG. 3 is a typical drawing showing an example of the liquid crystal display of the invention,
wherein 1, 1a, 1b denote Protective films; 2 denotes Polarizer; 3 denotes Functional optical film; 4 denotes Adhesive layer; 5 denotes Polarizing plate; 6 denotes Upper polarizing plate; 7 denotes Upper polarizing plate absorption axis; 8 denotes Upper optically anisotropic layer; 9 denotes Orientation controlling direction of upper optically anisotropic layer; 10 denotes Electrode substrate on liquid crystal cell; 11 denotes Orientation controlling direction of upper substrate; 12 denotes Liquid crystal molecule; 13 denotes Electrode substrate under crystal cell; 14 denotes Orientation controlling direction of lower substrate; 15 denotes Lower optically anisotropic layer; 16 denotes Orientation controlling direction of lower optically anisotropic layer; 17 denotes Lower polarizing plate; 18 denotes Lower polarizing plate absorption axis; 30 denotes Upper side polarizing plate; 31 dentoes VA mode liquid crystal cell; 32 denotes Lower side polarizing plate; 33 denotes Cellulose acylate film; and 34 denotes Polarizer.

BEST MODE FOR CARRYING OUT THE INVENTION

Cellulose Acylate Film

Figure 1A:
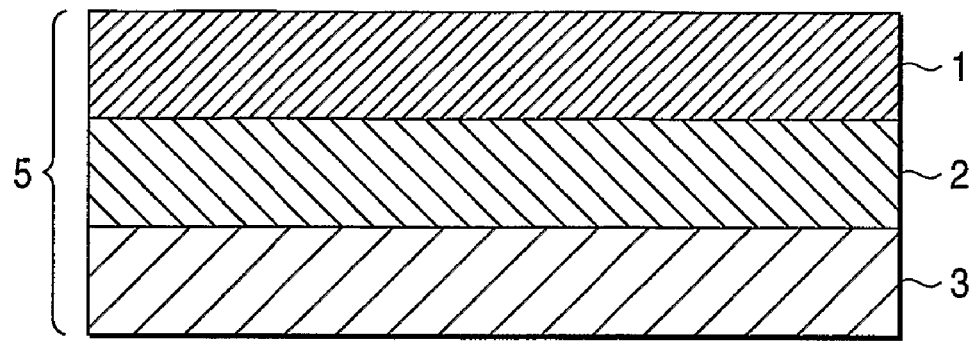
FIGS. 1A and 1B are examples of constructions of composite comprising the polarizing plate of the invention and a functional optical film.

[Retardation Raising Agent]
In the first place, the cellulose acylate for use in the invention is described.
It is necessary that the distance between terminals of a molecule of the retardation raising agent in the invention be from 2 to 10 nm. When the distance between terminals is smaller than the greatest lower bound, the retardation raising agent is difficult to be orientated along the molecular chain of the cellulose acylate, so that the polarizability anisotropy of the retardation raising agent is reflected on the retardation with difficulty. On the other hand, when the distance between terminals of a molecule of the retardation raising agent is too long over the least upper bound, the retardation raising agent is difficultly compatible with the cellulose acylate, as a result a problem, e.g., the occurrence of bleed-out, is liable to arise. The distance between terminals of a molecule of the retardation raising agent is preferably from 2.5 to 8 nm.
The distance between terminals can be found from the optimized molecular structure by the computation using a molecular orbital method or a density functional method.
The retardation raising agent for use in the invention is classified into two main groups. The first group is a type comprising molecules having high rod-like polarizability anisotropy, and the second group is a type comprising molecules having high plane polarizability anisotropy.

[Retardation Raising Agent Comprising Molecules Having High Rod-Like Polarizability Anisotropy]
In the first place, a retardation raising agent comprising molecules having high rod-like polarizability anisotropy is explained in detail.
The polarizability of a molecule can be found by the computation using a molecular orbital method or a density functional method. It is necessary that the rod-like polarizability anisotropy represented by the following expression (1) should be from $300 \times 10^{-25}$ cm$^3$ to $2,000 \times 10^{-25}$ cm$^3$. When the rod-like polarizability anisotropy is smaller than the lower bound, the retardation exhibition of the cellulose acylate is small. On the other hand, when the rod-like polarizability anisotropy is too great over the upper bound, the compatibility of the retardation raising agent with the cellulose acylate is deteriorated, as a result a problem, e.g., the occurrence of bleed-out of the retardation raising agent, is liable to arise. The rod-like polarizability anisotropy of a retardation raising agent is preferably from $350 \times 10^{-25}$ cm$^3$ to $1,500 \times 10^{-25}$ cm$^3$.

$$\Delta\alpha = \alpha x - (\alpha y + \alpha z)/2 \qquad \text{Expression (1)}$$

wherein $\alpha x$ is the largest constituent of the characteristic values obtained after polarizability tensor is made diagonal, $\alpha y$ is the constituent next to the largest constituent of the characteristic values obtained after polarizability tensor is made diagonal (that is, the second largest constituent of the characteristic values obtained after polarizability tensor is made diagonal), and $\alpha z$ is the smallest constituent of the characteristic values obtained after polarizability tensor is made diagonal.

As the retardation raising agent having rod-like polarizability anisotropy of from $300 \times 10^{-25}$ cm$^3$ to $2,000 \times 10^{-25}$ cm$^3$ and the distance between terminals of a molecule of from 2 to 10 nm, a compound represented by the following formula (1) is especially preferred.

The compound represented by the formula (1) will be hereunder described in detail.

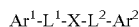
$Ar^1-L^1-X-L^2-Ar^2$    Formula (1)

In the foregoing formula (1), $Ar^1$ and $Ar^2$ each independently represents an aryl group or an aromatic hetero ring; $L^1$ and $L^2$ each independently represents —C(=O)O— or —C(=O)NR—; R represents a hydrogen atom or an alkyl group; and X represents the following formula (2) or (3).

Formula (2):

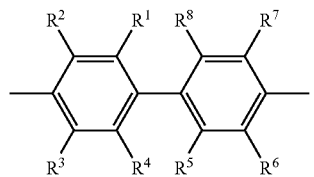

In the foregoing formula (2), $R^1$, $R^2$, $R^3$, $R^4$, $R^5$, $R^6$, $R^7$, and $R^8$ each independently represents a hydrogen atom or a substituent.

Formula (3):

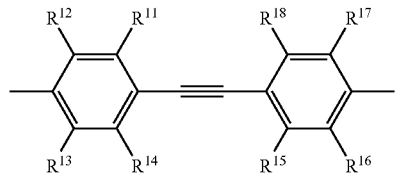

In the foregoing formula (3), $R^{11}$, $R^{12}$, $R^{13}$, $R^{14}$, $R^{15}$, $R^{16}$, $R^{17}$, and $R^{18}$ each independently represents a hydrogen atom or a substituent.

In the formula (1), $Ar^1$ and $Ar^2$ each independently represents an aryl group or an aromatic hetero ring. As the aryl group represented by $Ar^1$ and $Ar^2$, an aryl group having from 6 to 30 carbon atoms is preferable. The aryl may be a monocyclic ring or may be taken together with other ring to form a fused ring. Furthermore, if possible, the aryl group may have a substituent. As the substituent, the substituent T as described later can be applied.

In the formula (1), the aryl group represented by $Ar^1$ and $Ar^2$ is more preferably an aryl group having from 6 to 20 carbon atoms, and especially preferably from 6 to 12 carbon atoms. Examples thereof include a phenyl group, a p-methylphenyl group, and a naphthyl group.

In the formula (1), as the aromatic hetero ring represented by $Ar^1$ and $Ar^2$, any aromatic hetero ring containing at least one of an oxygen atom, a nitrogen atom, and a sulfur atom is employable. The aromatic hetero ring is preferably a 5-membered or 6-membered aromatic hetero ring containing at least one of an oxygen atom, a nitrogen atom, and a sulfur atom. Furthermore, if possible, the aromatic hetero group may have a substituent. As the substituent, the substituent T as described later can be applied.

In the formula (1), specific examples of the aromatic hetero ring represented by $Ar^1$ and $Ar^2$ include a furan ring group, a pyrrole ring group, a thiophene ring group, an imidazole ring group, a pyrazole ring group, a pyridine ring group, a pyrazine ring group, a pyridazine ring group, a triazole ring group, a triazine ring group, an indole ring group, an indazole ring group, a purine ring group, a thiazoline ring group, a thiazole ring group, a thiadiazole ring group, an oxazoline ring group, an oxazole ring group, an oxadiazole ring group, a quinoline ring group, an isoquinoline ring group, a phthalazine ring group, a naphthylidine ring group, a quinoxaline ring group, a quinazoline ring group, a cinnoline ring group, a pteridine ring group, an acridine ring group, a phenanthroline ring group, a phenazine ring group, a tetrazole ring group, a benzimidazole ring group, a benzoxazole ring group, a benzthiazole ring group, a benzotriazole ring group, a tetrazaindene ring group, a pyrrolotriazole ring group, and a pyrazolotriazole ring group. As the aromatic hetero ring, a benzimidazole ring, a benzoxazole ring group, a benzthiazole ring group, and a benzotriazole ring group are preferable.

In the formula (1), $L^1$ and $L^2$ each independently represents —C(=O)O— or —C(=O)NR— (wherein R represents a hydrogen atom or an alkyl group), the both of which are similarly preferable.

Alkyl group represented by R is preferably an alkyl group having from 1 to 6 carbon atoms; more preferably an alkyl group having from 1 to 4 carbon atoms. Further R represents preferably a hydrogen atom or a methyl group; and especially preferably a hydrogen atom.

In the formula (2), $R^1$, $R^2$, $R^3$, $R^4$, $R^5$, $R^6$, $R^7$, and $R^8$ each independently represents a hydrogen atom or a substituent. As the substituent, the substituent T as described later can be applied.

$R^1$, $R^2$, $R^3$, $R^4$, $R^5$, $R^6$, $R^7$, and $R^8$ are each preferably a hydrogen atom, an alkyl group, an amino group, an alkoxy group, a hydroxyl group, or a halogen atom; more preferably a hydrogen atom, an alkyl group having from 1 to 4 carbon atoms, an alkoxy group having from 1 to 4 carbon atoms, a hydroxyl group, or a halogen atom; further preferably a hydrogen atom, a methyl group, a methoxy group, a hydroxyl group, a chlorine atom, or a fluorine atom; especially preferably a hydrogen atom or a fluorine atom; and most preferably a hydrogen atom.

In the formula (3), $R^{11}$, $R^{12}$, $R^{13}$, $R^{14}$, $R^{15}$, $R^{16}$, $R^{17}$, and $R^{18}$ each independently represents a hydrogen atom or a substituent. As the substituent, the substituent T as described later can be applied.

$R^{11}$, $R^{12}$, $R^{13}$, $R^{14}$, $R^{15}$, $R^{16}$, $R^{17}$, and $R^{18}$ are each preferably a hydrogen atom, an alkyl group, an amino group, an alkoxy group, a hydroxyl group, or a halogen atom; more preferably a hydrogen atom, an alkyl group having from 1 to 4 carbon atoms, an alkoxy group having from 1 to 4 carbon atoms, a hydroxyl group, or a halogen atom; further preferably a hydrogen atom, a methyl group, a methoxy group, a hydroxyl group, a chlorine atom, or a fluorine atom; especially preferably a hydrogen atom or a fluorine atom; and most preferably a hydrogen atom.

In the formula (1), the following formula (1-1) is preferable.

Formula (1-1):

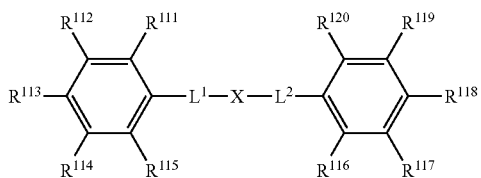

In the foregoing formula (1-1), $R^{111}$, $R^{112}$, $R^{113}$, $R^{114}$, $R^{115}$, $R^{116}$, $R^{117}$, $R^{118}$, $R^{119}$ and $R^{120}$ each independently represents a hydrogen atom or a substituent; and $L^1$, $L^2$, and X are synonymous with those in the formula (1), respectively, and preferred ranges are also the same.

$R^{111}$ and $R^{116}$ each independently represents a hydrogen atom or a substituent. $R^{111}$ and $R^{116}$ are each preferably an alkyl group, an alkoxy group, an amino group, or a hydroxyl group; more preferably an alkyl group having from 1 to 4 carbon atoms or an alkoxy group having from 1 to 12 carbon atoms; further preferably an alkoxy group (preferably having from 1 to 12 carbon atoms, more preferably from 1 to 8 carbon atoms, further preferably from 1 to 6 carbon atoms, and especially preferably from 1 to 4 carbon atoms); and especially preferably a methoxy group.

$R^{112}$ and $R^{117}$ each independently represents a hydrogen atom or a substituent. $R^{112}$ and $R^{117}$ are each preferably a hydrogen atom, an alkyl group, an alkoxy group, an amino group, or a hydroxyl group; more preferably a hydrogen atom, an alkyl group, or an alkoxy group; further preferably a hydrogen atom, an alkyl group (preferably having from 1 to 4 carbon atoms, and more preferably a methyl group), or an alkoxy group (preferably having from 1 to 12 carbon atoms, more preferably from 1 to 8 carbon atoms, further preferably from 1 to 6 carbon atoms, and especially preferably from 1 to 4 carbon atom); and especially preferably a hydrogen atom, a methyl group, or a methoxy group.

$R^{113}$ and $R^{118}$ each independently represents a hydrogen atom or a substituent. $R^{113}$ and $R^{118}$ are each preferably a hydrogen atom, an alkyl group, an alkoxy group, an amino group, or a hydroxyl group; more preferably an alkyl group or an alkoxy group; especially preferably an alkoxy group (preferably having from 1 to 12 carbon atoms, more preferably from 1 to 8 carbon atoms, further preferably from 1 to 6 carbon atoms, and especially preferably from 1 to 4 carbon atoms); and most preferably an n-propoxy group, an ethoxy group, or a methoxy group.

$R^{114}$ and $R^{119}$ each independently represents a hydrogen atom or a substituent. $R^{114}$ and $R^{119}$ are each preferably a hydrogen atom, an alkyl group, an alkoxy group, an amino group, or a hydroxyl group; more preferably a hydrogen atom, an alkyl group having from 1 to 4 carbon atoms, or an alkoxy group having from 1 to 12 carbon atoms (preferably having from 1 to 12 carbon atoms, more preferably from 1 to 8 carbon atoms, further preferably from 1 to 6 carbon atoms, and especially preferably from 1 to 4 carbon atoms); especially preferably a hydrogen atom, an alkyl group having from 1 to 4 carbon atoms, or an alkoxy group having from 1 to 4 carbon atoms; and most preferably a hydrogen atom, a methyl group, or a methoxy group.

$R^{115}$ and $R^{120}$ each independently represents a hydrogen atom or a substituent. $R^{115}$ and $R^{120}$ are each preferably a hydrogen atom, an alkyl group, an alkoxy group, an amino group, or a hydroxyl group; more preferably a hydrogen atom, an alkyl group, or an alkoxy group; further preferably a hydrogen atom, an alkyl group (preferably having from 1 to 4 carbon atoms, and more preferably a methyl group), or an alkoxy group (preferably having from 1 to 12 carbon atoms, more preferably from 1 to 8 carbon atoms, further preferably from 1 to 6 carbon atoms, and especially preferably from 1 to 4 carbon atoms); and especially preferably a hydrogen atom, a methyl group, or a methoxy group.

In the formula (1), the following formula (1-2) is more preferable.

Formula (1-2):

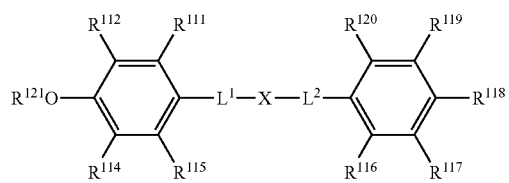

In the foregoing formula (1-2), $R^{111}$, $R^{112}$, $R^{114}$, $R^{115}$, $R^{116}$, $R^{117}$, $R^{118}$, $R^{119}$, $R^{120}$, $L^1$, $L^2$ and X are synonymous with those in the formula (1-1), respectively, and preferred ranges are also the same. $R^{121}$ represents an alkyl group having from 1 to 12 carbon atoms.

In the formula (1-2), $R^{121}$ represents an alkyl group having from 1 to 12 carbon atoms. The alkyl group represented by $R^{121}$ may be linear or branched and may also have a substituent. The alkyl group represents preferably an alkyl group having from 1 to 12 carbon atoms; more preferably an alkyl group having from 1 to 8 carbon atoms; further preferably an alkyl group having from 1 to 6 carbon atoms; and especially preferably an alkyl group having from 1 to 4 carbon atoms (for example, a methyl group, an ethyl group, an n-propyl group, an iso-propyl group, an n-butyl group, an iso-butyl group, and a tert-butyl group).

In the formula (1), the following formula (1-3) is further preferable.

Formula (1-3):

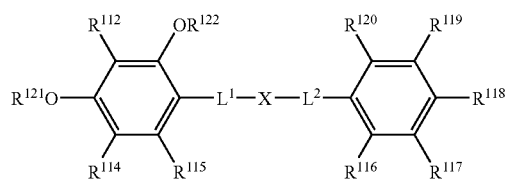

In the foregoing formula (1-3), $R^{112}$, $R^{114}$, $R^{115}$, $R^{116}$, $R^{117}$, $R^{118}$, $R^{119}$, $R^{120}$, $R^{121}$, $L^1$, $L^2$ and X are synonymous with those in the formula (1-2), respectively, and preferred ranges are also the same. $R^{122}$ represents a hydrogen atom or an alkyl group having from 1 to 4 carbon atoms.

$R^{122}$ represents a hydrogen atom or an alkyl group having from 1 to 4 carbon atoms; preferably a hydrogen atom or an alkyl group having from 1 to 3 carbon atoms; more preferably a hydrogen atom, a methyl group, or an ethyl group; further preferably a hydrogen atom or a methyl group; and especially preferably a methyl group.

In the formula (1), the following formula (1-4) is especially preferable.

Formula (1-4):

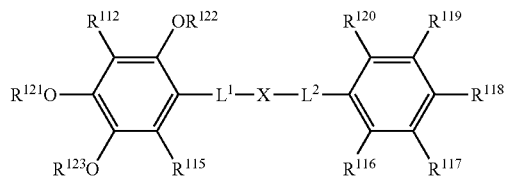

In the foregoing formula (1-4), $R^{112}$, $R^{115}$, $R^{116}$, $R^{117}$, $R^{118}$, $R^{119}$, $R^{120}$, $R^{121}$, $R^{122}$, $L^1$, $L^2$ and X are synonymous with those in the formula (1-3), respectively, and preferred ranges are also the same. $R^{123}$ represents an alkyl group having from 1 to 4 carbon atoms.

$R^{123}$ represents an alkyl group having from 1 to 4 carbon atoms; preferably an alkyl group having from 1 to 3 carbon atoms; more preferably a methyl group or an ethyl group; and further preferably a methyl group.

The foregoing substituent T will be hereunder described.

Examples of the substituent T include an alkyl group (preferably having from 1 to 20 carbon atoms, more preferably from 1 to 12 carbon atoms, and especially preferably from 1 to 8 carbon atoms; for example, a methyl group, an ethyl group, an iso-propyl group, a tert-butyl group, an n-octyl group, an n-decyl group, an n-hexadecyl group, a cyclopropyl group, a cyclopentyl group, and a cyclohexyl group), an alkenyl group (preferably having from 2 to 20 carbon atoms, more preferably from 2 to 12 carbon atoms, and especially preferably from 2 to 8 carbon atoms; for example, a vinyl group, an allyl group, a 2-butenyl group, and a 3-pentenyl group), an alkynyl group (preferably having from 2 to 20 carbon atoms, more preferably from 2 to 12 carbon atoms, and especially preferably from 2 to 8 carbon atoms; for example, a propargyl group and a 3-pentynyl group), an aryl group (preferably having from 6 to 30 carbon atoms, more preferably from 6 to 20 carbon atoms, and especially preferably from 6 to 12 carbon atoms; for example, a phenyl group, a p-methylphenyl group, and a naphthyl group), a substituted or unsubstituted amino group (preferably having from 0 to 20 carbon atoms, more preferably from 0 to 10 carbon atoms, and especially preferably from 0 to 6 carbon atoms; for example, an amino group, a methylamino group, a dimethylamino group, a diethylamino group, and a dibenzylamino group), an alkoxy group (preferably having from 1 to 20 carbon atoms, more preferably from 1 to 12 carbon atoms, and especially preferably from 1 to 8 carbon atoms; for example, a methoxy group, an ethoxy group, and a butoxy group), an aryloxy group (an aryloxy group having from 6 to 20 carbon atoms, more preferably from 6 to 16 carbon atoms, and especially from 6 to 12 carbon atoms; for example, a phenyloxy group and a 2-naphthyloxy group), an acyl group (preferably having from 1 to 20 carbon atoms, more preferably from 1 to 16 carbon atoms, and especially preferably from 1 to 12 carbon atoms; for example, an acetyl group, a benzoyl group, a formyl group, and a pivaloyl group), an alkoxycarbonyl group (preferably having from 2 to 20 carbon atoms, more preferably from 2 to 16 carbon atoms, and especially preferably from 2 to 12 carbon atoms; for example, a methoxycarbonyl group and an ethoxycarbonyl group), an aryloxycarbonyl group (preferably having from 7 to 20 carbon atoms, more preferably from 7 to 16 carbon atoms, and especially preferably from 7 to 10 carbon atoms; for example, a phenyloxycarbonyl group), an acyloxy group (preferably having from 2 to 20 carbon atoms, more preferably from 2 to 16 carbon atoms, and especially preferably from 2 to 10 carbon atoms; for example, an acetoxy group and a benzoyloxy group), an acylamino group (preferably having from 2 to 20 carbon atoms, more preferably from 2 to 16 carbon atoms, and especially preferably from 2 to 10 carbon atoms; for example, an acetylamino group and a benzoylamino group), an alkoxycarbonylamino group (preferably having from 2 to 20 carbon atoms, more preferably from 2 to 16 carbon atoms, and especially preferably from 2 to 12 carbon atoms; for example, a methoxycarbonylamino group), an aryloxycarbonylamino group (preferably having from 7 to 20 carbon atoms, more preferably from 7 to 16 carbon atoms, and especially preferably from 7 to 12 carbon atoms; for example, a phenyloxycarbonylamino group), a sulfonylamino group (preferably having from 1 to 20 carbon atoms, more preferably from 1 to 16 carbon atoms, and especially preferably from 1 to 12 carbon atoms; for example, a methanesulfonylamino group and a benzenesulfonylamino group), a sulfamoyl group (preferably having from 0 to 20 carbon atoms, more preferably from 0 to 16 carbon atoms, and especially preferably from 0 to 12 carbon atoms; for example, a sulfamoyl group, a methylsulfamoyl group, a dimethyl-sulfamoyl group, and a phenylsulfamoyl group), a carbamoyl group (preferably having from 1 to 20 carbon atoms, more preferably from 1 to 16 carbon atoms, and especially preferably from 1 to 12 carbon atoms; for example, a carbamoyl group, a methylcarbamoyl group, a diethylcarbamoyl group, and a phenylcabamoyl group), an alkylthio group (preferably having from 1 to 20 carbon atoms, more preferably from 1 to 16 carbon atoms, and especially preferably from 1 to 12 carbon atoms; for example, a methylthio group and an ethylthio group), an artythio group (preferably having from 6 to 20 carbon atoms, more preferably from 6 to 16 carbon atoms, and especially preferably from 6 to 12 carbon atoms; for example, a phenylthio group), a sulfonyl group (preferably having from 1 to 20 carbon atoms, more preferably from 1 to 16 carbon atoms, and especially preferably from 1 to 12 carbon atoms; for example, a mesyl group and a tosyl group); a sulfinyl group (preferably having from 1 to 20 carbon atoms, more preferably from 1 to 16 carbon atoms, and especially preferably from 1 to 12 carbon atoms; for example, a methane-sulfinyl group and a benzenesulfinyl group), a ureido group (preferably having from 1 to 20 carbon atoms, more preferably from 1 to 16 carbon atoms, and especially preferably from 1 to 12 carbon atoms; for example, a ureido group, a methylureido group, and a phenylureido group), a phosphoric acid amide group (preferably having from 1 to 20 carbon atoms, more preferably from 1 to 16 carbon atoms, and especially preferably from 1 to 12 carbon atoms; for example, a diethylphosphoric acid amide group and a phenylphosphoric acid amide group), a hydroxyl group, a mercapto group, a halogen atom (for example, a fluorine atom, a chlorine atom, a bromine atom, and an iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, and more preferably from 1 to 12 carbon atoms; examples of the hetero atom include a nitrogen atom, an oxygen atom, and a sulfur atom; and specific examples of the heterocyclic group include an imidazolyl group, a pyridyl group, a quinolyl group, a furyl group, a piperidyl group, a morpholino group, a benzoxazolyl group, a benzimidazolyl group, and a benzthiazolyl group), and a silyl group (preferably having from 3 to 40 carbon atoms, more preferably from 3 to 30 carbon atoms, and especially preferably from 3 to 24 carbon atoms; for example, a trimethylsilyl group and a triphenylsilyl group). These substituents may be further substituted.

Furthermore, when two or more substituents are present, these substituents may be the same or different. Moreover, if possible, the substituents may be taken together to form a ring.

Specific examples of the compound represented by the formula (1) will be given below, but it should be construed that the invention is not limited to these specific examples at all.

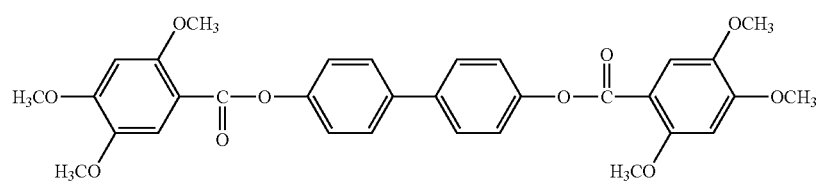
(A-1)

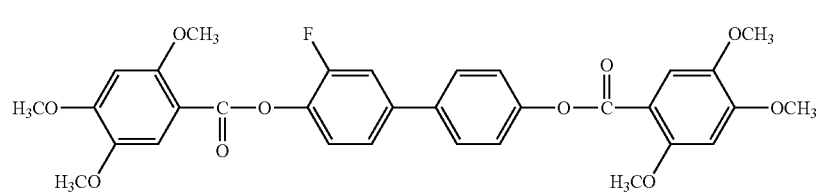
(A-2)

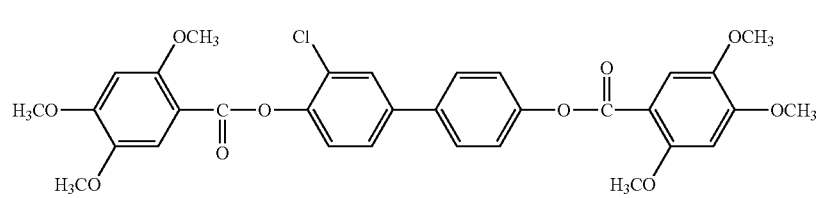
(A-3)

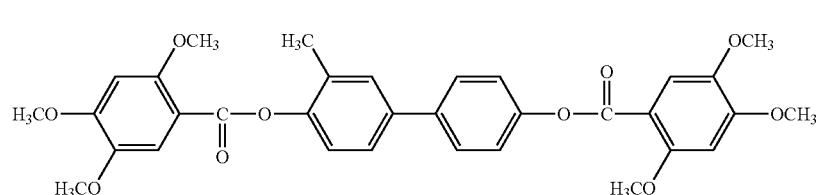
(A-4)

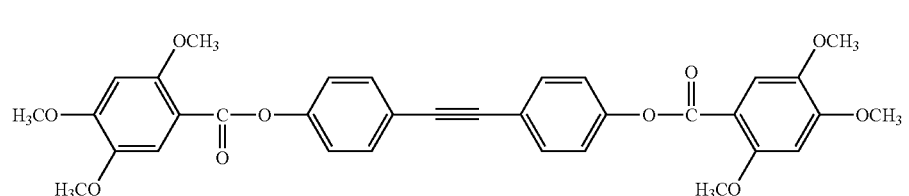
(A-5)

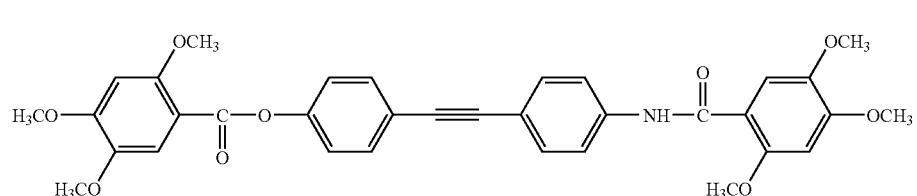
(A-6)

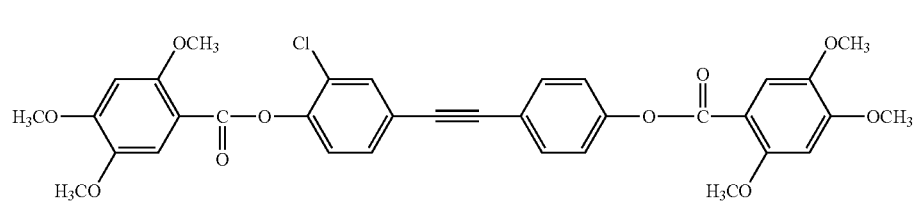
(A-7)

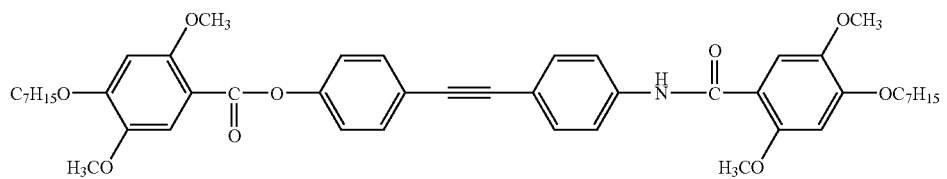
(A-8)
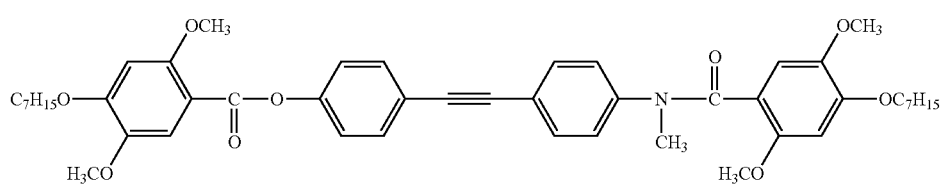
(A-9)
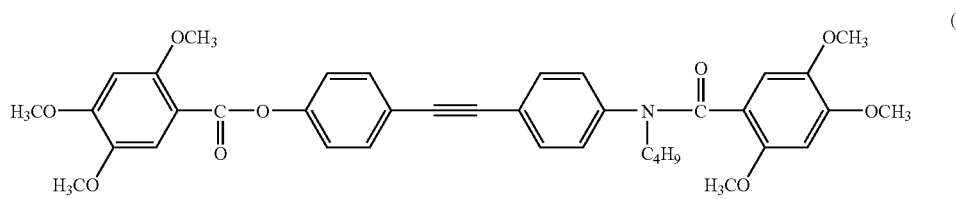
(A-10)
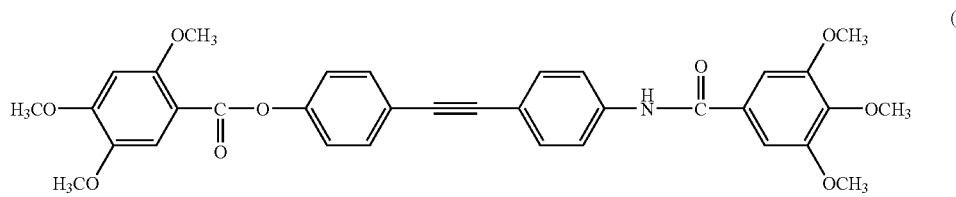
(A-11)
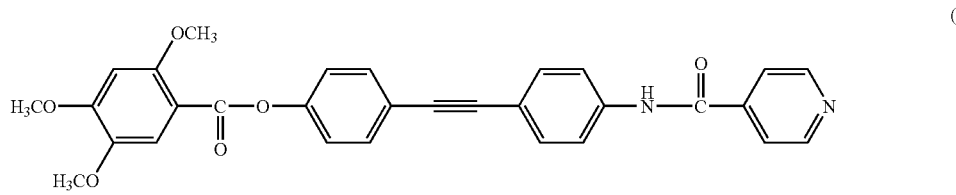
(A-12)
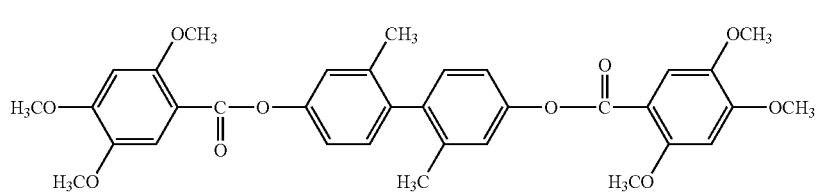
(A-13)
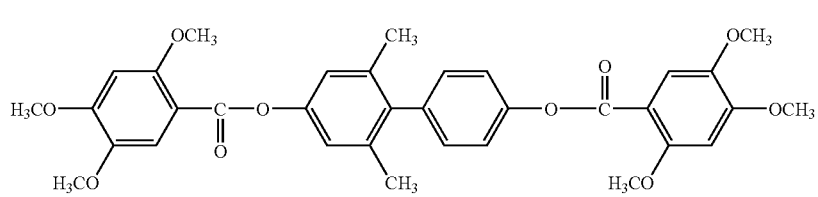
(A-14)
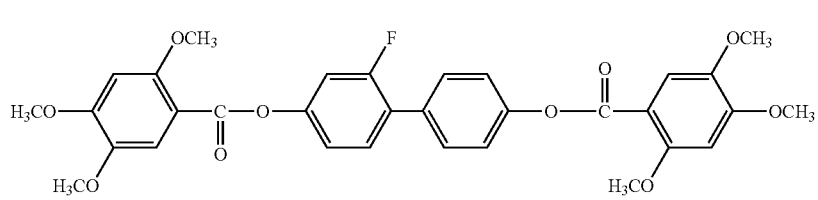
(A-15)

-continued

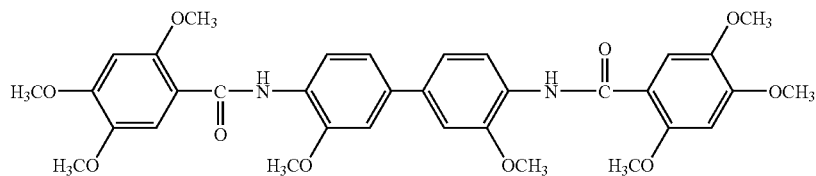
(A-16)

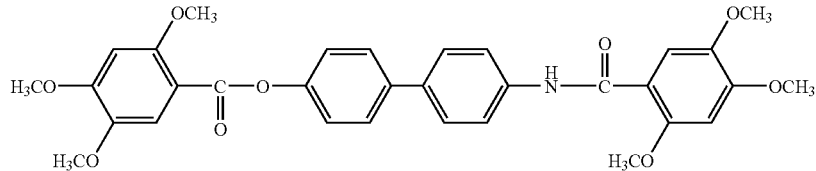
(A-17)

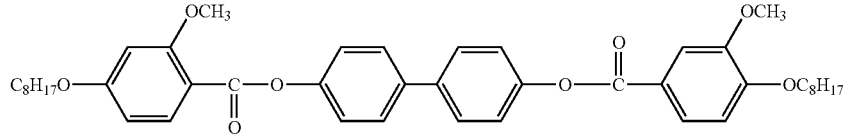
(A-18)

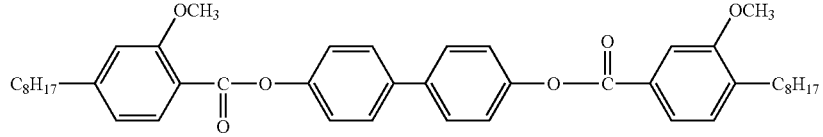
(A-19)

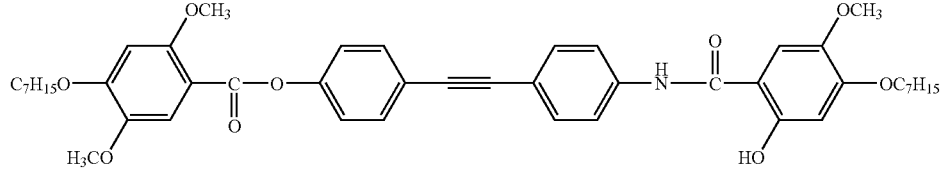
(A-20)

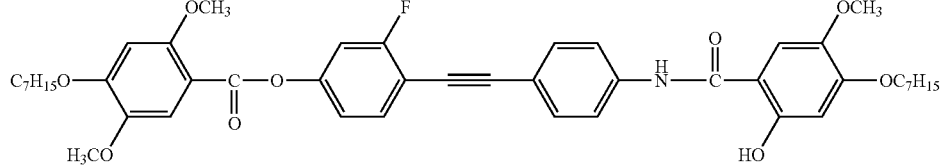
(A-21)

(A-22)

The compounds represented by the formulae (1) to (1-4) of the invention can be synthesized by a general esterification reaction or amidation reaction between a substituted benzoic acid and phenol or an aniline derivative, and any reaction may be employed so far as it is an ester bond-forming reaction. Examples thereof include a method for subjecting a substituted benzoic acid to functional group conversion into an acid halide and then condensing with phenol or an aniline derivative and a method for dehydrating and condensing a substituted benzoic acid and phenol or an aniline derivative using a condensing agent or a catalyst.

When a production process and the like are taken into consideration, a method for subjecting a substituted benzoic acid to functional group conversion into an acid halide and then condensing with phenol or an aniline derivative is preferable.

As a reaction solvent, a hydrocarbon based solvent (preferably toluene and xylene), an ether based solvent (preferably dimethyl ether, tetrahydrofuran, and dioxane), a ketone based solvent, an ester based solvent, acetonitrile, dimethylformamide, dimethylacetamide, and the like can be used. These solvents may be used singly or in admixture of several kinds thereof. Of these, toluene, acetonitrile, dimethylformamide, and dimethylacetamide are preferable as the reaction solvent.

The reaction temperature is preferably from 0 to 150° C., more preferably from 0 to 100° C., further preferably from 0 to 90° C., and especially preferably from 20° C. to 90° C.

It is preferable that a base is not used in the present reaction. When a base is used, any of an organic base and an inorganic base is employable, and an organic base is preferable. Examples thereof include pyridine and tertiary alkylamines (preferably triethylamine and ethyldiisopropylamine).

As the retardation raising agent of the invention which has a rod-like polarization anisotropy of from $300\times10^{-25}$ cm$^3$ to $2000\times10^{-25}$ cm$^3$ and the distance between terminals of a molecule of from 2 nm to 10 nm, the compound represented by the following formula (4) is particularly preferred.

A detailed description on the compound represented by formula (4) is given below.

Formula (4)

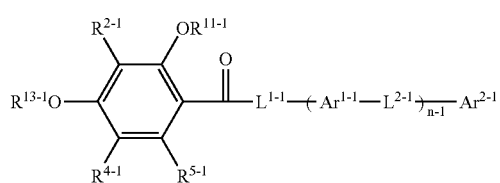

(In formula (4), $R^{2-1}$, $R^{4-1}$ and $R^{5-1}$ each independently represents a hydrogen atom or a substituent, $R^{11-1}$ and $R^{13-1}$ each independently represents a hydrogen atom or an alkyl group, and $L^{1-1}$ and $L^{2-1}$ each independently represents a single bond or a divalent connecting group. $Ar^{1-1}$ represents an arylene group or an aromatic heterocyclic ring, $Ar^{2-1}$ represents an arylene group or an aromatic heterocyclic ring, n−1 represents an integer of at least 3, and the $L^{2-1}$ and $Ar^{1-1}$, both existing in the number of n−1, may be the same or different. However, $R^{11-1}$ and $R^{13-1}$ are different from each other, and the alkyl group represented by $R^{13-1}$ does not contain a hetero atom.)

In formula (4), $R^{2-1}$, $R^{4-1}$ and $R^{5-1}$ each independently represents a hydrogen atom or a substituent, to which substituent $T^2$ to be described later can be applied.

As $R^{2-1}$, a hydrogen atom, an alkyl group, an alkoxy group, an amino group and a hydroxy group are preferably mentioned, a hydrogen atom, an alkyl group and an alkoxy group are more preferably mentioned, and still more preferably a hydrogen atom, an alkyl group (preferably with 1 to 4 carbon atoms, and more preferably methyl group), and an alkoxy group (preferably with 1 to 12 carbon atoms, more preferably with 1 to 8 carbon atoms, still more preferably with 1-6 carbon atoms, and particularly preferably with 1 to 4 carbon atoms) are mentioned. Particularly preferable groups are hydrogen atom, methyl group and methoxy group, and the most preferable one is a hydrogen atom.

As $R^{4-1}$, a hydrogen atom or an electron-donating group is mentioned, more preferably a hydrogen atom, an alkyl group, an alkoxy group, an amino group and a hydroxy group are more preferably mentioned, a hydrogen atom, an alkyl group with 1 to 4 carbon atoms, an alkoxy group with 1 to 12 carbon atoms (preferably with 1 to 8 carbon atoms, more preferably with 1 to 6 carbon atoms, and still more preferably with 1 to 4 carbon atoms) are mentioned, and a hydrogen atom, an alkyl group with 1 to 4 carbon atoms, and an alkoxy group with 1 to 4 carbon atoms are particularly preferably mentioned, and the most preferable groups are a hydrogen atom and a methoxy group.

As $R^{5-1}$, a hydrogen atom, a halogen atom, an alkyl group, an alkoxy group, an amino group and a hydroxy group are preferred, a hydrogen atom, an alkyl group and an alkoxy group are more preferred, a hydrogen atom, an alkyl group (preferably with 1 to 4 carbon atoms, and more preferably methyl group) and an alkoxy group (preferably with 1 to 12 carbon atoms, more preferably with 1 to 8 carbon atoms, still more preferably with 1-6 carbon atoms, and particularly preferably with 1 to 4 carbon atoms) are still more preferred. Particularly preferable groups are a hydrogen atom, methyl group and methoxy group. The most preferred one is a hydrogen atom.

$R^{11-1}$ and $R^{13-1}$ each independently represents a hydrogen atom or an alkyl group, $R^{11-1}$ and $R^{13-1}$ are different from each other, and the alkyl group represented by $R^{13-1}$ does not contain any hetero atom. The hetero atom here represents an atom other than a hydrogen atom and carbon atom, exemplified by oxygen atom, nitrogen atom, sulfur atom, phosphor, silicon, a halogen atom (fluorine atom, chlorine atom, bromine atom and iodine atom), boron, etc.

The alkyl group represented by $R^{11-1}$ and $R^{13-1}$ is of straight chain, branched chain or cyclic, and represents a substituted or unsubstituted alkyl group. Preferably a substituted or unsubstituted alkyl group with 1 to 30 carbon atoms, a substituted or unsubstituted cycloalkyl group with 3 to 30 carbon atoms, a substituted or unsubstituted bicycloalkyl group with 5 to 30 carbon atoms (i.e., a mono-valent group obtained by removing one hydrogen atom from a bicycloalkane with 5 to 30 carbon atoms), and a tricyclo structure, etc. comprising a still large number of cyclic structures are mentioned.

As the preferable examples of the alkyl groups represented by $R^{11-1}$ and $R^{13-1}$, methyl group, ethyl group, n-propyl group, isopropyl group, n-butyl group, sec-butyl group, tert-butyl group, n-pentyl group, iso-pentyl group, n-hexyl group, n-heptyl group, n-octyl group, tert-octyl group, 2-ethylhexyl group, n-nonyl group, 1,1,3-trimethylhexyl group, n-decyl group, 2-hexyldecyl group, cyclohexyl group, cycloheptyl group, 2-hexenyl group, oleyl group, liolenyl group, etc. can be mentioned. Moreover, as cycloalkyl group, cyclohexyl group, cyclopentyl group, and 4-n-dodecylcyclohexyl group are mentioned. As the bicycloalkyl group, bicylco[1,2,2]heptan-2-yl group, bicylco[2,2,2]octan-3-yl group, etc. can be mentioned.

As $R^{11-1}$, more preferred are a hydrogen atom, methyl group, ethyl group, n-propyl group and isopropyl group, particularly preferred are a hydrogen atom and methyl group, and the most preferred is methyl group.

Particularly preferred as $R^{13-1}$ is an alkyl group with two or more carbon atoms, and still more preferred is an alkyl group containing 3 or more carbon atoms.

In the following, the alkyl group represented by $R^{13-1}$ is described with reference to specific examples, but the present invention is not limited by the following specific examples at all.

O-1
—CH$_3$

O-2
—C$_2$H$_5$

O-3
—C$_3$H$_7$(n)

O-4
—C$_3$H$_7$(i)

O-5
—C$_4$H$_9$(n)

O-6
—C(CH$_3$)$_3$

O-7
—C$_5$H$_{11}$(n)

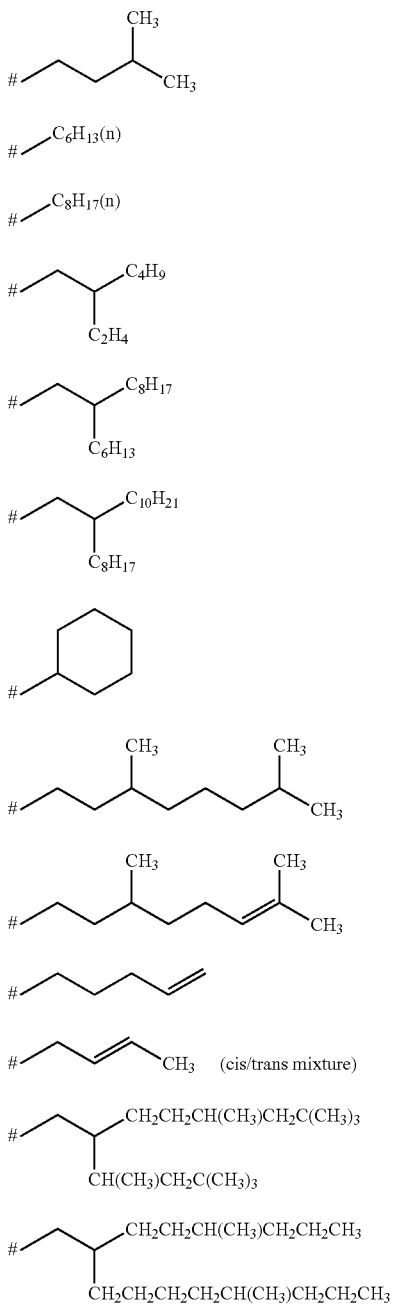

In the above examples, # indicates the site at which oxygen atom is bonded.

$Ar^{1-1}$ represents an arylene group or an aromatic heterocyclic ring wherein $Ar^{1-1}$'s in the repeating unit may be all the same or different. $Ar^{2-1}$ represents an aryl group or an aromatic heterocyclic ring.

In formula (4), as the arylene group represented by $Ar^{1-1}$, preferable ones are arylene groups with 6 to 30 carbon atoms whereby the arylene group may comprise a single ring or form a condensed ring with still another ring. Further, if possible, the arylene group may have a substituent, to which substituent $T^2$ to be described later can be applied. As the arylene group represented by $Ar^{1-1}$, preferably those with 6 to 20 carbon atoms, more preferably those with 6 to 12 carbon atoms are mentioned, exemplified by phenylene group, p-methylphenylene group, naphthylene group, etc.

In formula (4), the aryl group represented by $Ar^{2-1}$ is preferably aryl groups with 6 to 30 carbon atoms, and may be a single ring or form a condensed ring with still another ring. Further, if possible, the arylene group may have a substituent, to which substituent $T^2$ to be described later can be applied. As the aryl group represented by $Ar^{2-1}$, preferably those with 6 to 20 carbon atoms, more preferably those with 6 to 12 carbon atoms are mentioned, exemplified by phenyl group, p-methylphenyl group, naphthalene group, etc.

In formula (4), the aromatic heterocyclic rings represented by $Ar^{1-1}$ and $Ar^{2-1}$ are preferably those containing at least one of oxygen atom, nitrogen atom and sulfur atom, more preferably a five- or six-membered aromatic heterocyclic ring containing at least one of oxygen atom, nitrogen atom or sulfur atom. And, if possible, the ring may have a substituent, to which substituent $T^2$ to be described later can be applied.

Specific examples of the aromatic heterocyclic ring represented by $Ar^{1-1}$ and $Ar^{2-1}$ are, for example, furan ring, pyrrole ring, thiophene ring, imidazole ring, pyrazole ring, pyridine ring, pyrazine ring, pyridazine ring, triazole ring, triazine ring, indole ring, indazole ring, purine ring, thiazoline ring, thiazole ring, thiadiazole ring, oxazoline ring, oxazole ring, oxadiazole ring, quinoline ring, isoquinoline ring, phthalazine ring, naphthyridine ring, quinoxaline ring, quinazoline ring, cinnoline ring, pteridine ring, acridine ring, phenanthroline ring, phenazine ring, tetrazole ring, benzimidazole ring, benzoxazole ring, benzothiazole ring, benzotriazole ring, tetrazaindene ring, pyrrolotriazole ring, pyrazolotriazole ring, etc. Preferable ones as the aromatic heterocyclic ring are benzimidazole ring, benzoxazole ring, benzthiazole ring and benzotriazole ring. Preferable ones as the aromatic hetero ring are benzimidazole ring, benzoxazole ring, benzothiazole ring and benzotriazole ring.

In formula (4), $L^{1-1}$ and $L^{2-1}$ each independently represents a single bond or a divalent connecting group. $L^{1-1}$ and $L^{2-1}$ may be the same or different. $L^{2-1}$ in the repeating unit may be the same or different.

Preferable divalent connecting groups include —O—, —$NR^{1-1}$— (wherein $R^{1-1}$ represents a hydrogen atom or an alkyl or aryl group which may have a substituent), —CO—, —$SO_2$—, —S—, an alkylene group, a substituted alkylene group, an alkenylene group, a substituted alkenylene group, an alkynylene group, and the group obtained by combining two or more of these divalent groups. Among these, more preferable groups are —O—, —NR—, —CO—, —$SO_2NR^{1-1}$—, —$NR^{1-1}SO_2$—, —$CONR^{1-1}$—, —$NR^{1-1}CO$—, —COO—, —OCO— and an alkynylene group. $R^{1-1}$ preferably represents a hydrogen atom.

In the compound represented by formula (4) in the invention, $Ar^{1-1}$ is connected to $L^{1-1}$ and $L^{2-1}$ whereby, when $Ar^{1-1}$ is a phenylene group, it is most preferable that -$L^{1-1}$-$Ar^{1-1}$-$L^{2-1}$- and -$L^{2-1}$-$Ar^{1-1}$-$L^{2-1}$- are mutually in the relation of para-position (1,4-position).

In formula (4), n–1 represents an integer of 3 or more, preferably 3 to 7, more preferably 3 to 7, and still more preferably 3 to 6.

Among the compounds of the aforementioned formula (4), those represented by the following formulae (4-2) or (4-3) can be used particularly preferably.

Formula (4-2)

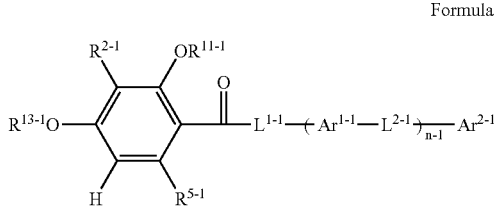

(In formula (4-2), $R^{2-1}$ and $R^{5-1}$ each independently represents a hydrogen atom or a substituent, $R^{11-1}$ and $R^{13-1}$ each independently represents a hydrogen atom or an alkyl group, and $L^{1-1}$ and $L^{2-1}$ each independently represents a single bond or a divalent connecting group. $Ar^{1-1}$ represents an arylene group or an aromatic heterocyclic ring, $Ar^{2-1}$ represents an aryl group or an aromatic heterocyclic ring, n−1 represents an integer of at least 3, and the $L^{2-1}$ and $Ar^{1-1}$, both existing in the number of n−1, may be the same or different. However, $R^{11-1}$ and $R^{13-1}$ are different from each other, and the alkyl group represented by $R^{13-1}$ does not contain a hetero atom.)

In formula (4-2), $R^{2-1}$, $R^{5-1}$, $R^{11-1}$ and $R^{13-1}$ each have the same meaning as in formula (4), and the preferable range thereof is also the same. Further, $L^{1-1}$, $L^{2-1}$, $Ar^{1-1}$ and $Ar^{2-1}$ each have the same meaning as those in formula (4) and the preferable range thereof is also the same.

Formula (4-3)

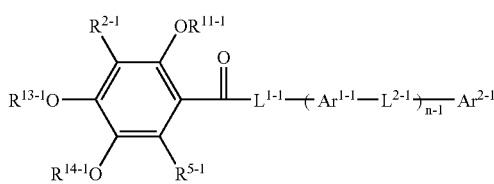

(In formula (4-3), $R^{2-1}$ and $R^{5-1}$ each independently represents a hydrogen atom or a substituent, $R^{11-1}$, $R^{13-1}$ and $R^{14-1}$ each independently represents a hydrogen atom or an alkyl group, and $L^{1-1}$ and $L^{2-1}$ each independently represents a single bond or a divalent connecting group. $Ar^{1-1}$ represents an arylene group or an aromatic heterocyclic ring, $Ar^{2-1}$ represents an aryl group or an aromatic heterocyclic ring, n−1 represents an integer of at least 3, and the $L^{2-1}$'s and $Ar^{1-1}$'s, both existing in the number of n−1, may be the same or different, respectively. However, $R^{11-1}$ and $R^{13-1}$ are different from each other, and the alkyl group represented by $R^{13-1}$ does not contain a hetero atom.)

In formula (4-3), $R^{2-1}$, $R^{5-1}$, $R^{11-1}$ and $R^{13-1}$ each have the same meaning as in formula (4), and the preferable range thereof are also the same. $L^{1-1}$, $L^{2-1}$, $Ar^{1-1}$ and $Ar^{2-1}$ each have the same meaning as those in formula (4) and the preferable ranges thereof are also the same.

$R^{14-1}$ represents a hydrogen atom or an alkyl group, whereby, as the alkyl group, those shown as the preferable examples for $R^{11-1}$ and $R^{13-1}$ are preferably used. $R^{14-1}$ more preferably represents a hydrogen atom or an alkyl group with 1 to 4 carbon atoms, still more preferably a hydrogen atom or an alkyl group with 1 to 3 carbon atoms, and most preferably a methyl group. $R^{11-1}$ and $R^{14-1}$ may be the same or different, but it is most preferred that both are methyl groups.

Further, the compounds represented by formula (4-4) or (4-5) are also preferred.

Formula (4-4)

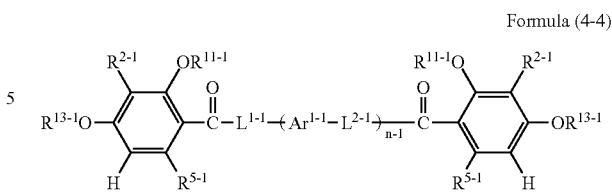

(In formula (4-4), $R^{2-1}$ and $R^{5-1}$ each independently represents a hydrogen atom or a substituent, $R^{11-1}$ and $R^{13-1}$ each independently represents a hydrogen atom or an alkyl group, and $L^{1-1}$ and $L^{2-1}$ each independently represents a single bond or a divalent connecting group. $Ar^{1-1}$ represents an arylene group or an aromatic heterocyclic ring, n−1 represents an integer of at least 3, and the $L^{1-1}$'s and $Ar^{1-1}$'s both existing in the number of n−1, may be the same or different, respectively. However, $R^{11-1}$ and $R^{13-1}$ are different from each other, and the alkyl group represented by $R^{13-1}$ does not contain a hetero atom.)

In formula (4-4), $R^{2-1}$, $R^{5-1}$, $R^{11-1}$, $R^{13-1}$, $L^{1-1}$, $L^{2-1}$, $Ar^{1-1}$ and n−1 each have the same meaning as those in formula (4), and the preferable ranges thereof are also the same.

Formula (4-5)

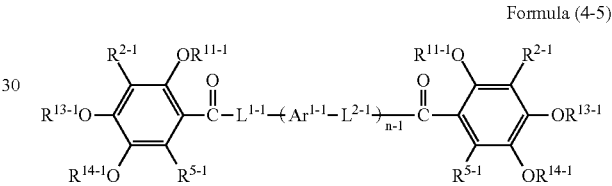

(In formula (4-5), $R^{2-1}$ and $R^{5-1}$ each independently represents a hydrogen atom or a substituent, $R^{11-1}$, $R^{13-1}$ and $R^{14-1}$ each independently represents a hydrogen atom or an alkyl group, and $L^{1-1}$ and $L^{2-1}$ each independently represents a single bond or a divalent connecting group. $Ar^{1-1}$ represents an arylene group or an aromatic heterocyclic ring, n−1 represents an integer of at least 3, and the $L^{1-1}$'s and $Ar^{2-1}$'s, both existing in the number of n−1, may be the same or different. However, $R^{11-1}$ and $R^{13-1}$ are different from each other, and the alkyl group represented by $R^{13-1}$ does not contain a hetero atom.)

In formula (4-5), $R^{2-1}$, $R^{5-1}$, $R^{11-1}$, $R^{13-1}$, $L^{1-1}$, $L^{2-1}$, $Ar^{1-1}$ and n−1 each have the same meaning as those in formula (4), and the preferable ranges thereof are also the same.

$R^{14-1}$ has the same meaning as $R^{14-1}$ in formula (4-3) and the preferable range thereof is also the same.

In the following, the aforementioned substituent $T^2$ is explained.

Substituent $T^2$ preferably represents, for example; a halogen atom (for example, fluorine atom, chlorine atom, bromine atom and iodine atom), an alkyl group (preferably, alkyl groups with 1 to 30 carbon atoms; for example, methyl group, ethyl group, n-propyl group, isopropyl group, tert-butyl group, n-octyl group or 2-ethylhexyl group), a cycloalkyl group (preferably substituted or unsubstituted cycloalkyl groups with 3 to 30 carbon atoms; for example, cyclohexyl group, cyclopentyl group or 4-n-dodecylcyclohexyl group), a bicycloalkyl group (preferably substituted or unsubstituted bicycloalkyl groups with 5 to 30 carbon atoms; i.e., the groups obtained by removing one hydrogen atom from a bicycloalkanes with 5 to 30 carbon atoms, exemplified by bicyclo[1, 2,2]heptan-2-yl group, bicyclo[2,2,2]octan-3-yl group), an alkenyl group (preferably, substituted or unsubstituted alkenyl group with 2 to 30 carbon atoms; for example, vinyl group or allyl group), a cycloalkenyl group (preferably, substituted or unsubstituted cycloalkenyl groups with 3 to 30 carbon atoms, i.e., the mono-valent groups obtained by removing one hydrogen atom from a cycloalkane with 3 to 30 carbon atoms, exemplified by 2-cyclopenten-1-yl group, 2-cyclohexen-1-yl group), a bicycloalkenyl group (substituted or unsubstituted bicycloalkenyl groups, preferably substituted or unsubstituted bicycloalkenyl groups with 5 to 30 carbon atoms, i.e., mono-valent groups obtained by removing one hydrogen atom from a bicycloalkene having one double bond, exemplified by bicycle[2,2,1]hepto-2-en-1yl group, bicycle[2,2,2]octo-2-en-4-yl group), an alkynyl group (preferably, substituted or unsubstituted alkynyl groups with 2 to 30 carbon atoms; for example, ethynyl group, propargyl group), an aryl group (preferably, substituted or unsubstituted aryl groups with 6 to 30 carbon atoms; for example, phenyl group, p-tolyl group and naphthyl group), a heterocyclic group (preferably, mono-valent groups obtained by removing one hydrogen atom from a substituted or unsubstituted 5-membered or 6-membered aromatic or non-aromatic heterocyclic compound, and more preferably 5-membered or 6-membered aromatic heterocyclic groups with 3 to 30 carbon atoms; exemplified by 2-furyl group, 2-thienyl group, 2-pyrimidynyl group, 2-benzothiazolyl group), cyano group, hydroxyl group, nitro group, carboxyl group, alkoxy-group (preferably substituted or unsubstituted alkoxy groups with 1 to 30 carbon atoms; for example, methoxy group, ethoxy group, isopropoxy group, tert-butoxy group, n-octyloxy group and 2-methoxyethoxy group), an aryloxy group (preferably, substituted or unsubstituted aryloxy groups with 6 to 30 carbon atoms; for example, phenoxy group, 2-methylphenoxy group, 4-tert-butylphenoxy group, 3-nitrophenoxy group, 2-tetradecanoylaminophenoxy group), a silyloxy group (preferably, substituted or unsubstituted silyloxy groups with 3 to 20 carbon atoms; for example, trimethylsilyloxy group, and tert-butyldimethylsilyloxy group), a heterocyclic oxy group (preferably, substituted or unsubstituted heterocyclic oxy groups with 2 to 30 carbon atoms such as 1-phenyltetrazol-5-oxy group, 2-tetrahydropyranyloxy group), an acyloxy group (preferably, formyloxy group, substituted or unsubstituted alkylcarbonyloxy groups with 2 to carbon atoms, and substituted or unsubstituted arylcarbonyloxy groups with 6 to 30 carbon atoms; for example, formyloxy group, acetyloxy group, pivaloyloxy group, stearoyloxy group, benzoyloxy group, p-methoxyphenylcarbonyloxy group), a carbamoyloxy group (preferably, substituted or unsubstituted carbamoyloxy groups with 1 to 30 carbon atoms; for example, N,N-dimethylcarbamoyloxy group, N,N-diethylcarbamoyloxy group, morpholinocarbonyloxy group, N,N-di-n-octylaminocarbonyloxy group and N-n-octylcarbamoyloxy group), an alkoxycarbonyloxy group (preferably, substituted or unsubstituted alkoxycarbonyloxy groups with 2 to 30 carbon atoms; for example, methoxycarbonyloxy group, ethoxycarbonyloxy group, tert-butoxycarbonyloxy group and n-octylcarbonyloxy group), an aryloxycarbonyloxy group (preferably, substituted or unsubstituted aryloxycarbonyloxy groups with 7 to 30 carbon atoms; for example, phenoxycarbonyloxy group, p-methoxyphenoxycarbonyloxy group and p-n-hexadecyloxyphenoxycarbonyloxy group), an amino group (preferably, amino group, substituted or unsubstituted alkylamino groups with 1 to 30 carbon atoms and substituted or unsubstituted anilino groups with 6 to 30 carbon atoms; for example, amino group, methylamino group, dimethylamino group, anilino group, N-methylanilino group and diphenylamino group), an acylamino group (preferably, formylamino group, substituted or unsubstituted alkylcarbonylamino groups with 1 to 30 carbon atoms, and substituted or unsubstituted arylcarbonylamino groups with 6 to 30 carbon atoms; for example, formylamino group, acetylamino group, pivaloylamino group, lauroylamino group and benzoylamino group), an aminocarbonyamino group (preferably, substituted or unsubstituted aminocarbonylamino groups with 1 to 30 carbon atoms; for example, carbamoylamino group, N,N-dimethylaminocarbonylamino group, N,N-diethylaminocarbonylamino group and morpholinocarbonylamino group), an alkoxycarbonylamino group (preferably, substituted or unsubstituted alkoxycarbonylamino groups with 2 to 30 carbon atoms; for example, methoxycarbonylamino group, ethoxycarbonylamino group, tert-butoxycarbonylamino group, n-octadecyloxycarbonylamino group, N-methyl-methoxycarbonylamino group), an aryloxycarbonylamino group (preferably, substituted or unsubstituted aryloxycarbonylamino groups with 7 to 30 carbon atoms; for example, phenoxycarbonylamino group, p-chlorophenoxycarbonylamino group, m-n-octyloxyphenoxycarbonylamino group), a sulfamoylamino group (preferably, substituted or unsubstituted sulfamoylamino groups with 0 to 30 carbon atoms; for example, sulfamoylamino group, N,N-dimethylaminosulfonylamino group and N-n-octylaminosulfonylamino group), alkyl and arylsulfonylamino groups (preferably, substituted or unsubstituted alkylsulfonylamino groups with 1 to 30 carbon atoms, and substituted or unsubstituted arylsulfonylamino groups with 6 to 30 carbon atoms; for example, methylsulfonylamino group, butlsulfonylamino group, phenylsulfonylamino group, 2,3,5-trichlorophenylsulfonylamino group, p-methylphenylsulfonylamino group), a mercapto group and an alkylthio group (preferably, substituted or unsubstituted alkylthio group with 1 to 30 carbon atoms; for example, methylthio group, ethylthio group and n-hexadecylthio group), an arylthio group (preferably, substituted or unsubstituted arylthio groups with 6 to 30 carbon atoms; for example, phenylthio group, p-chlorophenylthio group and m-methoxyphenylthio group), a heterocyclic thio groups (preferably, substituted or unsubstituted heterocyclic thio group with 2 to 30 carbon atoms; for example, 2 benzothiazolylthio group, 1-phenyltetrazol-5-ylthio group), a sulfamoyl group (preferably, substituted or unsubstituted sulfamoyl groups with 0 to 30 carbon atoms; for example, N-ethylsulfamoyl group, N-(3-dodecyloxypropyl)sulfamoyl group, N,N-dimethylsulfamoyl group, N-acetylsulfamoyl group, N-benzoylsulfamoyl group, N—(N'-phenylcarbamoyl)sulfamoyl group), a sulfo group, alkyl and arylsulfinyl groups, (preferably, substituted or unsubstituted alkylsulfinyl groups with 1 to 30 carbon atoms and substituted or unsubstituted arylsulfinyl groups with 6 to 30 carbon atoms; for example, methylsulfinyl group, ethylsulfinyl group, phenylsulfinyl group and p-methylphenylsulfinyl group), alkyl and arylsulfonyl groups (preferably, substituted or unsubstituted alkylsulfonyl groups with 1 to 30 carbon atoms, and substituted or unsubstituted arylsulfonyl groups with 6 to 30 carbon atoms; for example, methylsulfonyl group, ethylsulfonyl group, phenylsulfonyl group, p-methylphenylsulfonyl group), an acyl group (preferably, formyl group, substituted or unsubstituted alkylcarbonyl group with 2 to 30 carbon atoms, and substituted or unsubstituted arylcarbonyl group with 7 to 30 carbon atoms; for example, acetyl group and pivaloylbenzoyl group), an aryloxycarbonyl group (preferably, substituted or unsubstituted aryloxycarbonyl groups with 7 to 30 carbon atoms; for example, phenoxycarbonyl group, o-chlorophenoxycarbonyl group, m-nitrophenoxycarbonyl group, and p-tert-butylphenoxycarbonyl group), an alkoxycarbonyl group (preferably, substituted or unsubstituted alkoxycarbonyl groups with 2 to 30 carbon atoms; for example, methoxycarbonyl group, ethylcarbonyl group, tert-butoxycarbonyl group and n-octadecyloxycarbonyl group), a carbamoyl group (preferably, substituted or unsubstituted carbamoyl groups with 1 to 30 carbon atoms; for example, carbamoyl group, N-methylcarbamoyl group, N,N-dimethylcarbamoyl group, N,N-di-n-octylcarbamoyl group and N-(methylsulfonyl)carbamoyl group), aryl and heterocyclic azo groups (preferably, substituted or unsubstituted arylazo groups with 6 to 30 carbon atoms, heterocyclic azo groups with 3 to 30 carbon atoms; for example, phenylazo, p-chlorophenylazo group and 5-ethylthio-1,3,4-thiadiazol-2-ylazo group), an imide group (preferably, N-succinimide group and N-phthalimide group), a phosphino group, (preferably substituted or unsubstituted phosphino groups with 2 to 30 carbon atoms; for example, dimethylphosphino group, diphenylphosphino group, methylphenoxyphosphino group), a phosphinyl group (preferably, substituted or unsubstituted phosphinyl groups with 2 to 30 carbon atoms; for example, phosphinyl group, dioctyloxyphosphinyl group and diethyoxyphosphinyl group), a phosphinyloxy group (preferably substituted or unsubstituted phosphinyloxy groups with 2 to 30 carbon atoms; for example, diphenoxyphosphinyloxy group and dioctyloxyphosphinyloxy group), phosphinylamino group (preferably substituted or unsubstituted phosphinylamino groups with 2 to 30 carbon atoms; for example, dimethoxyphosphinylamino group and dimethylaminophosphinylamino group), a silyl group (preferably, substituted or unsubstituted silyl groups with 3 to 30 carbon atoms; for example, trimethylsilyl group, tert-butyldimethylsilyl group and phenyldimethylsilyl group).

Among the substituents mentioned above, as regards those having a hydrogen atom, the hydrogen atom may be removed therefrom and substituted further with the group mentioned above. As such a functional group are cited the alkylcarbonylaminosulfonyl group, the arylcarbonylaminosulfonyl group, the alkylsulfonylaminocarbonyl group, and the arylsulfonylaminocarbonyl group. As specific examples of those functional groups, methylsulfonylaminocarbonyl group, p-methylphenylsulfonylaminocarbonyl group, acetylaminosulfonyl group and benzoylaminosulfonyl group.

In addition, in the case where there exist two or more substituents, they may be the same or different. Further, they may combine together to form a ring, if possible.

As the compounds represented by formulae (4-4) or (4-5), preferable ones are those in which $R^{11-1}$ is methyl group, both of $R^{2-1}$ and $R^{5-1}$ are hydrogen atoms, $R^{13}$ is an alkyl group with 3 or more carbon atoms, $L^{1-1}$ and $L^{2-1}$ each are a single bond, —O—, —CO—, —NR—, —SO$_2$NR—, —NRSO$_2$, —CONR—, —NRCO—, —COO—, —OCO— and an alkynylene group (wherein R represents a hydrogen atom, an alkyl or aryl group that may have a substituent. Preferably, R is a hydrogen atom.), $Ar^{1-1}$ is an arylene group, and those in which n−1 is 3 to 6 can be mentioned.

In the following, detailed descriptions are given on the compound represented by formula (4) with reference to specific examples. However, the invention is not limited by the following specific examples at all.

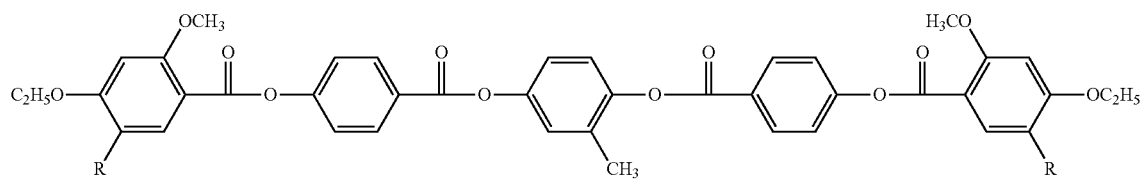

A-101; R = H
B-101; R = OCH$_3$

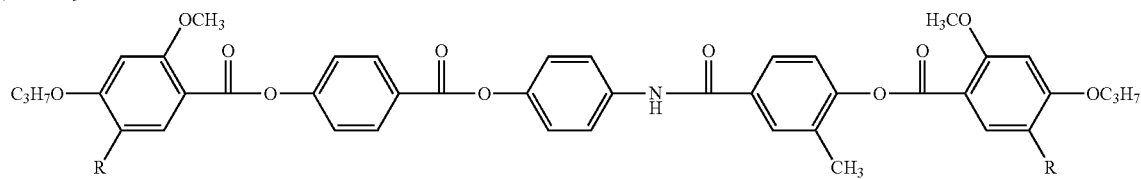

A-102; R = H
B-102; R = OCH$_3$

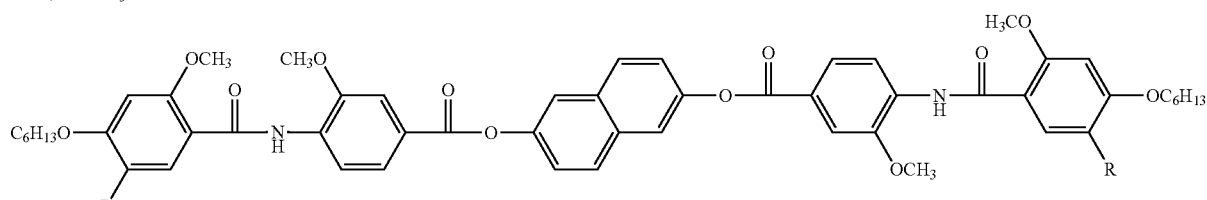

A-103; R = H
B-103; R = OCH$_3$

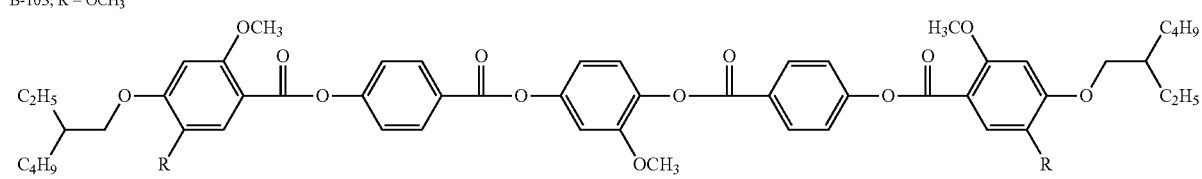

A-104; R = H
B-104; R = OCH$_3$

-continued
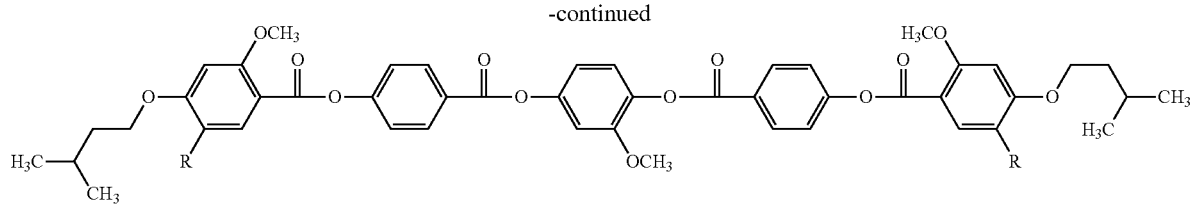
A-105; R = H
B-105; R = OCH₃
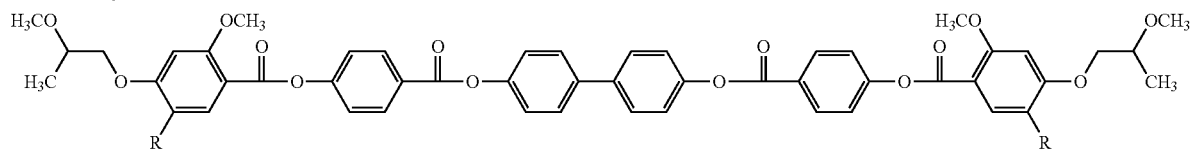
A-106; R = H
B-106; R = OCH₃
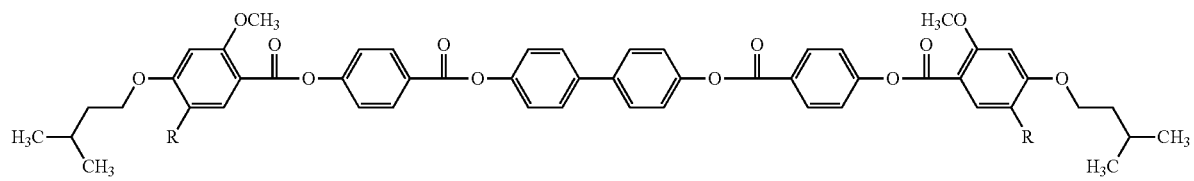
A-107; R = H
B-107; R = OCH₃
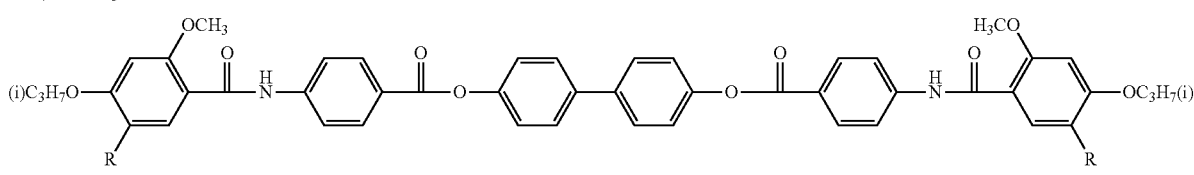
A-108; R = H
B-108; R = OCH₃
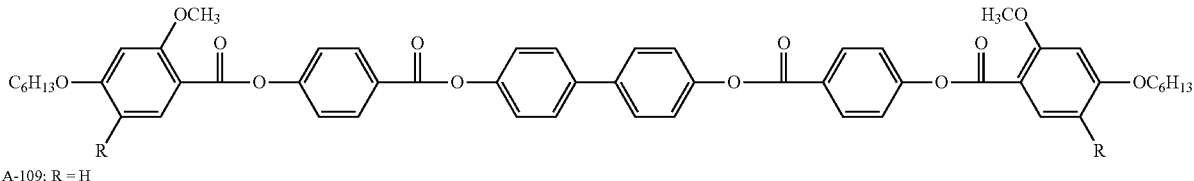
A-109; R = H
B-109; R = OCH₃
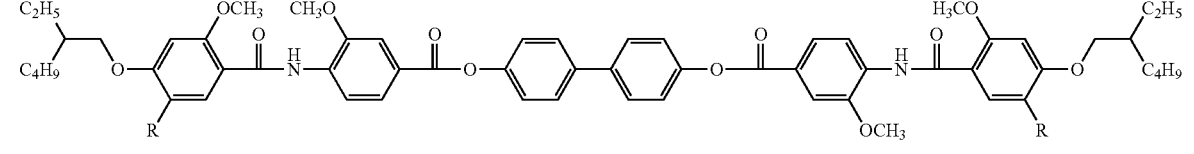
A-110; R = H
B-110; R = OCH₃
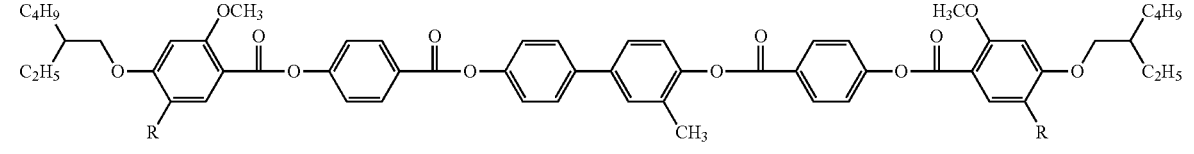
A-111; R = H
B-111; R = OCH₃
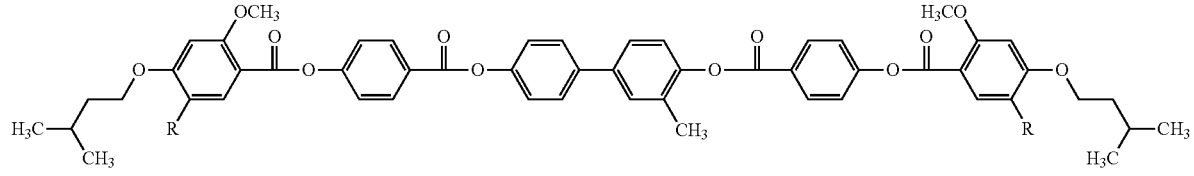
A-112; R = H
B-112; R = OCH₃

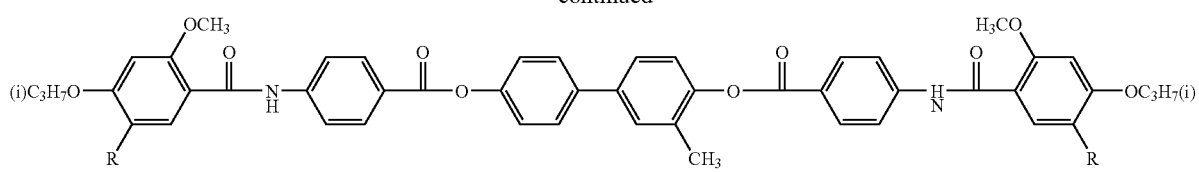
A-113; R = H
B-113; R = OCH₃
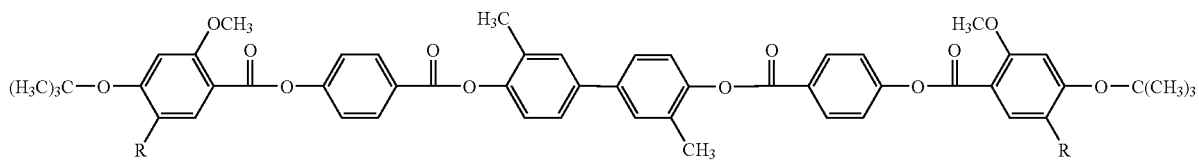
A-114; R = H
B-114; R = OCH₃
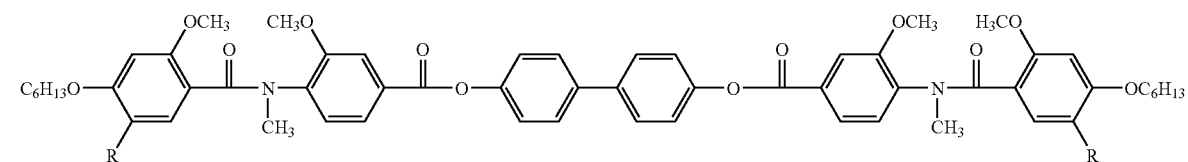
A-115; R = H
B-115; R = OCH₃
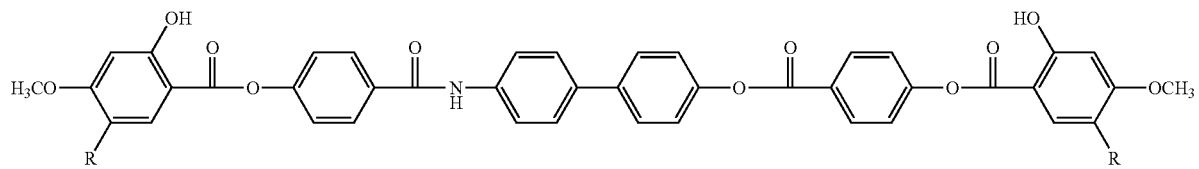
A-116; R = H
B-116; R = OCH₃
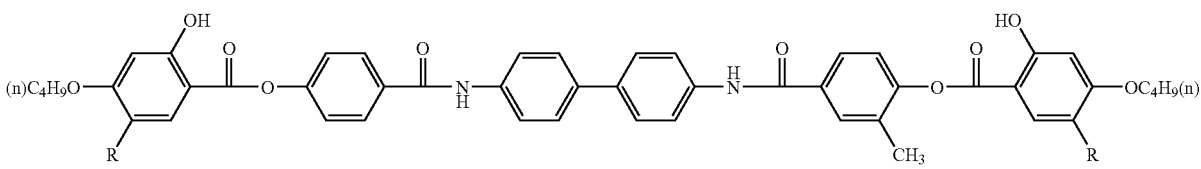
A-117; R = H
B-117; R = OCH₃
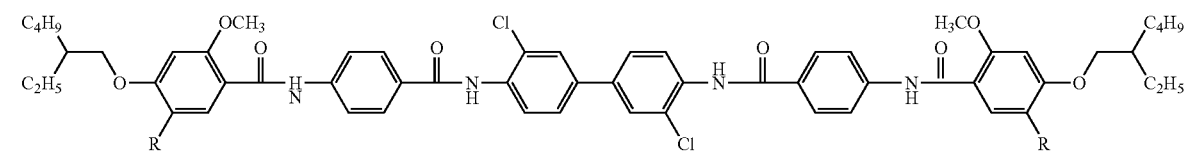
A-118; R = H
B-118; R = OCH₃
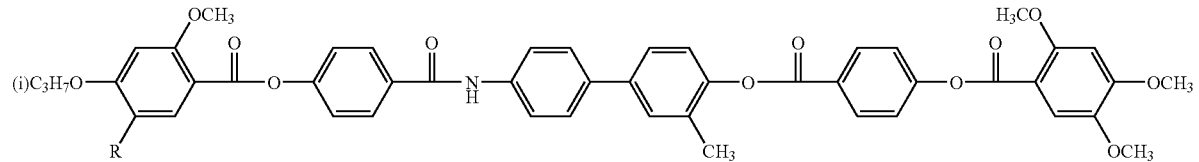
A-119; R = H
B-119; R = OCH₃
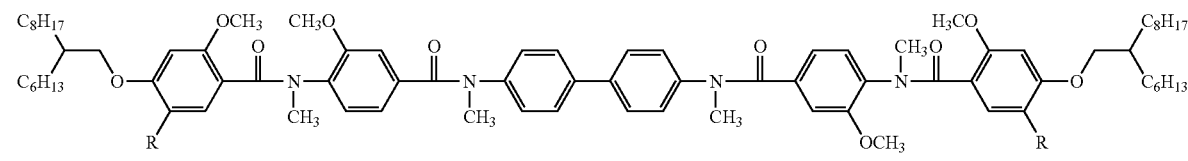
A-120; R = H
B-120; R = OCH₃

-continued
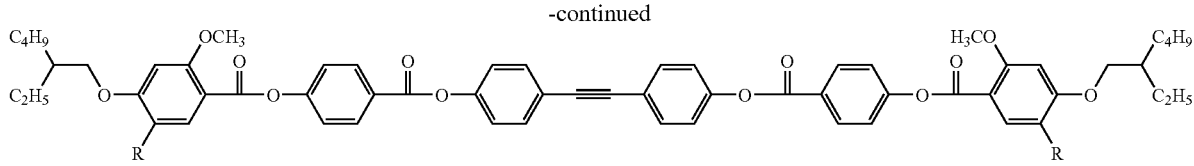
A-121; R = H
B-121; R = OCH₃
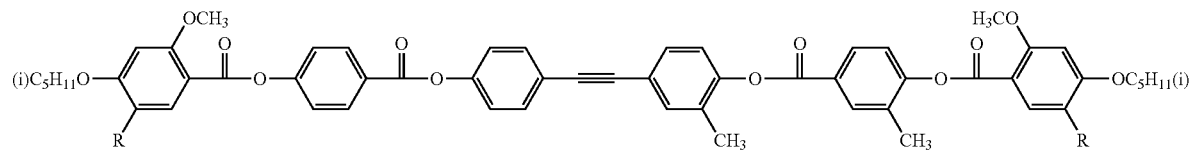
A-122; R = H
B-122; R = OCH₃
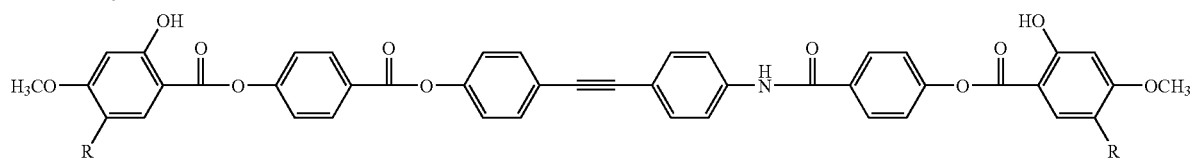
A-123; R = H
B-123; R = OCH₃
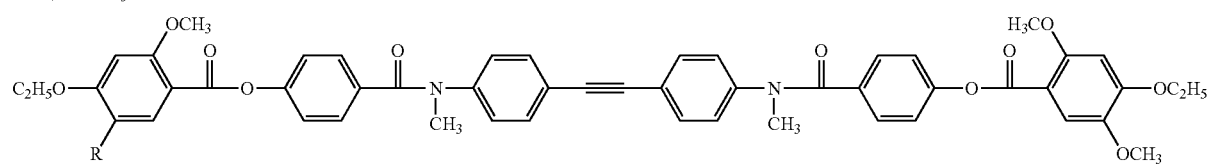
A-124; R = H
B-124; R = OCH₃
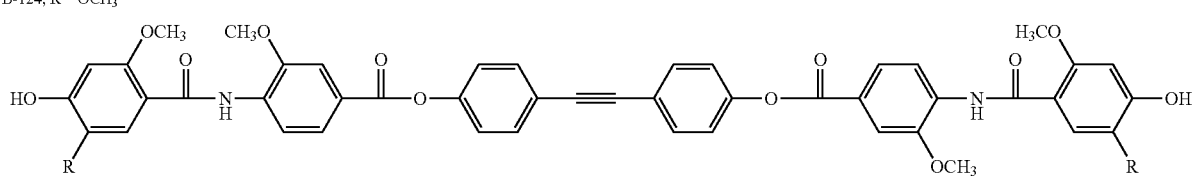
A-125; R = H
B-125; R = OCH₃
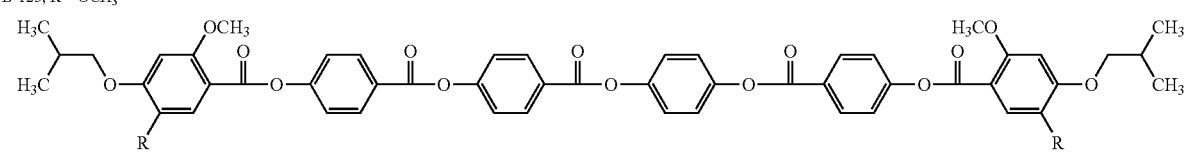
A-126; R = H
B-126; R = OCH₃
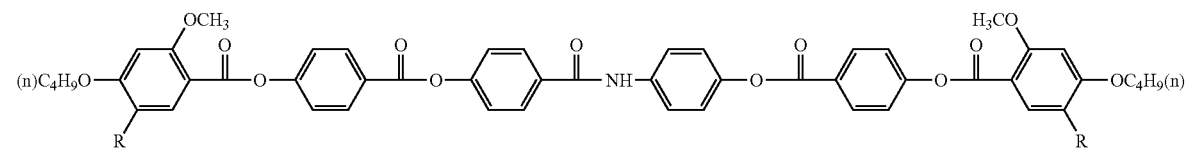
A-127; R = H
B-127; R = OCH₃
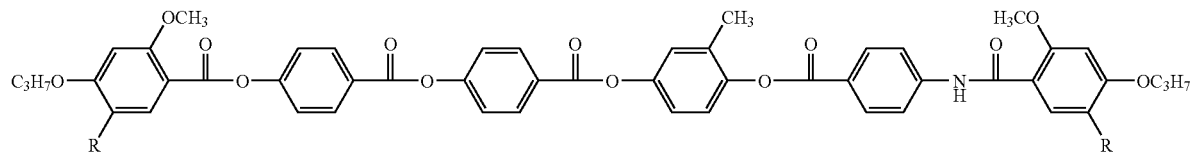
A-128; R = H
B-128; R = OCH₃
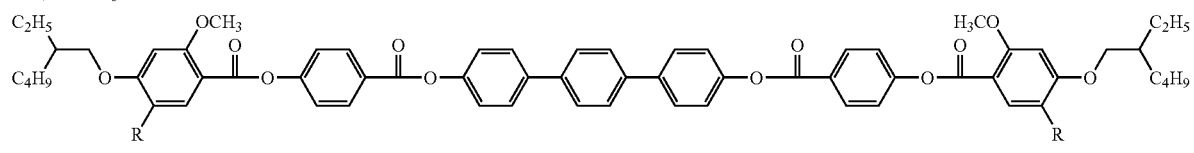

-continued
A-129; R = H
B-129; R = OCH₃
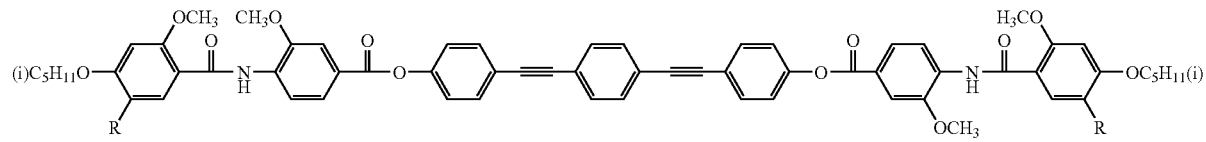
A-130; R = H
B-130; R = OCH₃
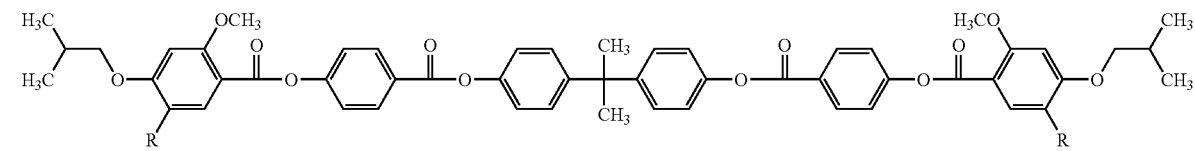
A-131; R = H
B-131; R = OCH₃
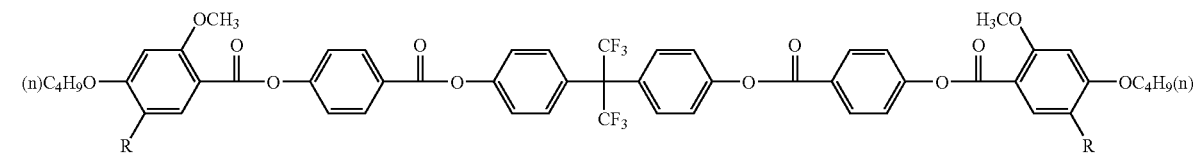
A-132; R = H
B-132; R = OCH₃
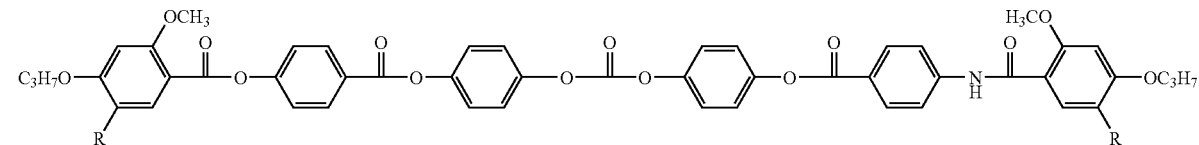
A-133; R = H
B-133; R = OCH₃
C-101
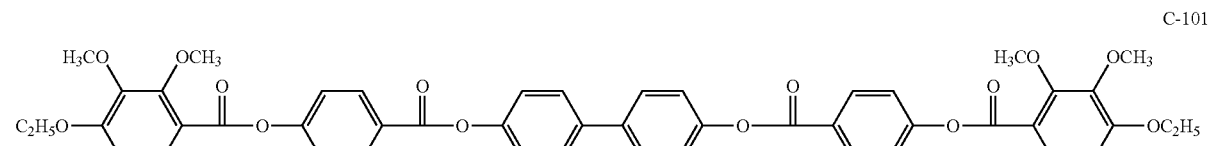
C-102
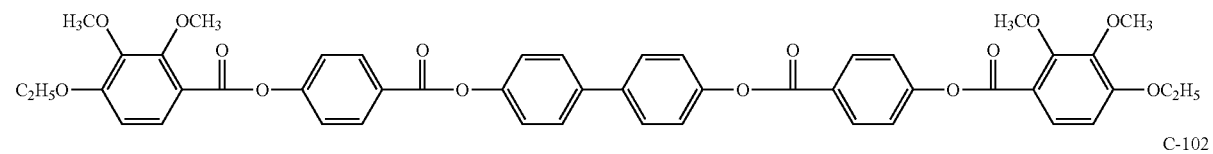
C-103
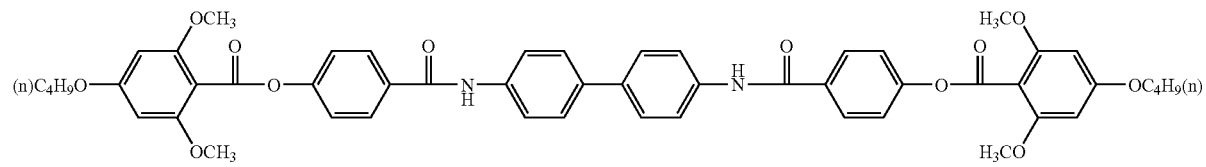
C-104
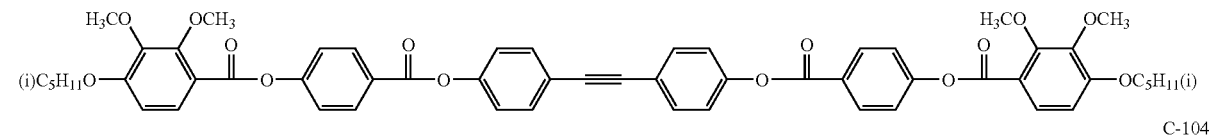
C-105
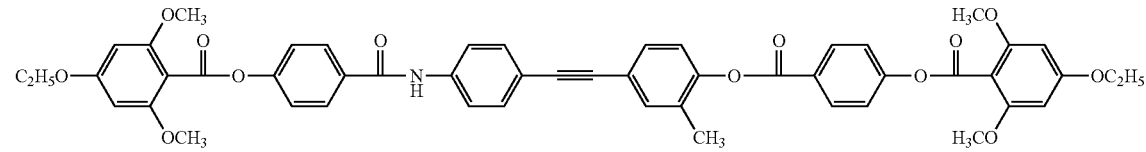
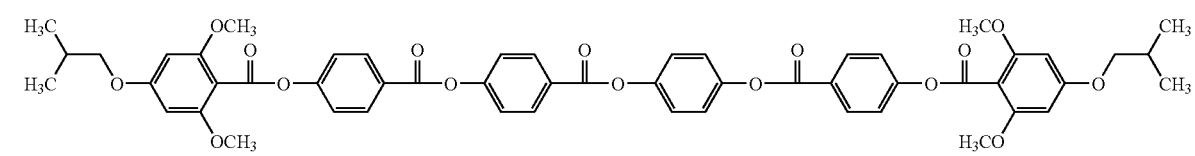

The compound represented by formula (4) can be synthesized by, after the synthesis of a substituted benzoic acid as a start, subjecting this substituted benzoic acid to an ordinary esterification reaction or amide formation reaction with a phenol derivative or an aniline derivative, whereby any type of reaction may be adopted so long as the reaction can form an ester bond or an amide bond. For example, one method comprising, after the substituted benzoic acid is converted to an acid halide via functional group conversion, condensation with a phenol derivative or aniline derivative, one method comprising dehydrating condensation of the substituted benzoic acid with a phenol derivative or aniline derivative with use of a condensing agent or a catalyst, etc. can be mentioned.

As the production method for the compound represented by formula (4), the method comprising, after converting the substituted benzoic acid to an acid halide via functional group conversion, condensing it with a phenol derivative or an aniline derivative is preferred by considering the production process, etc.

In the production method for the compound represented by formula (4), as the reaction solvent, a hydrocarbon solvent (Preferably, toluene and xylene are mentioned.), an ether solvent (Preferably, dimethyl ether, tetrahydrofuran, dioxane, etc. are mentioned.), a ketone solvent, an ester solvent, acetonitrile, dimethylformamide, dimethylacetamide, etc. can be used. These solvents may be used individually or by mixing several kinds thereof.

And preferable ones as the aforementioned solvent are toluene, acetonitrile, dimethylformamide, and dimethylacetamide.

As the reaction temperature, a range of 0 to 150° C. is preferred, a range of 0 to 100° C. is more preferred, and a range of 20° C. to 90° C. is particularly preferred.

For the present reaction, it is preferred not to use a base. In the case of using a base, either of organic or inorganic bases can be used. But, organic bases are preferred such as pyridine, tertiary alkylamines (Preferably triethylamine, ethyldiisopropylamine, etc. are mentioned.).

The compound represented by formula (4-4) or (4-5) can be synthesized by publicly known methods. For example, in the case of a compound with n–1 of 4, a starting compound having the following structure represented by formula (7) is reacted with a derivative having a reaction moiety such as a hydroxyl group, an amino group, etc. to produce the following intermediate represented by formula (8). Then, by connecting the two molecules of this intermediate with one molecule of a compound having the following structure represented by formula (9), the compound of interest can be obtained. However, the synthesis example of the compound of interest in the invention is not limited thereto.

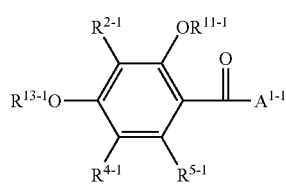

Formula (7)

(In the formula, $A^{1-1}$ represents a reactive group such as a hydroxyl group, a halogen atom, etc., $R^{11-1}$, $R^{2-1}$, $R^{13-1}$ and $R^{5-1}$ are the same as have been set forth previously, and $R^{4-1}$ is a hydrogen atom or a substituent represented by the aforementioned $OR^{14-1}$.)

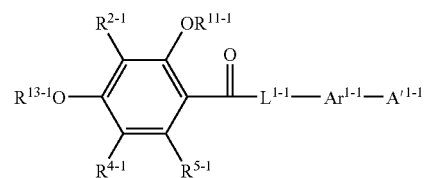

Formula (8)

(In the formula, $A'^{1-1}$ represents a reactive group such as carboxyl group, etc., and $R^{11-1}$, $R^{2-1}$, $R^{13-1}$, $R^{4-1}$, $R^{5-1}$, $Ar^{1-1}$ and $L^{1-1}$ represent the same groups as those set forth previously.)

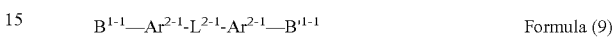

Formula (9)

(In the formula, $B^{1-1}$ and $B'^{1-1}$ represent reactive groups such as hydroxyl group, amino group, etc., and $Ar^{2-1}$ and $L^{2-1}$ each have the same meaning as $Ar^{1-1}$ and $L^{2-1}$ set forth previously.) However, the synthetic method for the compound of the invention is not limited to the above one.

As the retardation raising agent of the invention which has rod-like polarization anisotropy of from $300 \times 10^{-25}$ cm$^3$ to $2,000 \times 10^{-25}$ cm$^3$ and the distance between terminals of a molecule of from 2 nm to 10 nm, the compound represented by the following formula (5) is particularly preferred.

A detailed description on the compound represented by formula (5) is given below.

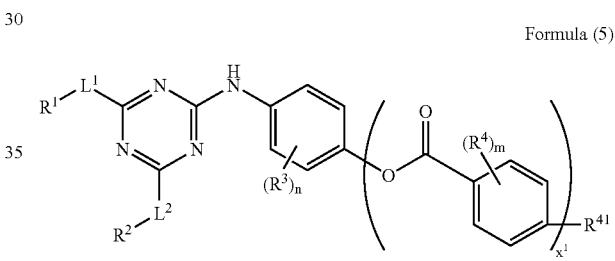

Formula (5)

In formula (5), $L^1$ and $L^2$ each independently represents a single bond or a divalent connecting group.

Specific examples of the divalent connecting group include, for example, a group represented by —NR$^8$— (wherein R$^8$ represents a hydrogen atom, an alkyl group that may have a substituent or an aryl group that may have a substituent, and a hydrogen atom is preferred), —SO$_2$—, —CO—, a substituted or unsubstituted alkylene group, a substituted or unsubstituted alkenylene group, an alkynylene group, a substituted or unsubstituted phenylene group, a substituted or unsubstituted biphenylene group, a substituted or unsubstituted naphthalene group, —O—, —S—, —SO— and the group obtained by combining two or more of these. More preferably, $L^1$ and $L^2$ each independently represents a single bond, —NR$^8$—, —O— or —S—, and still more preferably, a single bond or —NR$^8$—, and most preferably —NR$^8$—.

In formula (5), $R^1$ and $R^2$ each independently represents a hydrogen atom or a substituent. As the example of the substituent, the following groups can be applied.

The substituent represents a halogen atom (for example, fluorine atom, chlorine atom, bromine atom and iodine atom), an alkyl group (preferably, alkyl groups with a carbon number of 1 to 30; for example, methyl group, ethyl group, n-propyl group, isopropyl group, tert-butyl group, n-octyl group or 2-ethylhexyl group), a cycloalkyl group (preferably substituted or unsubstituted cycloalkyl groups with a carbon number of 3 to 30; for example, cyclohexyl group, cyclopentyl group or 4-n-dodecylcyclohexyl group), a bicycloalkyl group (preferably substituted or unsubstituted bicycloalkyl groups with a carbon number of 5 to 30; i.e., the groups obtained by removing one hydrogen atom from a bicycloalkanes with a carbon number of 5 to 30, exemplified by bicyclo[1,2,2] heptan-2-yl group, bicyclo[2,2,2]octan-3-yl group), an alkenyl group (preferably, substituted or unsubstituted alkenyl group with a carbon number of 2 to 30, for example, vinyl group or allyl group), a cycloalkenyl group (preferably, substituted or unsubstituted cycloalkenyl groups with a carbon number of 3 to 30, i.e., the mono-valent groups obtained by removing one hydrogen atom from a cycloalkane with a carbon number of 3 to 30, exemplified by 2-cyclopenten-1-yl group, 2-cyclohexen-1-yl group), a bicycloalkenyl group (substituted or unsubstituted bicycloalkenyl groups, preferably substituted or unsubstituted bicycloalkenyl groups with a carbon number of 5 to 30, i.e., mono-valent groups obtained by removing one hydrogen atom from a bicycloalkene having one double bond, exemplified by bicyclo[2,2,1]hepto-2-en-1yl group, bicyclo)2,2,2]octo-2-en-4-yl group, an alkynyl group (preferably, substituted or unsubstituted alkynyl groups with a carbon number of 2 to 30; for example, ethynyl group, propargyl group), an aryl group (preferably, substituted or unsubstituted aryl groups with a carbon number of 6 to 30; for example, phenyl group, p-tolyl group and naphthyl group), a heterocyclic group (preferably, mono-valent groups obtained by removing one hydrogen atom from a substituted or unsubstituted 5-membered or 6-membered aromatic or non-aromatic heterocyclic compound, and more preferably 5-membered or 6-membered aromatic heterocyclic groups with a carbon number of 3 to 30; exemplified by 2-furyl group, 2-thienyl group, 2-pyrimidynyl group, 2-benzothiazolyl group), cyano group, hydroxyl group, nitro group, carboxyl group, alkoxy group (preferably substituted or unsubstituted alkoxy groups with a carbon number of 1 to 30; for example, methoxy group, ethoxy group, isopropoxy group, tert-butoxy group, n-octyloxy group and 2-methoxyethoxy group), an aryloxy group (preferably, substituted or unsubstituted aryloxy groups with a carbon number of 6 to 30; for example, phenoxy group, 2-methylphenoxy group, 4-tert-butylphenoxy group, 3-nitrophenoxy group, 2-tetradecanoylaminophenoxy group), a silyloxy group (preferably, substituted or unsubstituted silyloxy groups with a carbon number of 3 to 20; for example, trimethylsilyloxy group, and tert-butyldimethylsilyloxy group), a heterocyclic oxy group (preferably, substituted or unsubstituted heterocyclic oxy groups with a carbon number of 2 to 30 such as 1-phenyltetrazol-5-oxy group, 2-tetrahydropyranyloxy group), an acyloxy group (preferably, formyloxy group, substituted or unsubstituted alkylcarbonyloxy groups with a carbon number of 2 to 30, and substituted or unsubstituted arylcarbonyloxy groups with a carbon number of 6 to 30; for example, formyloxy group, acetyloxy group, pivaloyloxy group, stearoyloxy group, benzoyloxy group, p-methoxyphenylcarbonyloxy group), a carbamoyloxy group (preferably, substituted or unsubstituted carbamoyloxy groups with a carbon number of 1 to 30; for example, N,N-dimethylcarbamoyloxy group, N,N-diethylcarbamoyloxy group, morpholinocarbonyloxy group, N,N-di-n-octylaminocarbonyloxy group and N-n-octylcarbamoyloxy group), an alkoxycarbonyloxy group (preferably, substituted or unsubstituted alkoxycarbonyloxy groups with a carbon number of 2 to 30; for example, methoxycarbonyloxy group, ethoxycarbonyloxy group, tert-butoxycarbonyloxy group and n-octylcarbonyloxy group), an aryloxycarbonyloxy group (preferably, substituted or unsubstituted aryloxycarbonyloxy groups with a carbon number of 7 to 30; for example, phenoxycarbonyloxy group, p-methoxyphenoxycarbonyloxy group and p-n-hexadecyloxyphenoxycarbonyloxy group), an amino group (preferably, amino group, substituted or unsubstituted alkylamino groups with a carbon number of 1 to 30 and substituted or unsubstituted anilino groups with a carbon number of 6 to 30, for example, amino group, methylamino group, dimethylamino group, anilino group, N-methylanilino group and diphenylamino group), an acylamino group (preferably, formylamino group, substituted or unsubstituted alkylcarbonylamino groups with a carbon number of 1 to 30, and substituted or unsubstituted arylcarbonylamino groups with a carbon number of 6 to 30; for example, formylamino group, acetylamino group, pivaloylamino group, lauroylamino group and benzoylamino group), an aminocarbonyamino group (preferably, substituted or unsubstituted aminocarbonylamino groups with a carbon number of 1 to 30, for example, carbamoylamino group, N,N-dimethylaminocarbonylamino group, N,N-diethylaminocarbonylamino group and morpholinocarbonylamino group), an alkoxycarbonylamino group (preferably, substituted or unsubstituted alkoxycarbonylamino groups with a carbon number of 2 to 30, for example, methoxycarbonylamino group, ethoxycarbonylamino group, tert-butoxycarbonylamino group, n-octadecyloxycarbonylamino group, N-methyl-methoxycarbonylamino group), an aryloxycarbonylamino group (preferably, substituted or unsubstituted aryloxycarbonylamino groups with a carbon number of 7 to 30; for example, phenoxycarbonylamino group, p-chlorophenoxycarbonylamino group, m-n-octyloxyphenoxycarbonylamino group), a sulfamoylamino group (preferably, substituted or unsubstituted sulfamoylamino groups with a carbon number of 0 to 30, for example, sulfamoylamino group, N,N-dimethylaminosulfonylamino group and N-n-octylaminosulfonylamino group), alkyl and arylsulfonylamino groups (preferably, substituted or unsubstituted alkylsulfonylamino groups with a carbon number of 1 to 30, and substituted or unsubstituted arylsulfonylamino groups with a carbon number of 6 to 30; for example, methylsulfonylamino group, butlsulfonylamino group, phenylsulfonylamino group, 2,3,5-trichlorophenylsulfonylamino group, p-methylphenylsulfonylamino group), a mercapto group and an alkylthio group (preferably, substituted or unsubstituted alkylthio group with a carbon number of 1 to 30; for example, methylthio group, ethylthio group and n-hexadecylthio group), an arylthio group (preferably, substituted or unsubstituted arylthio groups with a carbon number of 6 to 30; for example, phenylthio group, p-chlorophenylthio group and m-methoxyphenylthio group), a heterocyclic thio groups (preferably, substituted or unsubstituted heterocyclic thio group with a carbon number of 2 to 30; for example, 2-benzothiazolylthio group, 1-phenyltetrazol-5-ylthio group), a sulfamoyl group (preferably, substituted or unsubstituted sulfamoyl groups with a carbon number of 0 to 30; for example, N-ethylsulfamoyl group, N-(3-dodecyloxypropyl)sulfamoyl group, N,N-dimethylsulfamoyl group, N-acetylsulfamoyl group, N-benzoylsulfamoyl group, N—(N'-phenylcarbamoyl)sulfamoyl group), a sulfo group, alkyl and arylsulfinyl groups, (preferably, substituted or unsubstituted alkylsulfinyl groups with 1 to 30 carbon atoms and substituted or unsubstituted arylsulfinyl groups with a carbon number of 6 to 30; for example, methylsulfinyl group, ethylsulfinyl group, phenylsulfinyl group and p-methylphenylsulfinyl group), alkyl and arylsulfonyl groups (preferably, substituted or unsubstituted alkylsulfonyl groups with a carbon number of 1 to 30, and substituted or unsubstituted arylsulfonyl groups with a carbon number of 6 to 30; for example, methylsulfonyl group, ethylsulfonyl group, phenylsulfonyl group, p-methylphenylsulfonyl group), an acyl group (preferably, formyl group, substituted or unsubstituted alkylcarbonyl group with a carbon number of 2 to 30, and substituted or unsubstituted arylcarbonyl group with a carbon number of 7 to 30; for example, acetyl group and pivaloylbenzoyl group), an aryloxycarbonyl group (preferably, substituted or unsubstituted aryloxycarbonyl groups with a carbon number of 7 to 30, for example, phenoxycarbonyl group, o-chlorophenoxycarbonyl group, m-nitrophenoxycarbonyl group, and p-tert-butylphenoxycarbonyl group), an alkoxycarbonyl group (preferably, substituted or unsubstituted alkoxycarbonyl groups with a carbon number of 2 to 30; for example, methoxycarbonyl group, ethylcarbonyl group, tert-butoxycarbonyl group and n-octadecyloxycarbonyl group), a carbamoyl group (preferably, substituted or unsubstituted carbamoyl groups with a carbon number of 1 to 30; for example, carbamoyl group, N-methylcarbamoyl group, N,N-dimethylcarbamoyl group, N,N-di-n-octylcarbamoyl group and N-(methylsulfonyl)carbamoyl group), aryl and heterocyclic azo groups (preferably, substituted or unsubstituted arylazo groups with a carbon number of 6 to 30, heterocyclic azo groups with a carbon number of 3 to 30; for example, phenylazo, p-chlorophenylazo group and 5-ethylthio-1,3,4-thiadiazol-2-ylazo group), an imide group (preferably, N-succinimide group and N-phthalimide group), a phosphino group, (preferably substituted or unsubstituted phosphino groups with a carbon number of 2 to 30; for example, dimethylphosphino group, diphenylphosphino group, methylphenoxyphosphino group), a phosphinyl group (preferably, substituted or unsubstituted phosphinyl groups with a carbon number of 2 to 30; for example, phosphinyl group, dioctyloxyphosphinyl group and diethyoxyphosphinyl group), a phosphinyloxy group (preferably substituted or unsubstituted phosphinyloxy groups with a carbon number of 2 to 30; for example, diphenoxyphosphinyloxy group and dioctyloxyphosphinyloxy group), phosphinylamino group (preferably substituted or unsubstituted phosphinylamino groups with a carbon number of 2 to 30, for example, dimethoxyphosphinylamino group and dimethylaminophosphinylamino group), and a silyl group (preferably, substituted or unsubstituted silyl groups with a carbon number of 3 to 30; for example, trimethylsilyl group, tert-butyldimethylsilyl group and phenyldimethylsilyl group).

Among the substituents mentioned above, as regards those having a hydrogen atom, the hydrogen atom may be removed therefrom and substituted further with the group mentioned above. As such a functional group are cited the alkylcarbonylaminosulfonyl group, the arylcarbonylaminosulfonyl group, the alkylsulfonylaminocarbonyl group, and the arylsulfonylaminocarbonyl group. As specific examples of those functional groups, methylsulfonylaminocarbonyl group, p-methylphenylsulfonylaminocarbonyl group, acetylaminosulfonyl group and benzoylaminosulfonyl group.

$R^1$ and $R^2$ each are preferably a chlorine atom, an alkyl group, an alkenyl group, an aryl group, a heterocyclic group, a hydroxyl group, a carboxyl group, an alkoxy group, an aryloxy group, an acyloxy group, and an amino group. And more preferably, each of them is a chlorine atom, an alkyl group, an aryl group, a hydroxyl group and an amino group.

In formula (5), $R^3$ and $R^4$ each independently represents a substituent. As the substituent, the examples enumerated for $R^1$ and $R^2$ are mentioned.

$R^3$ is preferably a halogen atom, an alkyl group, a cyano group, a hydroxyl group, an alkoxy group, an aryloxy group, an acyloxy group, an alkoxycarbonyloxy group, an amino group and an acylamino group, and more preferably a halogen atom, an alkyl group, a cyano group, a hydroxyl group, an alkoxy group, an acyloxy group and an alkoxycarbonyloxy group.

$R^4$ is preferably a halogen atom, an alkyl group, an alkenyl group, an alkynyl group, a cyano group, a hydroxyl group, a nitro group, a carboxyl group, an alkoxy group, an aryloxy group, an acyloxy group, a carbamoyloxy group, an alkoxycarbonyloxy group, an aryloxycarbonyloxy group, an amino group, an acylamino group, an alkoxycarbonylamino group, an aryloxycarbonylamino group, a sulfamoylamino group, an alkyl and arylsulfonylamino group, a mercapto group, an alkylthio group, an arylthio group, and a sulfamoyl group, and more preferably a halogen atom, an alkyl group, a cyano group, a hydroxyl group, an alkoxy group, an acyloxy group and an alkoxycarbonyloxy group.

In formula (5), n represents an integer of from 0 to 4; and when n is 2 or more, $R_3$ existing in a plural number may be the same or different from each other, and, if possible, may combine together to form a ring. n is preferably an integer of from 0 to 2, and more preferably is 0.

In formula (5), m represents an integer of from 0 to 4; and when n is 2 or more, $R_3$ existing in a plural number may be the same or different, and, if possible, may combine together to form a ring. m is preferably an integer of from 0 to 3.

In formula (5), $X^1$ represents an integer of from 1 to 5; and when $X^1$ is 2 or more, $(R^4)_m$ existing in a plural number may be the same or different. $X^1$ is preferably an integer of from 1 to 3, and more preferably is 1 or 2.

In formula (5), $R^{41}$ represents a hydrogen atom or a substituent. As the substituent, the examples enumerated as $R^1$ and $R^2$ are mentioned. Preferably the substituent is a halogen atom, an alkyl group, a cyano group, a hydroxyl group, an alkoxy group, an aryl group, an alkoxycarbonyl group, an acyloxy group or an alkoxycarbonyloxy group.

Formula (5) is the compound preferably represented by formula (5-2).

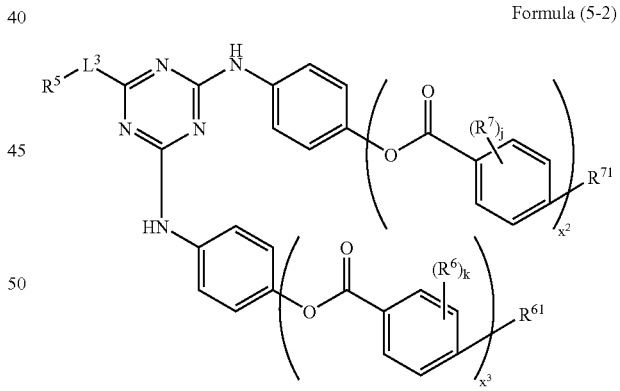

Formula (5-2)

In formula (5-2), $L^3$ represents a single bond or a divalent connecting group. As the examples of $L^3$, those enumerated as $L^1$ and $L^2$ are mentioned, and the preferable range thereof is also common to those for $L^1$ and $L^2$.

In formula (5-2), $R^5$ represents a hydrogen atom or a substituent. As the examples of $R^5$, those enumerated as $R^1$ and $R^2$ are mentioned, and the preferable range thereof is also common to those for $R^1$ and $R^2$.

In formula (5-2), $R^6$ and $R^7$ each independently represents a substituent. As the examples of $R^6$ and $R^7$, those enumerated as $R^4$ are mentioned, and the preferable range thereof is also common to that for $R^4$.

In formula (5-2), j and k each independently represents an integer of from 0 to 4. Each of j and k is preferably an integer of from 0 to 3. When j is 2 or more, $R^7$ existing in a plural number may be the same or different, and, if possible, may combine together to form a ring. When k is 2 or more, $R^6$ existing in a plural number may be the same or different, and, if possible, may combine together to form a ring.

In formula (5-2), $X^2$ represents an integer of from 1 to 5. When $X^2$ is 2 or more, $(R^7)_j$ existing in a plural number may be the same or different. $X^2$ is preferably an integer of from 1 to 3, and more preferably 1 or 2.

In formula (5-2), $R^{71}$ represents a hydrogen atom or a substituent. As the examples of $R^{71}$, those enumerated as $R^{41}$ are mentioned, and the preferable range thereof is also common to that for $R^{41}$.

In formula (5-2), $X^3$ represents an integer of from 1 to 5. When $X^3$ is 2 or more, $(R^6)_k$ existing in a plural number may be the same or different. $X^3$ is preferably an integer of from 1 to 3, and more preferably 1 or 2.

In formula (5-2), $R^{61}$ represent a hydrogen atom or a substituent. As the examples of $R^{61}$, those enumerated as $R^{41}$ are mentioned, and the preferable range thereof is also common to that for $R^{41}$.

In the following, the compound represented by formula (5), at least one of which the composition of the invention contains, is described in detail with citation of specific examples. But the invention is not limited by the following specific examples at all. With respect to each of the following compounds, a number in a parenthesis ( ) is given as Exemplary Compound (X) so far as not otherwise indicated.

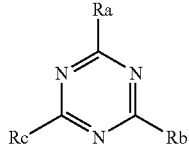

Here, Ra, Rb and Rc each are the groups represented by the following Table 1-1.

TABLE 1

| | Exemplary compound | | |
|---|---|---|---|
| | Ra | Rb | Rc |
| (1) | R-1 | R-1 | R-1 |
| (2) | R-1 | R-1 | R-13 |
| (3) | R-1 | R-1 | R-14 |
| (4) | R-1 | R-1 | R-15 |
| (5) | R-1 | R-1 | R-16 |
| (6) | R-1 | R-1 | R-17 |
| (7) | R-1 | R-1 | R-19 |
| (8) | R-1 | R-1 | R-21 |
| (9) | R-2 | R-2 | R-2 |
| (10) | R-3 | R-3 | R-3 |
| (11) | R-4 | R-4 | R-4 |
| (12) | R-4 | R-4 | R-13 |
| (13) | R-4 | R-4 | R-14 |
| (14) | R-4 | R-4 | R-16 |
| (15) | R-5 | R-5 | R-5 |
| (16) | R-6 | R-6 | R-13 |
| (17) | R-6 | R-6 | R-15 |
| (18) | R-6 | R-6 | R-16 |
| (19) | R-7 | R-7 | R-7 |
| (20) | R-8 | R-8 | R-8 |
| (21) | R-9 | R-9 | R-9 |
| (22) | R-9 | R-9 | R-19 |
| (23) | R-10 | R-10 | R-10 |

TABLE 1-continued

| | Exemplary compound | | |
|---|---|---|---|
| | Ra | Rb | Rc |
| (24) | R-11 | R-11 | R-11 |
| (25) | R-11 | R-11 | R-14 |
| (26) | R-11 | R-11 | R-17 |
| (27) | R-12 | R-12 | R-12 |
| (28) | R-6 | R-20 | R-20 |
| (29) | R-22 | R-22 | R-1 |
| (30) | R-23 | R-23 | R-1 |
| (31) | R-22 | R-23 | R-1 |
| (32) | R-23 | R-16 | R-1 |
| (33) | R-1 | R-11 | R-14 |

Here the groups for R-1 to R-23 in Table 1 are as follows.

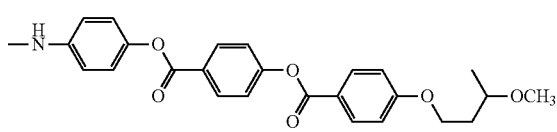
(R-1)

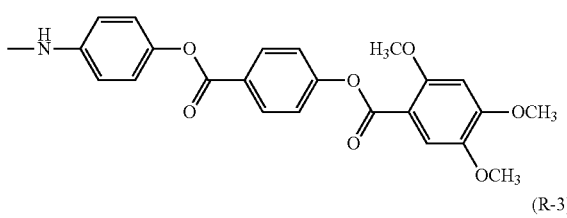
(R-2)

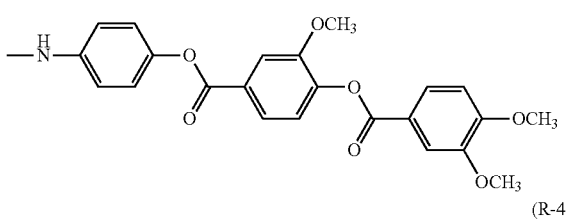
(R-3)

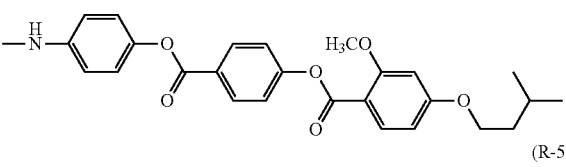
(R-4)

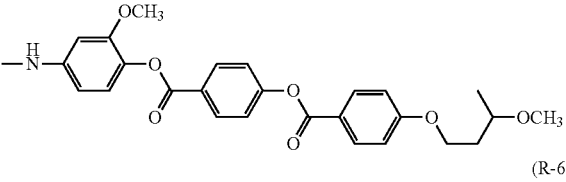
(R-5)

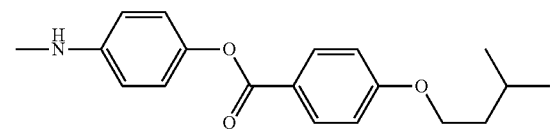
(R-6)

-continued

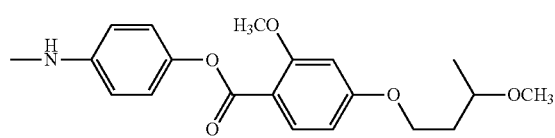
(R-7)

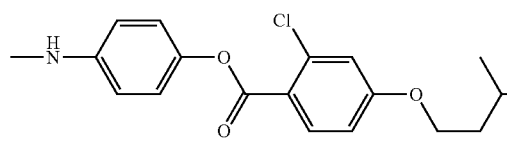
(R-8)

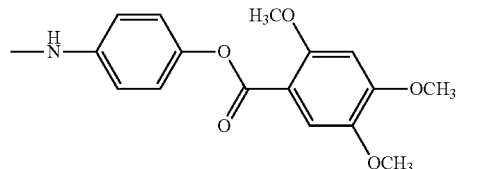
(R-9)

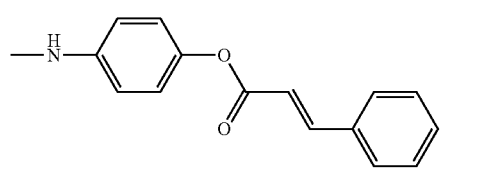
(R-10)

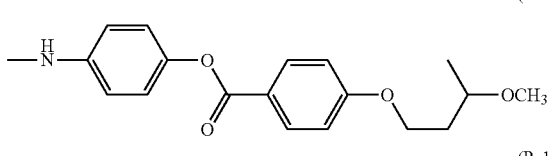
(R-11)

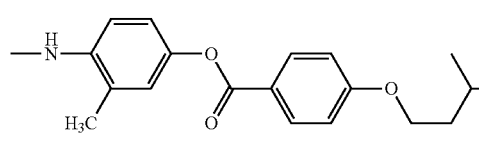
(R-12)

(R-13)

(R-14)

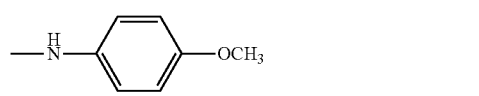
(R-15)

—Cl
(R-16)

—OH
(R-17)

—OCH$_3$
(R-18)

(R-19)

-continued

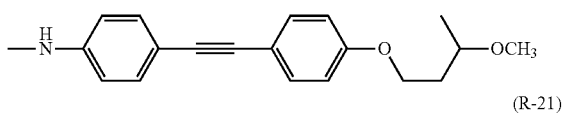
(R-20)

(R-21)

(R-22)

(R-23)

In the invention it is necessary to use at least one retardation raising agent comprising molecules having high rod-like polarizability anisotropy in an amount of from 0.1 to 30 mass % based on the cellulose acylate, preferably from 0.5 to 20 mass %, more preferably from 1 to 15 mass %, and especially preferably from 1 to 10 mass %. When two kinds of retardation raising agents are used, it is preferred that the total amount satisfies the above range.

[Retardation Raising Agent Comprising Molecules Having High Plane Polarizability Anisotropy]

In the next place, a retardation raising agent having high plane polarizability anisotropy of a molecule is explained in detail. A retardation raising agent comprising molecules having high plane polarizability anisotropy can be obtained by mutually linking the conformation of planar molecules of a compound having a high planar property such as an aromatic ring by hydrogen bonds or conjugated bonds in the form of fixation.

The polarizability of a molecule can be found by the computation using a molecular orbital method or a density functional method. It is necessary that the plane polarizability anisotropy represented by the following expression (2) should be from $300 \times 10^{-25}$ cm$^3$ to $1{,}500 \times 10^{-25}$ cm$^3$. When the plane polarizability anisotropy is smaller than the lower bound, the retardation exhibition of the cellulose acylate is small, so that not preferred. On the other hand, when the plane polarizability anisotropy is too great over the upper bound, the compatibility of the retardation raising agent with the cellulose acylate is deteriorated, as a result a problem, e.g., the occurrence of bleed-out of the retardation raising agent, is liable to arise. The plane polarizability anisotropy of a retardation raising agent is preferably from $350 \times 10^{-25}$ cm$^3$ to $1{,}500 \times 10^{-25}$ cm$^3$.

$$\Delta\alpha = (\alpha x + \alpha y)/2 - \alpha z \qquad \text{Expression (2)}$$

wherein αx is the largest constituent of the characteristic values obtained after polarizability tensor is made diagonal, αy is the constituent next to the largest constituent of the characteristic values obtained after polarizability tensor is made diagonal (that is, the second, largest constituent of the characteristic values obtained after polarizability tensor is made diagonal), and αz is the smallest constituent of the characteristic values obtained after polarizability tensor is made diagonal.

As the retardation raising agent having plane polarizability anisotropy of from $300 \times 10^{-25}$ cm$^3$ to $1,500 \times 10^{-25}$ cm$^3$ and the distance between terminals of a molecule of from 2 to 10 nm for use in the invention, a compound represented by the following formula (6) is particularly preferred.

Formula (6):

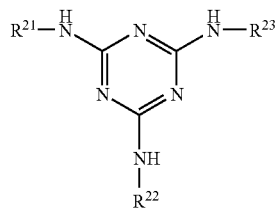

wherein $R^{21}$, $R^{22}$ and $R^{23}$ each represents an alkyl group, an alkenyl group, an aromatic ring group or a heterocyclic group.

The compound represented by formula (6) is described in detail below.

$R^{21}$, $R^{22}$ and $R^{23}$ each represents an alkyl group, an alkenyl group, an aromatic ring group or a heterocyclic group as described above, more preferably an aromatic ring or a heterocyclic ring. The aromatic ring represented by $R^{21}$, $R^{22}$ and $R^{23}$ is more preferably phenyl or naphthyl. The aromatic ring or the heterocyclic ring represented by $R^{21}$, $R^{22}$ and $R^{23}$ may have a substituent. The examples of the substituents include a halogen atom, a hydroxyl group, a cyano group, a nitro group, a carboxyl group, an alkyl group, an alkenyl group, an aryl group, an alkoxyl group, an alkenyloxy group, an aryloxy group, an acyloxy group, an alkoxycarbonyl group, an alkenyloxycarbonyl group, an aryloxycarbonyl group, a sulfamoyl group, an alkyl-substituted sulfamoyl group, an alkenyl-substituted sulfamoyl group, an aryl-substituted sulfamoyl group, s sulfonamido group, a carbamoyl group, an alkyl-substituted carbamoyl group, an alkenyl-substituted carbamoyl group, an aryl-substituted carbamoyl group, an amido group, an alkylthio group, an alkenylthio group, an arylthio group and an acyl group.

When $R^{21}$, $R^{22}$ and $R^{23}$ each represents a heterocyclic group, it is preferred that the heterocyclic ring has aromaticity. The heterocyclic ring having aromaticity is generally an unsaturated heterocyclic ring, preferably a heterocyclic ring having the most numerous double bonds. The heterocyclic ring is preferably 5-, 6- or 7-membered ring, more preferably a 5- or 6-membered ring, and most preferably a 6-membered ring. The hetero atom of the heterocyclic ring is preferably a nitrogen atom, a sulfur atom or an oxygen atom, especially preferably a nitrogen atom. As the heterocyclic ring having aromaticity, a pyridine ring (as the heterocyclic group, 2-pyridyl or 4-pyridyl) is especially preferred. The heterocyclic group may have a substituent. The examples of the substituents of the heterocyclic group are the same as the examples of the substituents described above. These substituents may further be substituted with the above substituents.

The preferred examples of the compounds represented by formula (6) are shown below, but it should not be construed that the invention is limited to these specific examples.

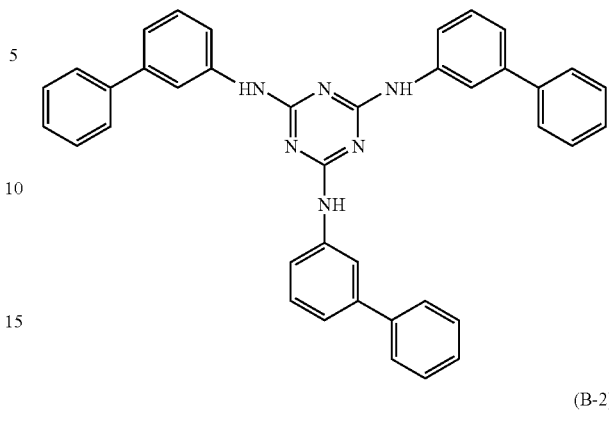

(B-1)

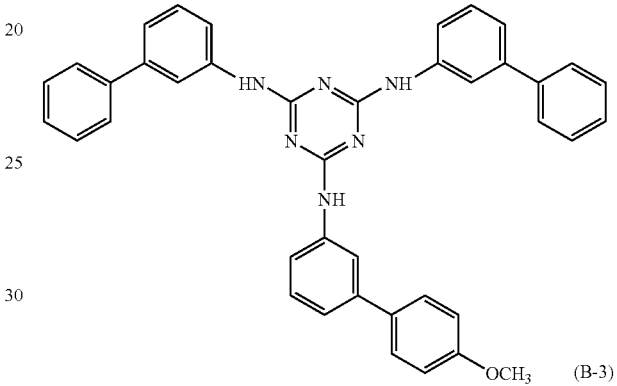

(B-2)

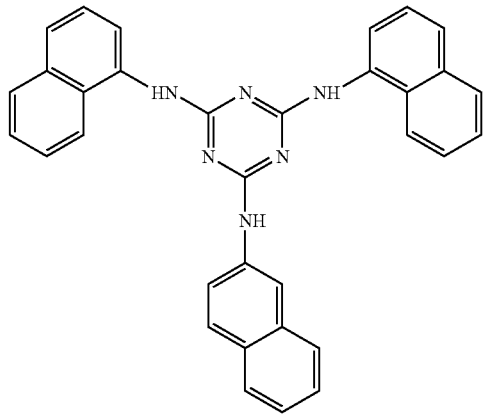

(B-3)

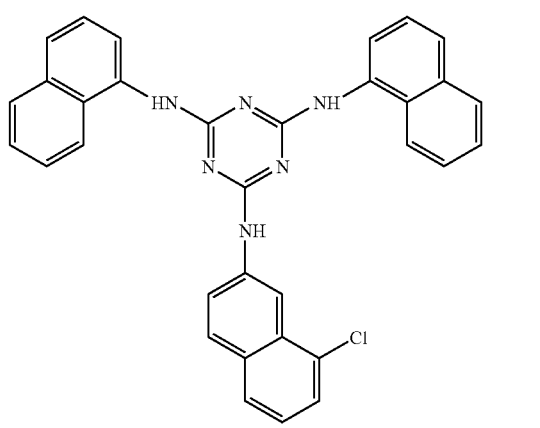

(B-4)

In the invention it is necessary to use at least one retardation raising agent comprising molecules having high plane polarizability anisotropy in an amount of from 0.1 to 30 mass % based on the cellulose acylate, preferably from 0.5 to 20 mass %, more preferably from 1 to 15 mass %, and especially preferably from 1 to 10 mass %. When two kinds of retardation raising agents are used, it is preferred that the total amount satisfies the above range.

It is particularly preferred to use the retardation raising agent having high rod-like polarizability anisotropy of a molecule and the retardation raising agent having high plane polarizability anisotropy of a molecule of the invention in combination for restraining the bleed-out of the retardation raising agents more effectively. When they are used in combination, it is preferred that the total amount satisfies the same numerical range as in the case of using one kind. The mixing ratio of these retardation raising agents is preferably from 0.01 to 100 mass parts of the retardation raising agent having high plane polarizability anisotropy of a molecule, more preferably from 0.1 to 10 mass parts, per 1 mass part of the retardation raising agent having high rod-like polarizability anisotropy of a molecule.

[Cellulose Acylate]

The cellulose acylate for use in the invention will be described in the next place.

The degree of substitution of cellulose acylate means the proportion of acylation of three hydroxyl groups present at the constitutional unit of the cellulose (a glucose group which undergoes $\beta 1 \rightarrow 4$ glycoside bonding). The degree of substitution can be computed by measuring the amount of a bonded fatty acid per the weight of the constitutional unit of the cellulose. The measurement method is carried out according to ASTM-D817-91.

The cellulose acylate in the invention is preferably cellulose acetate having the degree of acetylation of from 2.6 to 3.0. The degree of acetylation is more preferably from 2.7 to 2.95.

Further, as another preferred cellulose acylate in the invention, it is preferred to use mixed fatty acid esters having an acetyl group and an acyl group having 3 or 4 carbon atoms and the degree of acylation of from 2 to 2.9. The degree of acylation is more preferably from 2.2 to 2.85, and most preferably from 2.5 to 2.8. The degree of acetylation is preferably less than 2.5, more preferably less than 1.9.

The proportion of the degree of acylation at the 6-position to the total degree of acylation is preferably 0.25 or higher, more preferably 0.3 or higher.

The cellulose acylate for use in the invention preferably has a weight average polymerization degree of from 350 to 800, and more preferably from 370 to 600. The cellulose acylate for use in the invention preferably has a number average molecular weight of from 70,000 to 230,000, more preferably from 75,000 to 230,000, and most preferably from 78,000 to 120,000.

The cellulose acylate in the invention can be synthesized by using an acid anhydride or an acid chloride as an acylating agent. When the acylating agent is an acid anhydride, an organic acid (e.g., acetic acid) or methylene chloride is used as a reaction solvent. A protonic catalyst such as sulfuric acid is used as a catalyst. When the acylating agent is an acid chloride, a basic compound is used as a catalyst. In the most general synthesis method from the industrial standpoint, cellulose is esterified with a mixed organic acid component containing an organic acid corresponding to the acetyl group and other acyl group (for example, acetic acid, propionic acid, and butyric acid) or an acid anhydride thereof (e.g., acetic anhydride, propionic anhydride, and butyric anhydride) to thereby synthesize cellulose ester.

In this method, celluloses such as cotton linter and wood pulp are activated with an organic acid such as acetic acid and then esterified using a mixed liquid of the foregoing organic acid component in the presence of a sulfuric acid catalyst in many cases. The organic acid anhydride component is in general used in an excessive amount against the amount of the hydroxyl groups present in the cellulose. In this esterification treatment, in addition to the esterification reaction, a hydrolysis reaction (depolymerization reaction) of the cellulose principal chain ($\beta 1 \rightarrow 4$ glycoside bond) proceeds. When the hydrolysis reaction of the principal chain proceeds, the degree of polymerization of the cellulose ester is lowered, whereby the physical properties of the cellulose ester as produced is lowered. For that reason, it is preferred that the reaction condition such as reaction temperature is determined while taking into consideration the degree of polymerization and molecular weight of the cellulose ester to be obtained.

In order to obtain a cellulose ester having a high degree of polymerization (high molecular weight), it is important to regulate the maximum temperature in the esterification reaction step at not higher than 50° C. The maximum temperature is regulated preferably at from 35 to 50° C., and more preferably at from 37 to 47° C. When the reaction temperature is higher than 35° C., the esterification reaction may proceed smoothly. When the reaction temperature is not higher than 50° C., the reaction is not accompanied by a disadvantage such as the reduction of the degree of polymerization of the cellulose ester.

After the esterification reaction, by stopping the reaction while suppressing the temperature rise, the lowering of the degree of polymerization can be further suppressed, and cellulose ester having a high degree of polymerization can be synthesized. That is, when a reaction stopping agent (e.g., water and acetic acid) is added to the reaction system after completion of the reaction, the excessive acid anhydride that has not contributed to the esterification reaction is hydrolyzed to form a corresponding organic acid as a by-product. This hydrolysis reaction is accompanied by vigorous heat generation, so that the temperature in the reaction vessel increases. When the addition rate of the reaction stopping agent is not too high, there arise no problems such that the occurrence of abrupt heat generation over the cooling capacity of the reaction vessel expedites the hydrolysis reaction of the cellulose principal chain to thereby lower the degree of polymerization of the cellulose ester to be obtained. Further, a part of the catalyst is coupled with the cellulose during the esterification reaction, and the major part thereof is dissociated from the cellulose during the addition of the reaction stopping agent. When the rate of addition of the reaction stopping agent is not too high, the reaction time for dissociating the catalyst is sufficiently secured, so that a problem that a part of the catalyst remains in the coupled state with the cellulose is difficult to occur. A cellulose ester in which a strong acid catalyst is partially coupled is very poor in stability, so that it is readily decomposed by heat at the time of drying of the product and the like, which leads to the lowering of the degree of polymerization. For these reasons, it is preferred that after the esterification reaction, the reaction stopping agent is added preferably for 4 minutes or more, and more preferably for from 4 to 30 minutes, to thereby stop the reaction. Incidentally, when the time of addition of the reaction stopping agent is less than 30 minutes, the industrial productivity is not preferably lowered.

In general, water or an alcohol capable of decomposing acid anhydrides is used as the reaction stopping agent. However, in the invention, in order to avoid the deposition of a triester having low solubility in various organic solvents, a mixture of water and an organic acid is preferably used as the reaction stopping agent. When the esterification reaction is performed under the above condition, a cellulose ester with high molecular weight having a weight average polymerization degree of 500 or more can be easily synthesized.

<Ultraviolet Absorber>

The cellulose acylate film of the invention may contain an ultraviolet absorber other than the foregoing retardation raising agent.

As the ultraviolet absorber, for example, an oxybenzophenone based compound, a benzotriazole based compound, a salicylic acid ester based compound, a benzophenone based compound, a cyano acrylate based compound, and a nickel complex salt based compound can be enumerated. Of these, a benzotriazole based compound which is less in coloration is preferable. Also, an ultraviolet absorber as described in JP-A-10-182621 and JP-A-8-337574 and a high molecular ultraviolet absorber as described in JP-A-6-148430 are preferably used. In the case where the cellulose acylate film of the invention is used as a protective film of a polarizing plate, as the ultraviolet absorber, one having less absorption of visible light having an excellent ability for absorbing ultraviolet rays having a wavelength of not more than 370 nm from the viewpoint of preventing deterioration of a polarizer or a liquid crystal and having less absorption of visible light having a wavelength of 400 nm or more from the viewpoint of liquid crystal display properties is preferable.

Specific examples of the benzotriazole based ultraviolet absorber which is useful in the invention include 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl)benzotriazole, 2,2-methylene-bis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2-(2H-benzotriazol-2-yl)-6-(linear or side chain decyl)-4-methylphenol, and a mixture of octyl-3-[3-tert-butyl-4-hydroxy-5-(5-chloro-2H-benzotriazol-2-yl)phenyl]propionate and 2-ethylhexyl-3-[3-tert-butyl-4-hydroxy-5-(5-chloro-2H-benzotriazol-2-yl)phenyl]propionate. However, it should not be construed that the invention is limited thereto.

Also, commercially available products such as TINUVIN 109, TINUVIN 171, TINUVIN 326, and TINUVIN 328 (all of which are manufactured by Ciba Speciality Chemicals) can be preferably used.

The addition amount of the ultraviolet absorber is preferably 0.1 mass % to 10 mass % based on the cellulose acylate.

[Preparation of Cellulose Acylate Film]

The cellulose acylate film in the invention can be produced according to a solvent casting method. In the solvent casting method, the film is produced with a solution (dope) having an cellulose acylate dissolved in an organic solvent.

The organic solvent preferably includes a solvent selected from an ether having from 3 to 12 carbon atoms, a ketone having from 3 to 12 carbon atoms, an ester having from 3 to 12 carbon atoms, and a halogenated hydrocarbon having from 1 to 6 carbon atoms.

The ether, the ketone and the ester may each have a cyclic structure. A compound containing any two or more of functional groups of the ether, the ketone and the ester (that is, —O—, —CO—, and —COO—) can also be used as the organic solvent. The organic solvent may contain other functional group such as an alcoholic hydroxyl group. In the case of using an organic solvent containing two or more kinds of functional groups, it is preferable that the number of carbon atoms thereof falls within the foregoing preferred range of the number of carbon atoms of the solvent containing any functional group.

The examples of the ethers having from 3 to 12 carbon atoms include diisopropyl ether, dimethoxymethane, dimethoxyethane, 1,4-dioxane, 1,3-dioxolan, tetrahydrofuran, anisole, and phenetole.

The examples of the ketones having from 3 to 12 carbon atoms include acetone, methyl ethyl ketone, diethyl ketone, diisobutyl ketone, cyclohexanone, and methylcyclohexanone.

The examples of the esters having from 3 to 12 carbon atoms include ethyl formate, propyl formate, pentyl formate, methyl acetate, ethyl acetate, and pentyl acetate.

The examples of the organic solvents containing two or more kinds of functional groups include 2-ethoxyethyl acetate, 2-methoxyethanol, and 2-butoxyethanol.

The number of carbon atoms of the halogenated hydrocarbon is preferably 1 or 2, and most preferably 1. The halogen of the halogenated hydrocarbon is preferably chlorine. The proportion of the hydrogen atom of the halogenated hydrocarbon as substituted with the halogen is preferably from 25 to 75 mol %, more preferably from 30 to 70 mol %, still more preferably from 35 to 65 mol %, and most preferably from 40 to 60 mol %. Methylene chloride is a representative halogenated hydrocarbon.

A mixture of two or more kinds of organic solvents can be used.

The cellulose acylate solution can be prepared by a general method including the treatment at a temperature of 0° C. or higher (normal temperature or high temperature). The preparation of the solution can be carried out according to a preparation method of a dope and a device in the usual solvent casting method. Incidentally, in the case of the general method, it is preferred to use a halogenated hydrocarbon (in particular, methylene chloride) as the organic solvent.

The amount of the cellulose acylate is preferably adjusted such that it is contained in an amount of from 10 to 40 mass % in the resulting solution. The amount of the cellulose acylate is more preferably from 10 to 30 mass %. An arbitrary additive as described later may be added in the organic solvent (prime solvent).

The solution can be prepared by stirring the cellulose acylate and the organic solvent at a normal temperature (from 0 to 40° C.). The solution with high concentration may be stirred under a pressurizing and heating condition. Specifically, the cellulose acylate and the organic solvent are put in a pressure vessel, and after closing the vessel, the mixture is stirred under a pressure while heating at a temperature in the range of from the boiling point of the solvent at a normal temperature to a temperature at which the solvent is not boiled. The heating temperature is usually 40° C. or higher, preferably from 60 to 200° C., and more preferably from 80 to 110° C.

The respective components may be previously roughly mixed and then put in the vessel. Alternatively they may be successively put in the vessel. The vessel must be constructed such that stirring can be achieved. The vessel can be pressurized by the injection of inert gas such as nitrogen gas. Further, an increase of the vapor pressure of the solvent due to heating may be utilized. Alternatively, after closing the vessel, the respective components may be added under the application of pressure.

In the case of heating, it is preferable that the heating is carried out from the outside of the vessel. For example, a jacket type heating device can be employed. Further, the whole of the vessel can be heated by providing a plate heater in the outside of the vessel, piping and circulating a liquid.

It is preferred to provide stirring blades in the inside of the vessel and perform stirring with the stirring blades. As the stirring blade, one having a length such that it reaches the vicinity of the wall of the vessel is preferred. It is preferred to provide scraping blades for renewing a liquid film on the wall of the vessel.

The vessel may be equipped with a measuring instrument such as a pressure gauge and a thermometer. The respective components are dissolved in the solvent within the vessel. A prepared dope is cooled and then taken out from the vessel, or is taken out from the vessel and then cooled with a heat exchanger and the like.

The solution can also be prepared by a dissolution method under cooling. According to the dissolution method under cooling, it is possible to dissolve the cellulose acylate even in an organic solvent capable of hardly dissolving the cellulose acylate therein by a usual dissolution method. Incidentally, the dissolution method under cooling has an effect of rapidly obtaining a uniform solution even by using a solvent capable of dissolving the cellulose acylate therein by a usual dissolution method.

In the dissolution method under cooling, first of all, the cellulose acylate is added in an organic solvent at room temperature while stirring step by step. It is preferred to adjust the amount of the cellulose acylate such that the cellulose acylate is contained in an amount of from 10 to 40 mass % in the mixture. The amount of the cellulose acylate is more preferably from 10 to 30 mass %. In addition, an arbitrary additive as described later may be added in the mixture.

In the next place, the mixture is cooled to from $-100$ to $-10°$ C. (preferably from $-80$ to $-10°$ C., more preferably from $-50$ to $-20°$ C., and most preferably from $-50$ to $-30°$ C.). The cooling can be carried out in, for example, a dry ice-methanol bath (at $-75°$ C.) or a cooled diethylene glycol solution (at from $-30$ to $-20°$ C.). By cooling, the mixture of the cellulose acylate and the organic solvent is solidified.

The cooling rate is preferably $4°$ C./min or more, more preferably $8°$ C./min or more, and most preferably $12°$ C./min or more. It is preferred that the cooling rate is fast as far as possible. However, $10,000°$ C./sec is the theoretical least upper bound, $1,000°$ C./sec is the technical least upper bound, and $100°$ C./sec is the least upper bound for practical use. Incidentally, the cooling rate is a value obtained by dividing the difference between the temperature at the time of start of cooling and the final cooling temperature by the time required for reaching the final cooling temperature from the start of cooling.

In addition, when the solid is heated to from 0 to $200°$ C. (preferably from 0 to $150°$ C., more preferably from 0 to $120°$ C., and most preferably from 0 to $50°$ C.), the cellulose acylate is dissolved in the organic solvent. The temperature elevation may be achieved by allowing it to stand at room temperature or by heating in a warm bath. The heating rate is preferably $4°$ C./min or more, more preferably $8°$ C./min or more, and most preferably $12°$ C./min or more. It is preferable that the heating rate is fast as far as possible. However, $10,000°$ C./sec is the theoretical least upper bound, $1,000°$ C./sec is the technical least upper bound, and $100°$ C./sec is the least upper bound for practical use. Incidentally, the heating rate is a value obtained by dividing the difference between the temperature at the time of start of heating and the final heating temperature by the time required for reaching the final heating temperature from the start of heating In this way, a uniform solution is obtained. Incidentally, in the case where dissolution is insufficient, the cooling or heating operation may be repeated. Whether the dissolution is sufficient or not can be judged only by visual observation of the appearance of the solution.

In the dissolution method under cooling, in order to avoid the incorporation of water content due to dew condensation at the time of cooling, it is desired to use a sealed vessel. Further, in the cooling or heating operation, when pressurization is carried out at the time of cooling or pressure reduction is carried out at the time of heating, the dissolution time can be shortened. In carrying out the pressurization or pressure reduction, it is preferred to use a pressure light vessel.

Incidentally, in a 20 mass % cellulose acetate solution (acetylation degree: 60.9%, viscosity average polymerization degree: 299) dissolved in methyl acetate by the dissolution method under cooling, according to the measurement by a differential scanning calorimeter (DSC), a pseudo phase transition temperature between a sol state and a gel state is present in the vicinity of $33°$ C., and the solution becomes in a uniform gel state at a temperature of not higher than this temperature. Accordingly, the solution must be maintained at a temperature of the pseudo phase transition temperature or higher, and preferably at a temperature of the gel phase transition temperature plus $10°$ C. or so. However, this pseudo phase transition temperature varies depending upon the degree of acetylation, viscosity average polymerization degree and solution concentration of cellulose acetate and the organic solvent to be used.

A cellulose acylate film is produced from the prepared cellulose acylate solution (dope) according to the solvent casting method. It is preferred to add a retardation raising agent to the dope. The dope is cast on a drum or band, and the solvent is vaporized to form the film. It is preferred to adjust the concentration of the dope before casting such that the solids content is from 18 to 35%. It is preferred to finish the surface of the drum or band in a mirror state. It is preferred to cast the dope on a drum or band at a surface temperature of not higher than $10°$ C.

A drying method in the solvent casting method is described, e.g., in U.S. Pat. Nos. 2,336,310, 2,367,603, 2,492, 078, 2,492,977, 2,492,978, 2,607,704, 2,739,069 and 2,739, 070, British Patents 640,731 and 736,892, JP-B-45-4554 (the term "JP-B" as used herein refers to an "examined Japanese patent publication"), JP-B-49-5614, JP-A-60-176834, JP-A-60-203430, and JP-A-62-115035. Drying on the band or drum can be carried out by blowing air or inert gas such as nitrogen.

The resulting film is stripped off from the drum or band and dried by high-temperature air whose temperature is changed successively from 100 to $160°$ C., whereby the residual solvent can be vaporized. Such a method is described in JP-B-5-17844. According to this method, the time from casting until stripping off can be shortened. In order to carry out this method, it is necessary that the dope be gelled at the surface temperature of the drum or band at the time of casting.

Using the prepared cellulose acylate solution (dope), two or more layers are cast, whereby a film can be formed. In this case, it is preferred to prepare the cellulose acylate film by the solvent casting method. The dope is cast on a drum or bad, and the solvent is vaporized to form a film. It is preferred to adjust the concentration of the dope before casting such that the solids content falls within the range of from 10 to 40 mass %. It is preferred to finish the surface of the drum or band in a mirror state.

In the case of casting a plurality of cellulose acylate solutions of two or more layers, a film may be prepared by casting solutions containing a cellulose acylate respectively from a plurality of casting nozzles capable of casting a plurality of cellulose acylate solutions provided at intervals in the advancing direction of a support while laminating. For example, methods as disclosed in JP-A-61-158414, JP-A-1-122419, and JP-A-11-198285 can be employed. A film can also be formed by casting cellulose acylate solutions from two casting nozzles. For example, methods as disclosed in JP-B-60-27562, JP-A-61-94724, JP-A-61-947245, JP-A-61-104813, JP-A-61-158413, and JP-A-6-134933 can be used. A casting method of a cellulose acylate film by encompassing the flow of a high viscosity cellulose acylate solution with a low viscosity cellulose acylate solution and simultaneously extruding the high viscosity and low viscosity cellulose acylate solutions, as described in JP-A-56-162617, can also be used.

Further, a film can be prepared by a method in which by using two casting nozzles, a film as molded on a support from a first casting nozzle is stripped off and second casting is carried out in the side coming into contact with the support surface. For example, a method as described in JP-B-44-20235 can be exemplified.

As the cellulose acylate solutions to be cast, the same solution may be used, or different cellulose acylate solutions may be used. For bringing functions to a plurality of cellulose acylate layers, the cellulose acylate solution suitable for each function may be extruded from the respective casting nozzles. In addition, the cellulose acylate solutions of the invention can be cast at the same time with other functional layers (for example, an adhesive layer, a dye layer, an antistatic layer, an antihalation layer, an ultraviolet absorbing layer, and a polarizing layer).

According a conventional single-layered solution, it is necessary to extrude a high viscosity cellulose acylate solution in high concentration for the purpose of attaining a necessary film thickness. In that case, there often occurred a problem that solids are generated due to poor stability of the cellulose acylate solution to thereby cause spitting or failure of flatness. As a method for overcoming this problem, by casting a plurality of cellulose acylate solutions from casting nozzles, high viscosity solutions can be extruded simultaneously on the support, and not only the flatness is improved and a planar film can be prepared, but also a reduction of drying load can be achieved by using the concentrated cellulose acylate solutions, so that the production speed of a film can be enhanced.

A degradation preventing agent (e.g., an antioxidant, a peroxide decomposing agent, a radical inhibitor, a metal inactivating agent, an acid scavenger, an amine and the like) may be added to the cellulose acylate film. The degradation preventing agents are disclosed in JP-A-3-199201, JP-A-5-197073, JP-A-5-194789, JP-A-5-271471, and JP-A-6-107854. The addition amount of the degradation preventing agent is preferably from 0.01 to 1 mass % of the solution (dope) to be prepared, and more preferably from 0.01 to 0.2 mass %. When the addition amount is 0.01 mass % or more, an effect of the degradation preventing agent is sufficiently exhibited and preferred. When the addition amount is 1 mass % or less, bleed-out (oozing) of the degradation preventing agent onto the film surface occurs with difficulty and preferred. As the especially preferred examples of the degradation preventing agents, butylated hydroxytoluene (BHT) and tribenzylamine (TBA) can be exemplified.

The steps from casting until post-drying may be carried out in an air atmosphere or an inert gas atmosphere such as nitrogen. As the winding machine for use in the production of the cellulose acylate film in the invention, generally used winding machines may be used. The cellulose acylate film can be wound up by a winding method such as a constant tension method, a constant torque method, a taper tension method, and a program tension control method with a fixed internal stress.

[Various Characteristics of Cellulose Acylate Film]
[Thickness of Cellulose Acylate Film]

The thickness of the cellulose acylate film of the invention is preferably from 10 to 200 μm, more preferably from 20 to 150 μm, and most preferably from 30 to 100 μm.

[Water Content of Cellulose Acylate Film]

The water content of the cellulose acylate film can be evaluated by measuring an equilibrium water content at a fixed temperature and relative humidity. The equilibrium water content is determined by after allowing a sample to stand at a fixed temperature and relative humidity for 24 hours, measuring the amount of water of the sample that has reached an equilibrium state by the Karl Fisher's method and dividing the amount of water (g) by the mass of the sample (g).

The water content of the cellulose acylate film of the invention at 25° C. and 80% RH is preferably not more than 5.0 mass %, more preferably not more than 4.3 mass %, and most preferably not more than 3.8 mass %.

<Water Vapor Permeability>

The water vapor permeability is determined by measuring the water vapor permeability of each sample and calculating the content of water (g) which is vaporized for 24 hours per 1 $m^2$ of an area according to a method as described in JIS Z0208. The water vapor permeability is of physical properties of the film closely related to the durability of a polarizing plate, and by decreasing the water vapor permeability, it is possible to improve the durability of a polarizing plate. The water vapor permeability of the cellulose acylate film of the invention is preferably from 200 $g/m^2$ to 1,700 $g/m^2$, and more preferably from 500 $g/m^2$ to 1,400 $g/m^2$.

<Saponification Treatment>

The cellulose acylate film of the invention can be used as a protective film for polarizing plate by subjecting it to an alkaline saponification treatment to impart adhesion to polyvinyl alcohol.

It is preferable that the alkaline saponification treatment of the cellulose acylate film is carried out through a cycle of dipping the film surface in an alkaline solution, neutralizing with an acidic solution, washing with water, and then drying.

Examples of the alkaline solution include a potassium hydroxide solution and a sodium hydroxide solution. A normality concentration of a hydroxide ion is preferably within the range of from 0.1 to 5.0 mol/L, and more preferably from 0.5 to 4.0 mol/L. The temperature of the alkaline solution is preferably within the range of from room temperature to 90° C., and more preferably from 40 to 70° C.

[Stretching Treatment]

The cellulose acylate film of the invention subjected to a stretching treatment can be preferably used as the protective film of a polarizing plate. It is possible to impart desired retardation to the cellulose acylate film by performing the stretching treatment, and also possible to provide the function as a retardation film. The stretching direction of the cellulose acylate film may be any of a cross direction or a machine direction.

A method for stretching in the cross direction is disclosed, e.g., in JP-A-62-115035, JP-A-4-152125, JP-A-4-284211, JP-A-4-298310, and JP-A-11-48271.

The stretching of the film is carried out at normal temperature or under a heating condition. The heating temperature is preferably not higher than the glass transition temperature of the film. The film can be stretched during drying process, and this method is especially effective in the case where a solvent remains. In the case of stretching in the machine direction, for example, by adjusting the rate of conveyance rollers of the film and making a winding up rate faster than a stripping off rate, the film is stretched. In the case of stretching in the cross direction, the film can also be stretched by conveying the film while keeping its width by a tenter and widening the width of the tenter step by step. After drying, the film can also be stretched by using stretching machine (preferably by uniaxial stretching using a long stretching machine).

The stretching magnification of the film (the elongation percentage to the film before stretching) is preferably from 3 to 200%, and more preferably from 5 to 150%. The stretching rate is preferably from 1 to 100%/min, more preferably from 5 to 80%/min, and most preferably from 10 to 60%/min.

The cellulose acylate film in the invention is preferably produced through a process of, after being stretched to the maximum stretching magnification, retaining the film at the stretching magnification lower than the maximum stretching magnification (a relaxation process) for prescribed hour. The stretching magnification in the relaxation process is preferably from 50 to 99% of the maximum stretching magnification, more preferably from 70 to 97%, and most preferably from 90 to 95%. The relaxation time is preferably from 1 to 120 seconds, and more preferably from 5 to 100 seconds.

By prescribing the respective ranges of the stretching magnification and the time in the relaxation process as above, the orientation degree of the retardation raising agent is improved, so that the cellulose acylate film having high retardation and little in the fluctuation of in-plane retardation can be obtained. Since the distance between terminals of a molecule of the retardation raising agent in the invention is long, it takes time for the orientation condition to be settled in an equilibrium condition, so that a method of controlling the orientation condition by a stretching rate and a relaxation process is especially effective.

[Retardation of Film]

In the present specification, Reλ and Rthλ respectively represent in-plane retardation and retardation in the thickness direction at the wavelength of λ nm. The Reλ is measured by making light having a wavelength of λ nm incident in the direction of normal line of the film with KOBRA 21ADH (manufactured by Oji Scientific Instruments). The Rthλ is computed by KOBRA 21 ADH on the basis of retardation values, as measured in three directions in total, of the foregoing Reλ, a retardation value as measured by making light having a wavelength of λ nm incident from a direction inclined by +40° against the normal line direction of the film while making the in-plane slow axis (judged by KOBRA 21ADH) serve as a tilt axis (rotational axis), and a retardation value as measured by making light having a wavelength of λ nm incident from a direction inclined by −40° against the normal line direction of the film while making the in-plane slow axis serve as a tilt axis (rotational axis).

Here, as virtual values of average refractive index, the values described in Polymer Handbook (John Wiley & Sons, Inc.) and various catalogues of optical films can be employed. When an average refractive index value is not known, it can be measured by an Abbe's refractometer.

The average refractive index values of major optical films are exemplified below.

That is, cellulose acylate (1.48), cycloolefin polymer (1.52), polycarbonate (1.59), polymethyl methacrylate (1.49), and polystyrene (1.59) are exemplified. By inputting the virtual value of the average refractive index and a film thickness, KOBRA 21ADH computes $n_x$ (the refractive index in the film-forming direction), $n_y$ (the refractive index in the cross direction) and $n_z$ (the refractive index in the thickness direction).

$Re_{590}$ of the cellulose acylate film of the invention is preferably from 20 to 200 nm, more preferably from 30 to 150 nm, and most preferably from 60 to 120 nm. $Rth_{590}$ is preferably from 50 to 400 nm, more preferably from 70 to 400 nm, still more preferably from 100 to 300 nm, and most preferably from 150 to 250 nm.

Further, an $Rth_{590}/Re_{590}$ ratio is preferably from 1 to 10, and more preferably from 2 to 8.

The cellulose acylate film having the above retardation value coated with an optically anisotropic layer can be used as an optical compensation film for OCB mode and TN mode.

[Photoelasticity of Cellulose Acylate Film]

The coefficient of photoelasticity of the cellulose acylate of the invention is preferably $60 \times 10^{-8}$ cm$^2$/N or less, and more preferably $20 \times 10^{-8}$ cm$^2$/N. The coefficient of photoelasticity can be found with an ellipsometer.

[Glass Transition Temperature of Cellulose Acylate]

The glass transition temperature of the cellulose acylate of the invention is preferably 120° C. or higher, and more preferably 140° C. or higher. The glass transition temperature is a value obtained as an average value of a temperature at which the base line of the film derived from the glass transition begins to change and a temperature at which the film returns to the base line when measured at a temperature up rate of 10° C./min using a differential scanning calorimeter (DSC).

<Polarizing Plate>

[Constitution of Polarizing Plate]

First of all, a protective film and a polarizer constituting the polarizing plate of the invention will be described.

The polarizing plate of the invention may have, as constitutional elements, an adhesive layer, a separate film, and a protective film in addition to a polarizer and a protective film.

(1) Protective Film

The polarizing plate of the invention has two protective films in total on the both sides of a polarizer, and at least one of the two protective films is the cellulose acylate film of the invention. Furthermore, it is preferable that at least one of the two protective films has also a function as a retardation film. When the polarizing plate of the invention is used in a liquid crystal display device, it is preferable that at least one of two polarizing plates to be disposed on the both sides of a liquid crystal cell is the polarizing plate of the invention.

It is preferable that the protective film which is used in the invention is a polymer film made of a norbornene resin, polyethylene terephthalate, polyethylene naphthalate, polycarbonate, polystyrene, polyallylate, polysulfone, a cellulose acylate, etc. It is the most preferable that the protective film which is used in the invention is a cellulose acylate film.

(2) Polarizer

The polarizer of the invention is preferably constructed of polyvinyl alcohol (PVA) and a dichroic molecule. A polyvinylene based polarizer obtained by dehydrating or dechlorinating PVA or polyvinyl chloride to form a polyene structure and orienting it as described in JP-A-11-248937 can also be used.

PVA is a polymer raw material resulting from saponification of polyvinyl acetate and may contain a component copolymerizable with vinyl acetate, such as unsaturated carboxylic acids, unsaturated sulfonic acids, olefins, and vinyl ethers. Furthermore, modified PVA containing an acetoactyl group, a sulfonic acid group, a carboxyl group, an oxyalkylene group, etc. can be used.

Though the degree of saponification of PVA is not particularly limited, it is preferably from 80 to 100% by mole, and especially preferably from 90 to 100% by mole from the viewpoints of solubility, etc. Further, though the degree of polymerization of PVA is not particularly limited, it is preferably from 1,000 to 10,000, and especially preferably from 1,500 to 5,000.

As described in Japanese Patent No. 2,978,219, for the purpose of improving the durability, the syndiotacticity of PVA is preferably 55% or more. However, as described in Japanese Patent No. 3,317,494, PVA having a syndiotacticity of from 45 to 52.5% can also be preferably used.

It is preferable that after film formation of PVA, a dichroic molecule is introduced to construct a polarizer. As a method for producing a PVA film, in general, a method in which a stock solution of a PVA based resin dissolved in water or an organic solvent is cast to form a film is preferably employed. The concentration of the polyvinyl alcohol based resin in the stock solution is usually from 5 to 20% by mass. By subjecting this stock solution to film formation, a PVA film having a film thickness of from 100 to 200 μm can be produced. The production of the PVA film can be carried out by referring to Japanese Patent No. 3,342,516, JP-A-09-328593, JP-A-2001-302817, and JP-A-2002-144401.

Though the crystallinity of the PVA film is not particularly limited, a PVA film having an average crystallinity (Xc) of from 50 to 75% by mass as described in Japanese Patent No. 3,251,073 can be used. A PVA film having a crystallinity of not more than 38% as described in JP-A-2002-236214 can also be used for the purpose of reducing in-plane hue scatter.

It is preferable that the birefringence (Δn) of the PVA film is small. A PVA film having a birefringence of not more than $1.0 \times 10^{-3}$ as described in Japanese Patent No. 3,342,516 can be preferably used. However, as described in JP-A-2002-228835, for the purpose of obtaining a high degree of polarization while avoiding cutting at the time of stretching the PVA film, the birefringence of the PVA film may be regulated at from 0.002 to 0.01; and as described in JP-A-2002-060505, a value of [(nx+ny)/2−nz] may be regulated at from 0.0003 to 0.01. The retardation (in-plan) of the PVA film is preferably from 0 nm to 100 nm, and more preferably from 0 nm to 50 nm. Furthermore, the Rth (in the film thickness direction) of the PVA film is preferably from 0 nm to 500 nm, and more preferably from 0 nm to 300 nm.

Besides, for the polarizing plate of the invention, a PVA film having a 1,2-glycol binding amount as described in Japanese Patent No. 3,021,494; a PVA film having the number of optical foreign matters of 5 μm or more of not more than 500 per 100 cm² as described in JP-A-2001-316492; a PVA film having an unevenness in hot-water cutting temperature of not more than 1.5° C. in the TD direction of the film as described in JP-A-2002-030163 and a PVA film resulting from further mixing from 1 to 100 parts by mass of a trihydric to hexahydric polyhydric alcohol such as glycerin therewith; and a PVA film resulting from film formation of a solution of PVA having a 15% by mass or more of a plasticizer mixed therewith as described in JP-A-06-289225 can be preferably used.

Though the film thickness of the PVA film before stretching is not particularly limited, it is preferably from 1 μm to 1 mm, and especially preferably from 20 to 200 μm from the viewpoints of stability of film retention and uniformity of stretching. A thin PVA film in which a stress as generated at the time of stretching in water by from 4 to 6 times becomes 10 N or less as described in JP-A-2002-236212 may be used.

As the dichroic molecule, a high-order iodine ion such as $I_3^-$ and $I_{15}^-$ or a dichroic dye can be preferably used. In the invention, a high-order iodine ion is especially preferably used. The high-order iodine ion can be formed by dipping PVA in a solution of iodine dissolved in a potassium iodide aqueous solution and/or a boric acid aqueous solution, thereby adsorbing and orienting PVA as described in *Henkoban-no-Oyo* (Application of Polarizing Plate), edited by Ryo Nagata and published by CMC Publishing Co., Ltd. and *Kogyo Zairyo* (Industrial Materials), Vol. 28, No. 7, pages 39 to 45.

When a dichroic dye is used as the dichroic molecule, an azo based dye is preferable, and a bisazo based dye and a trisazo based dye are especially preferable. As the dichroic dye, a water-soluble dichroic dye is preferable. For that reason, it is preferred to introduce a hydrophilic substituent (for example, a sulfonic acid group, an amino group, and a hydroxyl group) into the dichroic molecule and use it as a free acid or an alkali metal salt, an ammonium salt or an amine salt.

Specific examples of such a dichroic dye include benzidine based dichroic dyes (for example, C.I. Direct Red 37, Congo Red (C.I. Direct Red 28), C.I. Direct Violet 12, C.I. Direct Blue 90, C.I. Direct Blue 22, C.I. Direct Blue 1, C.I. Direct Blue 151, and C.I. Direct Green 1); diphenylurea based dichroic dyes (for example, C.I. Direct Yellow 44, C.I. Direct Red 23, and C.I. Direct Red 79); stilbene based dichroic dyes (for example, C.I. Direct Yellow 12); dinaphthylamine based dichroic dyes (for example, C.I. Direct Red 31); and J-acid based dichroic dyes (for example, C.I. Direct Red 81, C.I. Direct Violet 9, and C.I. Direct Blue 78).

Besides, C.I. Direct Yellow 8, C.I. Direct Yellow 28, C.I. Direct Yellow 86, C.I. Direct Yellow 87, C.I. Direct Yellow 142, C.I. Direct Orange 26, C.I. Direct Orange 39, C.I. Direct Orange 72, C.I. Direct Orange 106, C.I. Direct Orange 107, C.I. Direct Red 2, C.I. Direct Red 39, C.I. Direct Red 83, C.I. Direct Red 89, C.I. Direct Red 240, C.I. Direct Red 242, C.I. Direct Red 247, C.I. Direct Violet 48, C.I. Direct Violet 51, C.I. Direct Violet 98, C.I. Direct Blue 15, C.I. Direct Blue 67, C.I. Direct Blue 71, C.I. Direct Blue 98, C.I. Direct Blue 168, C.I. Direct Blue 202, C.I. Direct Blue 236, C.I. Direct Blue 249, C.I. Direct Blue 270, C.I. Direct Green 59, C.I. Direct Green 85, C.I. Direct Brown 44, C.I. Direct Brown 106, C.I. Direct Brown 195, C.I. Direct Brown 210, C.I. Direct Brown 223, C.I. Direct Brown 224, C.I. Direct Black 1, C.I. Direct Black 17, C.I. Direct Black 19, C.I. Direct Black 54, and the like; dichroic dyes as described in JP-A-62-70802, JP-A-1-161202, JP-A-1-172906, JP-A-1-172907, JP-A-1-183602, JP-A-1-248105, JP-A-1-265205, and JP-A-7-261024; and the like can also be preferably used. For the purpose of producing a dichroic molecule having a variety of hues, two or more kinds of these dichroic dyes may be blended. When the dichroic dye is used, the adsorption thickness may be 4 μm or more as described in JP-A-2002-082222.

The content of the dichroic molecule to the polyvinyl alcohol copolymer constituting the film matrix is generally adjusted to the range of from 0.01 to 5 mass %. When the content of the dichroic molecule is not lower than the greatest lower bound, good degree of polarization can be obtained, while when it is not higher than the least upper bound, a problem such as the reduction of single plate transmittance does not arise, so that preferred.

The film thickness of the polarizer is preferably from 5 to 40 μm, and more preferably from 10 to 30 μm. It is also preferred that a ratio of the thickness of the polarizer to the thickness of the protective film described later falls within the range of $0.01 \leq D_A$ (thickness of polarizer)/$D_B$ (thickness of protective film)$\leq 0.16$ (disclosed in JP-A-2002-174727).

Although the crossing angle between the slow axis of the protective film and the absorption axis of the polarizer may be an arbitrary value, it is preferably parallel or an azimuth of 45±20°.

[Production Step of Polarizing Plate]

In the next place, the production step of the polarizing plate in the invention will be described.

The production step of the polarizing plate in the invention is preferably constituted of a swelling step of a PVA film, a dyeing step, a film hardening step, a stretching step, a drying step, a sticking step of a protective film, and a drying step after the sticking step. The order of the dyeing step, the film hardening step and the stretching step may be arbitrarily varied, and some steps may be combined and carried out at the same time. Further, as described in Japanese Patent No. 3331615, water washing can be preferably carried out after the film hardening step.

In the invention, it is especially preferred to successively carry out a swelling step of a PVA film, a dyeing step, a film hardening step, a stretching step, a drying step, a sticking step of a protective film, and a drying step after the sticking step in this order. Further, an on-line plane condition inspection step may be provided during or after the above steps.

It is preferred to perform the swelling step of a PVA film with water alone. However, as disclosed in JP-A-10-153709, for the purposes of stabilizing the optical performance and avoiding the generation of wrinkles of a base material of the polarizing plate in the production line, the degree of swelling of the base material of the polarizing plate can also be controlled by swelling the base material of the polarizing plate with a boric acid aqueous solution.

Further, the temperature and the time of the swelling step can be arbitrarily determined and are preferably from 10 to 60° C. and from 5 to 2,000 seconds, respectively.

As the dyeing step of a PVA film, a method as disclosed in JP-A-2002-86554 can be employed. Further, as the dyeing method, not only dipping means but also arbitrary means such as coating or spraying of iodine or a dye solution are usable. Moreover, as disclosed in JP-A-2002-290025, a method for achieving dyeing by controlling the concentration of iodine, the dyeing bath temperature and the stretching magnification in the bath while stirring the solution in the bath can also be used.

When a high-order iodine ion is used as the dichroic molecule, in order to obtain a polarizing plate with high contrast, it is preferred to use a solution having iodine dissolved in a potassium iodide aqueous solution in the dyeing step. In this case, it is preferred that the iodine-potassium iodide aqueous solution has the amount of iodine in the range of from 0.05 to 20 g/liter, more preferably from 0.5 to 2 g/liter, the amount of potassium iodide preferably in the range of from 3 to 200 g/liter, more preferably from 30 to 120 g/liter, and the mass ratio of iodine to potassium iodide preferably in the range of from 1/1 to 2,000, more preferably from 1/30 to 120. The dyeing time is preferably from 10 to 1,200 seconds, more preferably from 30 to 600 seconds, and the solution temperature is preferably from 10 to 60° C., more preferably from 20 to 50° C.

Further, as disclosed in Japanese Patent No. 3145747, a boron compound such as boric acid and borax may be added to the dyeing solution.

In the film hardening step of a PVA film, it is preferred for the PVA film to contain a crosslinking agent by dipping the film in a crosslinking agent solution or coating the solution on the film. Further, as disclosed in JP-A-11-52130, the film hardening step can also be dividedly carried out.

As the crosslinking agent, a crosslinking agent as described in U.S. Reissue Pat. No. 232,897 can be used. As described in Japanese Patent No. 3,357,109, for the purpose of improving the dimensional stability, a polyhydric aldehyde can be used as the crosslinking agent. Of these, boric acids are most preferably used.

When boric acid is used as the crosslinking agent which is used in the film hardening step, a metal ion may be added in a boric acid-potassium iodide aqueous solution. Zinc chloride is preferable as the metal ion. However, as described in JP-A-2000-35512, a zinc halide such as zinc iodide and a zinc salt such as zinc sulfate and zinc acetate can also be used in place of the zinc chloride.

In the invention, it is preferred to prepare a boric acid-potassium iodide aqueous solution having zinc chloride added thereto and to dip a PVA film therein to achieve film hardening. The amount of boric acid is preferably from 1 to 100 g/liter, more preferably from 10 to 80 g/liter, the amount of potassium iodide is preferably from 1 to 120 g/liter, more preferably from 5 to 100 g/liter, the amount of zinc chloride is preferably from 0.01 to 10 g/liter, more preferably from 0.02 to 8 g/liter, the film hardening time is preferably from 10 to 1,200 seconds, more preferably from 30 to 600 seconds, and the solution temperature is preferably from 10 to 60° C., more preferably from 20 to 50° C.

As the stretching step, a longitudinal uniaxial stretching system as disclosed in U.S. Pat. No. 2,454,515 or a tenter system as disclosed in JP-A-2002-86554 can be preferably employed. The stretching magnification is preferably from 2 to 12 times, and more preferably from 3 to 10 times. Further, for the production of the polarizing plate in the invention, it is also preferred that the relationship among the stretching magnification, the thickness of a raw film and the thickness of a polarizer conforms to [(the thickness of a polarizer after sticking a protective film)/(the thickness of a raw film)×(total stretching magnification)>0.17] as disclosed in JP-A-2002-040256; and that the relationship between the width of a polarizer at the time of leaving a final bath and the width of the polarizer at the time of sticking a protective film conforms to [0.80≦(the width of a polarizer at the time of sticking a protective film)/(the width of the polarizer at the time of leaving a final bath)≦0.95] as disclosed in JP-A-2002-040247.

As the drying step of a PVA film, a method known by JP-A-2002-86554 can be employed. The temperature range is preferably from 30 to 100° C., and the drying time is preferably from 30 seconds to 60 minutes. Further, a thermal treatment in which the discoloration temperature in water is 50° or high as disclosed in Japanese Patent No. 3148513, and aging in an atmosphere in which the temperature and relative humidity are controlled as disclosed in JP-A-07-325215 and JP-A-07-325218 can also be preferably carried out.

The sticking step of protective film is a step for sticking two protective films on the both surfaces of the foregoing polarizer which has left the drying step. A method in which an adhesive solution is fed immediately before sticking and the polarizer and the protective films are superimposed and stuck by a pair of rollers is preferably employed. Furthermore, as described in JP-A-2001-296426 and JP-A-2002-86554, in order to suppress record groove-like irregularities caused due to stretching of the polarizer, it is preferred to adjust the water content of the polarizer at the time of sticking. In the invention, a water content of from 0.1% to 30% is preferably used.

An adhesive between the polarizer and the protective film is not particularly limited. Examples thereof include PVA based resins (including modified PVAs containing an acetoacetyl group, a sulfonic acid group, a carboxyl group, an oxyalkylene group, etc.) and boron compound aqueous solutions. Of these, PVA based resins are preferable. The thickness of the adhesive layer after drying is preferably from 0.01 to 5 μm, and especially preferably from 0.05 to 3 μm.

Furthermore, in order to improve the adhesive strength between the polarizer and the protective film, it is preferable that the protective film is subjected to a surface treatment and then provided for adhesion. Though the surface treatment method is not particularly limited, examples thereof include known methods such as a saponification method using an alkaline solution and a corona-treatment method. Furthermore, after the surface treatment, an easily adhesive layer such as a gelatin undercoating layer may be provided. As described in JP-A-2002-267839, a contact angle between the protective film surface and water is preferably not more than 50°.

The drying condition after sticking follows a method as described in JP-A-2002-86554. However, the temperature range is preferably from 30° C. to 100° C., and the drying time is preferably from 30 seconds to 60 minutes. Furthermore, it is preferred to carry out aging in an atmosphere in which the temperature and relative humidity are controlled as described in JP-A-07-325220.

With respect to the contents of elements in the polarizer, it is preferable that the contents of iodine, boron, potassium and zinc are from 0.1 to 3.0 g/m², from 0.1 to 5.0 g/m², from 0.1 to 2.00 g/m² and from 0 to 2.00 g/m², respectively. Furthermore, the content of potassium in the polarizer may be not more than 0.2% by mass as described in JP-A-2001-166143; and the content of zinc in the polarizer may be from 0.04% by mass to 0.5% by mass as described in JP-A-2000-035512.

As described in Japanese Patent No. 3,323,255, in order to enhance the dimensional stability of the polarizing plate, it is also possible to add and use an organotitanium compound and/or an organozirconium compound in any one step of the dyeing step, the stretching step and the film hardening step, thereby containing at least one compound selected from an organotitanium compound and an organozirconium compound. Furthermore, for the purpose of adjusting the hue of the polarizing plate, a dichroic dye may be added.

[Characteristics of Polarizing Plate]
(1) Transmittance and Degree of Polarization The single plate transmittance of the polarizing plate of the invention as defined by the following expression (3) is preferably from 42.5% to 49.5%, and more preferably from 42.8% to 49.0%. The degree of polarization as defined by the following expression (4) is preferably in the range of from 99.900% to 99.999%, and more preferably from 99.940% to 99.995%. The parallel transmittance is preferably in the range of from 36% to 42%, and the crossed transmittance is preferably in the range of from 0.001% to 0.05%. The dichroic ratio as defined by the following expression (5) is preferably in the range of from 48 to 1,215, and more preferably from 53 to 525.

The foregoing transmittance is defined by the following expression (3) on the basis of JIS Z-8701.

$$T = K \int S(\lambda)_y (\lambda)_\tau (\lambda) d\lambda \qquad \text{Expression (3)}$$

In the above expression, K, S(λ), y(λ), τ(λ) are as follows.

$$K = \frac{100}{\int S(\lambda)_y(\lambda) d\lambda}$$

S(λ): Spectral distribution of standard light to be used in the color display
y(λ): Color matching function in the XYZ color specification system (CIE 1931 color specification system)
τ(λ): Spectral transmittance The degree of polarization of the polarizing plate in the invention is defined by the following expression (4).

$$\text{Degree of polarization (\%)} = 100 \times \sqrt{\frac{\text{Parallel transmittance} - \text{Crossed transmittance}}{\text{Parallel transmittance} + \text{Crossed transmittance}}} \qquad \text{Expression (4)}$$

The dichroic ratio (Rd) of the polarizing plate in the invention is defined by the following expression (5).

$$\text{Dichroic ratio (Rd)} = \frac{\log\left[\frac{\text{Single plate transmittance}}{100}\left(1 - \frac{\text{Degree of polarization}}{100}\right)\right]}{\log\left[\frac{\text{Single plate transmittance}}{100}\left(1 + \frac{\text{Degree of polarization}}{100}\right)\right]} \qquad \text{Expression (5)}$$

The iodine concentration and the single plate transmittance may be in the ranges as disclosed in JP-A-2002-258051.

The parallel transmittance may be little in wavelength dependency as disclosed in JP-A-2001-083328 and JP-A-2002-022950. When the polarizing plate is disposed in the crossed Nicols configuration, the optical characteristic may be in the range as disclosed in JP-A-2001-091736; and the relationship between the parallel transmittance and the crossed transmittance may be in the range as disclosed in JP-A-2002-174728.

As disclosed in JP-A-2002-221618, a standard deviation of the parallel transmittance at every 10 nm of the wavelength of light of from 420 to 700 nm may be 3 or less, and the minimum value of (parallel transmittance)/(crossed transmittance) at every 10 nm of the wavelength of light of from 420 to 700 nm may be 300 or more.

It is also preferred that the parallel transmittance and the crossed transmittance of the polarizing plate at the wavelength of 440 nm, the parallel transmittance and the crossed transmittance of the polarizing plate at the wavelength of 550 nm, and the parallel transmittance and the crossed transmittance of the polarizing plate at the wavelength of 610 nm may be in the ranges as disclosed in JP-A-2002-258042 and JP-A-2002-258043.

(2) Hue

The hue of the polarizing plate in the invention is preferably evaluated by using a lightness index L* and chromaticness indices a* and b* in the L*a*b* color specification system as recommended as a CIE uniform perception space.

L*, a* and b* are defined by the following expression (6) by using X, Y and Z in the foregoing XYZ color specification system.

$$L^* = 116(Y/Y_0)^{\frac{1}{3}} - 16 \qquad \text{Expression (6)}$$
$$a^* = 500\left[(X/X_0)^{\frac{1}{3}} - (Y/Y_0)^{\frac{1}{3}}\right]$$
$$b^* = 200\left[(Y/Y_0)^{\frac{1}{3}} - (Z/Z_0)^{\frac{1}{3}}\right]$$

In the above expressions, $X_0$, $Y_0$, and $Z_0$ respectively represent tristimulus values of the illumination light source; and in the case of standard light C, $X_0=98.072$, $Y_0=100$, and $Z_0=118.225$, and in the case of standard light $D_{65}$, $X_0=95.045$, $Y_0=100$, and $Z_0=108.892$.

a* of a single polarizing plate is preferably in the range of from −2.5 to 0.2, and more preferably from −2.0 to 0. b* of a single polarizing plate is preferably in the range of from 1.5 to 5, and more preferably from 2 to 4.5. a* of parallel transmitted light of two polarizing plates is preferably in the range of from −4.0 to 0, and more preferably from −3.5 to −0.5. b* of parallel transmitted light of two polarizing plates is preferably in the range of from 2.0 to 8, and more preferably from 2.5 to 7. a* of crossed transmitted light of two polarizing plates is preferably in the range of from −0.5 to 1.0, and more preferably from 0 to 2. b* of crossed transmitted light of two polarizing plates is preferably in the range of from −2.0 to 2, and more preferably from −1.5 to 0.5.

The hue may be evaluated by the chromaticity coordinates (x, y) as calculated from the foregoing X, Y and Z. For example, it is preferably carried out to make the chromaticity $(x_p, y_p)$ of the parallel transmitted light of two polarizing plates and the chromaticity $(x_c, y_c)$ of the crossed transmitted light of two polarizing plates fall respectively within the ranges as disclosed in JP-A-2002-214436, JP-A-2001-166136, and JP-A-2002-169024, or to make the relationship between the hue and the absorbance fall within the range as disclosed in JP-A-2001-311827.

(3) Viewing Angle Characteristics

In the case where the polarizing plate is disposed in the crossed Nicols configuration and light having the wavelength of 550 nm is made incident, when vertical light is made incident and when light is made incident from the azimuth of 45° against the polarization axis at an angle of 40° against the normal line, it is also preferred to make the transmittance ratio and the xy chromaticity difference fall within the ranges as disclosed in JP-A-2001-166135 and JP-A-2001-166137, respectively. Further, it is also preferred that the ratio of a light transmittance in the vertical direction of a polarizing plate laminate disposed in the crossed Nicols configuration $T_0$ and a light transmittance in a direction inclined by 60° from the normal line of the laminate $T_{60}$, $(T_{60}/T_0)$, is regulated at not more than 10,000 as disclosed in JP-A-10-068817; that when natural light is made incident into the polarizing plate at an arbitrary angle from the normal line to an angle of elevation of 800, a difference of transmittance of transmitted light within the wavelength region of 20 nm in the wavelength range of its transmission spectrum of from 520 to 640 nm is regulated at not more than 6% as disclosed in JP-A-2002-139625; and that a difference in luminance of transmitted light in arbitrary places on the film apart by 1 cm is regulated at not more than 30% as disclosed in JP-A-08-248201.

(4) Durability (4-1) Wet Heat Durability

It is preferable that in the case of standing in an atmosphere at 60° C. and 90% RH for 500 hours, a rate of change in each of the light transmittance and the degree of polarization before and after standing is not more than 3% on the basis of the absolute value as disclosed in JP-A-2001-116922. In particular, it is preferred that a rate of change in the light transmittance is not more than 2% and that a rate of change in the degree of polarization is not more than 1.0% on the basis of the absolute value. It is also preferred that after standing at 80° C. and 90% RH for 500 hours, the degree of polarization is 95% or more and the single plate transmittance is 38% or more as disclosed in JP-A-07-077608.

(4-2) Dry Durability

It is also preferred that in the case of standing in a dry atmosphere at 80° C. for 500 hours, a rate of change in each of the light transmittance and the degree of polarization before and after standing is not more than 3% on the basis of the absolute value. In particular, a rate of change in the light transmittance is preferably not more than 2%, and a rate of change in the degree of polarization is preferably not more than 1.0%, and more preferably not more than 0.1% on the basis of the absolute value.

(4-3) Other Durability

In addition, it can be preferably carried out that after standing at 80° C. for 2 hours, a rate of shrinkage is regulated at not more than 0.5% as disclosed in JP-A-06-167611; that the x value and y value after allowing a polarizing plate laminate disposed in the crossed Nicols configuration on the both surfaces of a glass plate in an atmosphere at 69° C. for 750 hours are regulated so as to fall within the ranges as disclosed in JP-A-10-068818; and that a change in a spectral intensity ratio at 105 $cm^{-1}$ and 157 $cm^{-1}$ by the Raman spectroscopy after standing in an atmosphere at 80° C. and 90% RH for 200 hours is regulated so as to fall within the ranges as disclosed in JP-A-08-094834 and JP-A-09-197127.

(5) Degree of Orientation

When the degree of orientation of PVA is high, a good polarization performance is obtained. An order parameter value as computed by a measure such as polarization Raman scattering and polarization FT-IR is preferably in the range of from 0.2 to 1.0. Further, it can be preferably performed that the difference between a coefficient of orientation of a high molecular segment of the entire amorphous region of the polarizer and a coefficient of orientation (0.75 or more) of the occupied molecule is regulated to be at least 0.15 as disclosed in JP-A-59-133509; and that a coefficient of orientation of the amorphous region of the polarizer is regulated to be from 0.65 to 0.85, or a degree of orientation of a high-order iodine ion such as $I^{3-}$ and $I^{5-}$ is regulated to be from 0.8 to 1.0 in terms of an order parameter value as disclosed in JP-A-04-204907.

(6) Other Characteristics

Also, it can be preferably carried out that when heated at 80° C. for 30 minutes, a shrinkage force in the direction of the absorption axis per unit width is regulated to be 4.0 N/cm or less as disclosed in JP-A-2002-006133; that in the case of allowing the polarizing plate to stand under a heating condition at 70° C. for 120 hours, both a rate of dimensional change in the direction of the absorption axis of the polarizing plate and a rate of dimensional change in the direction of the polarization axis of the polarizing plate are regulated to fall within ±0.6% as disclosed in JP-A-2002-236213; and that the water content of the polarizing plate is regulated to be 3 mass % or less as disclosed in JP-A-2002-090546. In addition, it can be preferably carried out that the surface roughness in a direction vertical to the stretching axis is regulated to be 0.04 μm or less on the basis of the centerline average roughness as disclosed in JP-A-2000-249832; that a refractive index no in the direction of the transmitting axis is regulated to be more than 1.6 as disclosed in JP-A-10-268294; and that the relationship between the thickness of a polarizing plate and the thickness of a protective film is regulated so as to fall within the range as disclosed in JP-A-10-111411.

[Functionalization of Polarizing Plate]

The polarizing plate of the invention is preferably used as a viewing angle enlarging film for LCD, a retardation film (for example, a λ/4 plate) to be applied in a reflection type LCD, an antireflection film for improving the visibility of a display, a luminance improving film, or a functionalized polarizing plate complexed with an optical film having a functional layer such as a hard coat layer, a forward scattering layer, and an antiglare layer.

Figure 1B:
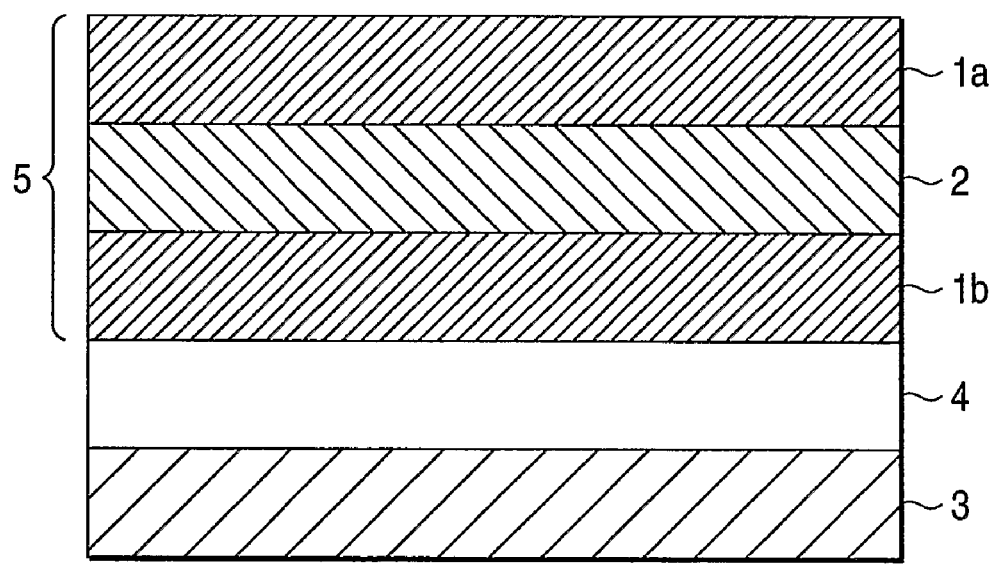

A constitutional example of the polarizing plate of the invention complexed with the foregoing functional optical film is shown in FIGS. 1A and 1B.

As a protective film on one side of a polarizing plate 5, a functional optical film 3 and a polarizer 2 may be bonded to each other via an adhesive layer that is not shown in FIG. 1A; and a functional optical film 3 may be bonded to a polarizing plate 5 having protective films 1a and 1b on the both surfaces of a polarizer 2 via an adhesive layer 4 (FIG. 1B). In the former case, an arbitrary protective film may be used for a protective film 1 of one side, and it is preferred that an optical functional layer is stuck onto the cellulose acylate film of the invention via an adhesive layer as the protective film of the other side with a polarizer 2 between, thereby constructing the functional optical film 3 as shown in FIG. 1A. It is also preferred that the release strength between the respective layers such as a functional layer and a protective film is regulated to be 4.0 N/25 mm or more as disclosed in JP-A-2002-311238. It is preferred that the functional optical film is disposed on the side of a liquid crystal module or on the opposite side to the liquid crystal module, that is, the display side or backlight side, depending upon a desired function.

The functional optical film that is used as complex with the polarizing plate of the invention will be described below.

(1) Viewing Angle Enlarging Film

The polarizing plate of the invention can be used in combination with a viewing angle enlarging film as proposed in display modes such as TN (twisted nematic), IPS (in-plane switching), OCB (optically compensatory band), VA (vertically aligned), and ECB (electrically controlled birefringence) modes.

As the viewing angle enlarging film for TN mode, WV films (manufactured by Fuji Photo Film Co., Ltd.) as described in *Journal of Printing Science and Technology*, Vol. 36, No. 3 (1999), pages 40 to 44, the issue of *Monthly Display* for August 2002, pages 20 to 24, JP-A-4-229828, JP-A-6-75115, JP-A-6-214116, JP-A-8-50206, etc. are preferably combined and used.

A preferred construction of the viewing angle enlarging film for TN mode is one having an oriented layer and an optically anisotropic layer in this order on the foregoing transparent polymer film. The viewing angle enlarging film may be stuck to the polarizing plate via an adhesive and used. However, it is especially preferable from the viewpoint of realizing a reduction in the thickness that the viewing angle enlarging film is used while serving as one of the protective films of the polarizer as described in *SID '00 Dig.*, page 551 (2000).

The oriented layer can be provided by a measure such as a rubbing treatment of an organic compound (preferably a polymer), oblique vapor deposition of an inorganic compound, and formation of a layer having micro grooves. In addition, an oriented layer, whose orientation function is generated by imparting an electrical field, imparting a magnetic field, or irradiating light is known. However, an oriented layer as formed by a rubbing treatment of a polymer is especially preferable. The rubbing treatment is preferably carried out by rubbing the surface of a polymer layer by paper or a cloth several times in a fixed direction. It is preferable that the absorption axis of the polarizer and the rubbing direction are substantially parallel to each other. With respect to the kind of the polymer to be used in the oriented layer, polyimide, polyvinyl alcohol, a polymerizable group-containing polymer as described in JP-A-9-152509, and the like can be preferably used. The thickness of the oriented layer is preferably from 0.01 to 5 μm, and more preferably from 0.05 to 2 μm.

It is preferable that the optically anisotropic layer contains a liquid crystalline compound. It is especially preferable that the liquid crystalline compound which is used in the invention is a discotic compound (discotic liquid crystal). The discotic liquid crystal molecule has a structure in which a disc-like core segment is present and side chains radially extend therefrom. In order to impart stability with time, it is also preferably carried out to further introduce a group capable of causing reaction by heat, light, etc. Preferred examples of the foregoing discotic liquid crystal are described in JP-A-8-50206.

The example of the discotic liquid crystal molecule is shown below.

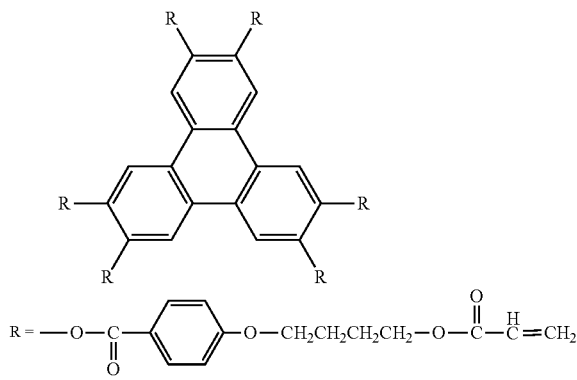

The discotic liquid crystal molecule is oriented substantially parallel to the film plane with a pre-tilt angle against the rubbing direction in the vicinity of the oriented layer, and in the opposite air surface side, the discotic liquid crystal molecule stands up and is oriented in a substantially vertical form against the plane. The whole of the discotic liquid crystal layer takes hybrid orientation, and viewing angle enlargement of TFT-LCD of a TN mode can be realized by this layer structure.

The foregoing optically anisotropic layer is generally obtained by coating a solution of a discotic compound and other compound (additionally, for example, a polymerizable monomer and a photopolymerization initiator) dissolved in a solvent on the oriented layer, drying, heating to the discotic nematic phase forming temperature, polymerizing upon irradiation of UV light or by other means, and then cooling. The discotic nematic liquid crystal phase-solid phase transition temperature of the discotic liquid crystalline compound which is used in the invention is preferably from 70 to 300° C., and especially preferably from 70 to 170° C.

Furthermore, as other compound that the discotic compound to be added in the foregoing optically anisotropic layer, any compound can be used so far as it has compatibility with the discotic compound and can give a preferred change of the tilt angle to the liquid crystalline discotic compound or does not hinder the orientation. Of these, polymerizable monomers (for example, compounds containing a vinyl group, a vinyloxy group, an acryloyl group, or a methacryloyl group), additives for orientation control in the air interface side (for example, fluorine-containing triazine compounds), and polymers (for example, cellulose acetate, cellulose acetate propionate, hydroxypropyl cellulose, and cellulose acetate butyrate) can be enumerated. Such a compound can be generally used in an amount of addition of from 0.1 to 50% by mass, and preferably from 0.1 to 30% by mass to the discotic compound.

The thickness of the optically anisotropic layer is preferably from 0.1 to 10 μm, and more preferably from 0.5 to 5 μm.

A preferred embodiment of the viewing angle enlarging film is constructed of a cellulose acylate film as a transparent base material film, an oriented layer provided thereon, and an optically anisotropic layer made of a discotic liquid crystal as formed on the subject oriented layer, in which the optically anisotropic layer is crosslinked upon irradiation with UV light.

Furthermore, in addition to the above, in the case where the viewing angle enlarging film is combined with the polarizing plate of the invention, for example, it can be preferably carried out that a retardation plate having an optical axis in a direction crossing the plate surface to exhibit anisotropy against birefringence is laminated as described in JP-A-07-198942; and that a rage of dimensional change of the protective film is made substantially equal to a rate of dimensional change of the optically anisotropic layer as described in JP-A-2002-258052. Furthermore, it can be preferably carried out that the water content of the polarizing plate to be stuck to the viewing angle enlarging film is regulated at not more than 2.4% as described in JP-A-12-258632; and that the contact angle between the surface of the viewing angle enlarging film and water is regulated at not more than 70° as described in JP-A-2002-267839.

The viewing angle enlarging film for liquid crystal cell of an IPS mode is used for optically compensating the liquid crystal molecule which orients parallel to the base material surface and improving a viewing angle characteristic of the crossed transmittance of the polarizing plate at the time of black display in the state that no electrical field is applied. In the IPS mode, black display is revealed in the state that no electrical field is applied, and the transmission axes of a pair of upper and lower polarizing plates are crossed to each other. However, when observed obliquely, the crossed angle of the transmission exes is not 90°, and light leakage is generated, resulting in a lowering of the contrast. When the polarizing plate of the invention is used in a liquid crystal cell of an IPS mode, for the purpose of lowering the light leakage, it is preferably used in combination with a viewing angle enlarging film having an in-plane retardation close to 0 and having retardation in the thickness direction as described in JP-A-10-54982.

The viewing angle enlarging film for liquid crystal cell of an OCB mode is used for optically compensating the liquid crystal molecule which orients vertically in the center of the liquid crystal layer by the application of an electrical field and orients obliquely in the vicinity of the interface of the base material and improve a viewing angle characteristic of black display. When the polarizing plate of the invention is used in a liquid crystal cell of an OCB mode, it is preferably used in combination with a viewing angle enlarging film in which a disc-like liquid crystalline compound is subjected to hybrid orientation as described in U.S. Pat. No. 5,805,253.

The viewing angle enlarging film for liquid crystal cell of a VA mode improves a viewing angle characteristic of black display in the state that the liquid crystal molecule orients vertically to the base material surface in the state that no electrical field is applied. Such a viewing angle enlarging film is preferably used in combination with a film having an in-plane retardation close to 0 and having retardation in the thickness direction as described in U.S. Pat. No. 2,866,372, a film in which a disc-like compound orients parallel to the base material, a film in which stretched films having the same in-plane retardation value are laminated and disposed such that the slow axes are crossed to each other, or a laminate of films made of a rod-like compound such as a liquid crystal molecule for the purpose of preventing deterioration of the crossed transmittance of the polarizing plate in the oblique direction.

(2) Retardation Film

It is preferable that the polarizing plate of the invention has a retardation layer. As the retardation layer in the invention, a $\lambda/4$ plate is preferable, and when the polarizing plate of the invention is laminated with a $\lambda/4$ plate, it can be used as a circularly polarizing plate. The circularly polarizing plate has a function to convert the incident light into circularly polarized light and is preferably utilized in a reflection type liquid crystal display device, a semi-transmission type liquid crystal display device, or an organic EL element.

In order to obtain substantially complete circularly polarized light in the wavelength range of visible light, it is preferable that the $\lambda/4$ plate which is used in the invention is a retardation film having a retardation (Re) of substantially $\frac{1}{4}$ of the wavelength in the wavelength range of visible light. The "retardation of substantially $\frac{1}{4}$ of the wavelength in the wavelength range of visible light" means a range which meets the relation in which in the wavelength of from 400 to 700 nm, the longer the wavelength, the larger the retardation is, a retardation value as measured at a wavelength of 450 nm (Re450) is from 80 to 125 nm, and a retardation value as measured at a wavelength of 590 nm (Re590) is from 120 to 160 nm. [(Re590−R450)≧5 nm] is more preferable, and [(Re590−R450)≧10 nm] is especially preferable.

The $\lambda/4$ plate which is used in the invention is not particularly limited so far as it meets the foregoing condition. Examples thereof include known $\lambda/4$ plates such as $\lambda/4$ plates resulting from laminating plural polymer films as described in JP-A-5-27118, JP-A-10-68816, and JP-A-10-90521; $\lambda/4$ plates resulting from stretching a single polymer film as described in WO 00/65384 and WO 00/26705; and $\lambda/4$ plates having at least one optically anisotropic layer on a polymer film as described in JP-A-2000-284126 and JP-A-2002-31717. Furthermore, the direction of the slow axis of the polymer film and the orientation direction of the optically anisotropic layer can be disposed in an arbitrary direction adaptive with the liquid crystal cell.

In the circularly polarizing plate, though the slow axis of the $\lambda/4$ plate and the transmission axis of the foregoing polarizer can be crossed to each other at an arbitrary angle, they are preferably crossed to each other at an angle within the range of 45°±20°. However, the slow axis of the $\lambda/4$ plate and the transmission axis of the foregoing polarizer may be crossed to each other at an angle outside the foregoing range.

When the $\lambda/4$ plate is constructed by laminating a $\lambda/4$ plate and a $\lambda/2$ plate, it is preferred to stick the both plates in such a manner that an angle between the in-plane slow axes of the $\lambda/4$ plate and the $\lambda/2$ plate and the transmission axis of the polarizing plate is 75° and 15°, respectively.

(3) Antireflection Film

The polarizing plate of the invention can be used in combination with an antireflection film. As the antireflection film, any of a film having a reflectance of about 1.5%, in which only a single layer made of a low refractive index raw material such as a fluorine based polymer is imparted or a film having a reflectance of not more than 1% utilizing multilayered interference of a thin film can be used. In the invention, a construction comprising a transparent support having laminated thereon a low refractive index layer and at least one layer having a refractive index higher than the low refractive index layer (namely, a high refractive index layer and a middle refractive index layer) is preferably used. Antireflection films as described in *Nitto Giho*, Vol. 38, No. 1, May 2000, pages 26 to 28 and JP-A-2002-301783 can also be preferably used.

The refractive index of each of the layers meets the following relation.

(Refractive index of high refractive index layer)>(Refractive index of middle refractive index layer)>(Refractive index of transparent support)>(Refractive index of low refractive index layer)

As the transparent support to be used in the antireflection film, a transparent polymer film which is used in the protective film of the foregoing polarizer can be preferably used.
(Low Refractive Index Layer)

The refractive index of the low refractive index layer is from 1.20 to 1.55, and preferably from 1.30 to 1.50. The low refractive index layer is preferably used as an outermost layer having scratch resistance or antifouling properties. For the purpose of improving the scratch resistance, it is preferably carried out to impart slipperiness to the surface by using a raw material containing a silicone group or fluorine.

As the fluorine-containing compound, for example, compounds as described in JP-A-9-222503, paragraphs [0018] to [0026]; JP-A-11-38202, paragraphs [0019] to [0030]; JP-A-2001-40284, paragraphs [0027] to [0028]; and JP-A-2000-284102 can be preferably used.

The silicone-containing compound is preferably a compound having a polysiloxane structure, and useful examples thereof include reactive silicones (for example, SILAPLANE (manufactured by Chisso Corporation) and polysiloxanes containing a silanol group on the both terminals thereof (JP-A-11-258403). An organometallic compound such as silane coupling agents and a silane coupling agent containing a specific fluorine-containing hydrocarbon group may be cured by a condensation reaction in the presence of a catalyst (for example, compounds as described in JP-A-58-142958, JP-A-58-147483, JP-A-58-147484, JP-A-9-157582, JP-A-11-106704, JP-A-2000-117902, JP-A-2001-48590, and JP-A-2002-53804).

In the low refractive index layer, a filler (for example, a low refractive index inorganic compound having an average primary particle size of from 1 to 150 nm such as silicon dioxide (silica) and fluorine-containing particles (for example, magnesium fluoride, potassium fluoride, and barium fluoride), and organic fine particles as described in JP-A-11-3820, paragraphs [0020] to [0038]), a silane coupling agent, a lubricant, a surfactant, and the like can be preferably contained as additives other than the foregoing compounds.

Though the low refractive index layer may be formed by a vapor phase method (for example, a vacuum vapor deposition method, a sputtering method, an ion plating method, and a plasma CVD method), it is preferable from the standpoint of cheap production costs that the low refractive index layer is formed by a coating method. As the coating method, a dip coating method, an air knife coating method, a curtain coating method, a roller coating method, a wire bar coating method, a gravure coating method, and a micro gravure method can be preferably employed.

The film thickness of the low refractive index layer is preferably from 30 to 200 nm, more preferably from 50 to 150 nm, and most preferably from 60 to 120 nm.
(Middle Refractive Index Layer and High Refractive Index Layer)

It is preferable that the middle refractive index layer and the high refractive index layer are each constructed by dispersing a high refractive index inorganic compound super-fine particle having an average particle size of not more than 100 nm in a matrix material. As the high refractive index inorganic compound superfine particle, an inorganic compound having a refractive index of 1.65 or more, such as oxides of Ti, Zn, Sb, Sn, Zr, Ce, Ta, La, In, etc. and composite oxides containing such a metal atom, can be preferably used.

Such a superfine particle can be used in an embodiment such as an embodiment of treating the particle surface with a surface treating agent (for example, silane coupling agents as described in JP-A-11-295503, JP-A-11-153703, and JP-A-2000-9908; and anionic compounds or organometallic coupling agents as described in JP-A-2001-310432), an embodiment of taking a core-shell structure using the high refractive index particle as a core (as described in JP-A-2000-166104), and an embodiment of jointly using a specific dispersant (as described in, for example, JP-A-11-153703, U.S. Pat. No. 6,210,858B1, and JP-A-2002-2776069).

As the matrix material, conventionally known thermoplastic resins and curable resin films and the like can be used. Polyfunctional materials as described in JP-A-2000-47004, JP-A-2001-315242, JP-A-2001-31871, JP-A-2001-296401, etc.; and curable films obtained from a metal alkoxide composition as described in JP-A-2001-293818, etc. can also be used.

The refractive index of the high refractive index layer is preferably from 1.70 to 2.20. The thickness of the high refractive index layer is preferably from 5 nm to 10 μm, and more preferably from 10 nm to 1 μm.

The refractive index of the middle refractive index is adjusted such that it is a value between the refractive index of the low refractive index layer and the refractive index of the high refractive index layer. The refractive index of the middle refractive index is preferably from 1.50 to 1.70.

The haze of the antireflection film is preferably not more than 5%, and more preferably not more 3%. Furthermore, the strength of the film is preferably H or more, more preferably 2H or more, and most preferably 3H or more by a pencil hardness test according to JIS K5400.
(4) Luminance Improving Film The polarizing plate of the invention can be used in combination with a luminance improving film. The luminance improving film has a function to separate circularly polarized light or linearly polarized light, is disposed between the polarizing plate and the backlight, and backwardly reflects or backwardly scatters the one-sided circularly polarized light or linearly polarized light. When the light having been again reflected from the backlight part partially changes the polarization state and comes again into the luminance improving film and the polarizing plate, it is partially transmitted. Thus, by repeating this process, the rate of use of light is improved, and the front luminance is improved by about 1.4 times. As the luminance improving film, an anisotropic reflection system and an anisotropic scattering system are known, and all of them can be combined with the polarizing plate of the invention.

With respect to the anisotropic reflection system, a luminance improving film in which a uniaxially stretched film and an unstretched film are laminated in a multiple manner to make a difference in the refractive index in the stretching direction large, thereby having anisotropy of the reflectance and transmittance is known. There are known a multilayered film system using the principle of a dielectric mirror (as described in WO 95/17691, WO 95/17692, and WO 95/17699) and a cholesteric liquid crystal system (as described in European Patent No. 606,940A2 and JP-A-8-271731). In the invention, DBEF-E, DBEF-D and DBEF-M (all of which are manufactured by 3M) can be preferably used as the luminance improving film of a multilayered system using the principle of a dielectric mirror, and NIPOCS (manufactured by Nitto Denko Corporation) can be preferably used as the luminance improving film of a cholesteric liquid crystal system. With respect to NIPOCS, *Nitto Giho*, Vol. 38, No. 1, May 2000, pages 19 to 21 and the like can be made herein by reference.

Furthermore, it is preferred to use the polarizing plate of the invention in combination with a luminance improving film of an anisotropic scattering system obtained by blending a positive intrinsic birefringent polymer and a negative intrinsic birefringent polymer and uniaxially stretching the blend as described in WO 97/32223, WO 97/32224, WO 97/32225, WO 97/32226, JP-A-9-274108, and JP-A-11-174231. As the luminance improving film of an anisotropic scattering system, DRPF-H (manufactured by 3M) is preferable.

It is preferable that the polarizing plate of the invention and the luminance improving film are used in an embodiment in which the both are stuck to each other via an adhesive or in an integrated body in which the one-sided protective film of the polarizing plate is made to serve as the luminance improving film.

(5) Other Functional Optical Film

It is also preferable that the polarizing plate of the invention is used in additional combination with a functional optical film provided with a hard coat layer, a forward scattering layer, an antiglare layer, a gas barrier layer, a lubricating layer, an antistatic layer, an undercoating layer, a protective layer, etc. Furthermore, it is also preferred to use such a functional layer mutually complexed with the antireflection layer in the foregoing antireflection film or the optically anisotropic layer or the like in the viewing angle compensating film within the same layer. Such a functional layer can be provided on either one surface or the both surfaces of the polarizer side and the opposite surface to the polarizer (the surface closer to the air side) and used.

(5-1) Hard Coat Layer

In order to impart a dynamic strength such as scratch resistance, it is preferably carried out that the polarizing plate of the invention is combined with a functional optical film having a hard coat layer provided on the surface of the transparent support. When the hard coat layer is applied to the foregoing antireflection film and used, it is especially preferred to provide the hard coat layer between the transparent support and the high refractive index layer.

It is preferable that the hard coat layer is formed by a crosslinking reaction of a curable compound by light and/or heat or a polymerization reaction. As a curable functional group, a photopolymerizable functional group is preferable, and as a hydrolyzable functional group-containing organometallic compound, an organic alkoxysilyl compound is preferable. As a specific constructional composition of the hard coat layer, ones described in, for example, JP-A-2002-144913, JP-A-2000-9908, and WO 0/46617 can be preferably used.

The film thickness of the hard coat layer is preferably from 0.2 to 100 μm.

The strength of the hard coat layer is preferably H or more, more preferably 2H or more, and most preferably 3H or more by a pencil hardness test according to JIS K5400. Furthermore, it is preferable that the amount of abrasion of a specimen before and after the test in the Taber test according to JIS K5400 is small as far as possible.

As a material for forming the hard coat layer, an ethylenically unsaturated group-containing compound and a ring opening polymerizable group-containing compound can be used. These compounds can be used alone or in combination. Preferred examples of the ethylenically unsaturated group-containing compound include polyacrylates of a polyol (for example, ethylene glycol diacrylate, trimethylolpropane triacrylate, ditrimethylolpropane tetraacrylate, pentaerythritol triacrylate, pentaerythritol tetraacrylate, dipentaerythritol pentaacrylate, and dipentaerythritol hexaacrylate); epoxy acrylates (for example, diacrylate of bisphenol A diglycidyl ether and diacrylate of hexanediol diglycidyl ether); and urethane acrylates obtained by a reaction of a polyisocyanate and a hydroxyl group-containing acrylate such as hydroxyethyl acrylate. Furthermore, EB-600, EB-40, EB-140, EB-1150, EB-1290K, IRR214, EB-2220, TMPTA, and TMPTMA (all of which are manufactured by Daicel-UCB Company, Ltd.); UV-630 and UV-1700B (all of which are manufactured by Nippon Synthetic Chemical Industry Co., Ltd.); and the like are enumerated as commercially available products.

Furthermore, preferred examples of the ring opening polymerizable group-containing compound include glycidyl ethers (for example, ethylene glycol diglycidyl ether, bisphenol A diglycidyl ether, trimethylolethane triglycidyl ether, trimethylolpropane triglycidyl ether, glycerol triglycidyl ether, triglycidyl trishydroxyethyl cyanurate, sorbitol tetraglycidyl ether, pentaerythritol tetraglycidyl ether, polyglycidyl ether of a cresol novolak resin, and polyglycidyl ether of a phenol novolak resin); alicyclic epoxys (for example, CELLOXIDE 2021P, CELLOXIDE 2081, EPOLEAD GT-301, EPOLEAD GT-401, and EHPE3150CE (all of which are manufactured by Daicel Chemical Industries, Ltd.), and polycyclohexyl epoxy methyl ether of a phenol novolak resin); and oxetanes (for example, OXT-121, OXT-221, OX-SQ, and PNOX-1009 (all of which are manufactured by Toagosei Co., Ltd.)). Besides, polymers of glycidyl(meth)acrylate or copolymers of glycidyl (meth)acrylate and a copolymerizable monomer can be used in the hard coat layer.

For the purposes of lowering hardening and shrinkage of the hard coat layer, improving adhesion to a base material, and lowering curl of a hard coat-treated article of the invention, it is preferably carried out that a crosslinked fine particle such as an oxide fine particle of silicon, titanium, zirconium, aluminum, etc. and an organic fine particle (for example, a crosslinked particles of polyethylene, polystyrene, a poly (meth)acrylic acid ester, polydimethylsiloxane, etc. and a crosslinked rubber fine particle of SBR, NBR, etc.) is added in the hard coat layer. The average particle size of such a crosslinked fine particle is preferably from 1 nm to 20,000 nm. Furthermore, the crosslinked fine particle is not particularly limited with respect to its shape, and examples of the shape include spherical, rod-like, acicular, and tabular shapes. The amount of addition of the fine particle is preferably not more than 60% by volume, and more preferably not more than 40% by volume of the hard coat layer after hardening.

In the case where the foregoing inorganic fine particle is added, since the inorganic fine particle is in general poor in compatibility with a binder polymer, it is preferably carried out that the inorganic fine particle is subjected to a surface treatment with a surface treating agent containing a metal such as silicon, aluminum, and titanium and having a functional group such as an alkoxide group, a carboxyl group, a sulfonic acid group, and a phosphonic acid group.

It is preferable that the hard coat layer is hardened using heat or active energy rays. Above all, it is more preferred to use active energy rays such as radiations, gamma rays, alpha rays, electron beams, and ultraviolet rays. Taking into account the stability and productivity, it is especially preferred to use electron beams or ultraviolet rays. In the case of performing hardening by heat, taking into account the heat resistance of the plastic itself, the heating temperature is preferably not higher than 140° C., and more preferably not higher than 100° C.

(5-2) Forward Scattering Layer

The forward scattering layer is used for improving the viewing angle characteristic in the up and down and right and left directions (hue and luminance distribution) in applying the polarizing plate of the invention in a liquid crystal display device. In the invention, a construction in which fine particles having a different refractive index are dispersed in a binder is preferable. For example, a construction in which a coefficient of forward scattering is specified as described in JP-A-11-38208; a construction in which a relative refractive index between a transparent resin and a fine particle is made to fall within a specified range as described in JP-A-2000-199809; and a construction in which the haze value is specified at 40% or more as described in JP-A-2002-107512 can be employed. For the purpose of controlling the viewing angle characteristic of haze, the polarizing plate of the invention can also be preferably combined with "LUMISTRY" as described on pages 31 to 39 of Technical Report *Photo-functional Films* of Sumitomo Chemical Co., Ltd. and used.

(5-3) Antiglare Layer

The antiglare layer is used for the purpose of scattering reflected light to prevent glare. An antiglare function is obtained by forming irregularities on the most superficial surface (display side) of the liquid crystal display device. The haze of an optical film having an antiglare function is preferably from 3 to 30%, more preferably from 5 to 20%, and most preferably from 7 to 20%.

As a method for forming irregularities on the film surface, for example, a method for adding a fine particle to form irregularities on the film surface (see, for example, JP-A-2000-271878); a method for adding a small amount (from 0.1 to 50% by mass) of a relatively large particle (particle size: 0.05 to 2 μm) to form a film having an irregular surface (see, for example, JP-A-2000-281410, JP-A-2000-95893, JP-A-2001-100004, and JP-A-2001-281407); a method for physically transferring an irregular shape onto the film surface (for example, an embossing method as described in JP-A-63-278839, JP-A-11-183710, and JP-A-2000-275401); and the like can be preferably employed.

(Liquid Crystal Display Device Using Polarizing Plate)

Next, a liquid crystal display device in which the polarizing plate of the invention is used will be described.

Figure 2:
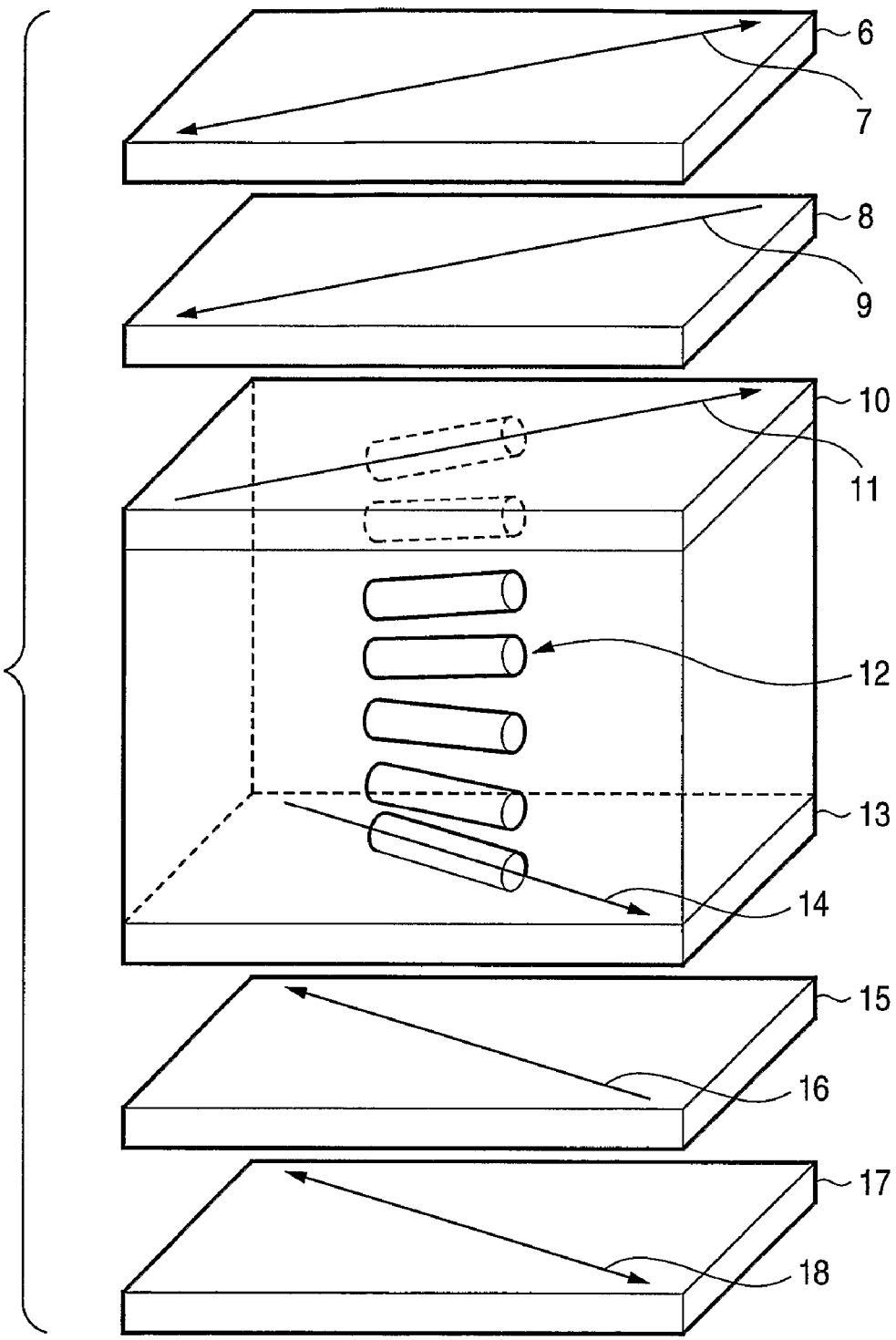
FIG. 2 is an example of a liquid crystal display in which the polarizing plate of the invention is used.

FIG. 2 is one example of a liquid crystal display device in which the polarizing plate of the invention is used.

The liquid crystal display device as illustrated in FIG. 2 has a liquid crystal cell (10 to 13) and an upper polarizing plate 6 and a lower polarizing plate 17 disposed so as to interpose the liquid crystal cell (10 to 13) therebetween. Though the polarizing plate is interposed by a polarizer and a pair of transparent protective films, in FIG. 2, the polarizing plate is shown as an integrated polarizing plate, and a detail structure is omitted. The liquid crystal cell is composed of a liquid crystal layer which is formed of an upper substrate 10 and a lower substrate 13 and a liquid crystal molecule 12 as interposed therebetween. The liquid crystal cell is classified into various display modes such as TN (twisted nematic), IPS (in-plane switching), OCB (optically compensatory band), VA (vertically aligned), and ECB (electrically controlled birefringence) modes depending upon a difference in the orientation state of the liquid crystal molecule which performs an ON/OFF display. The polarizing plate of the invention can be used in any display mode regardless of the transmission type or reflection type.

Among these display mode, OCB mode or VA mode is preferable.

An oriented film (not shown) is formed on the surface of each of the substrates 10 and 13 coming into contact with the liquid crystal molecule 12 (hereinafter sometimes referred to as "inner surface"), and the orientation of the liquid crystal molecule 12 in the state that no electrical field is applied or in the state that a low electrical field is applied is controlled by a rubbing treatment as applied on the oriented film or the like. Furthermore, a transparent electrode (not shown) capable of applying an electrical field to the liquid crystal layer composed of the liquid crystal molecule 12 is formed on the inner surface of each of the substrates 10 and 13.

Rubbing of a TN mode is applied in such a manner that the rubbing directions are crossed to each other on the upper and lower substrates, and the size of a tilt angle can be controlled by the strength and number of rubbing. The oriented film is formed by coating a polyimide film and then baking it. The size of a twist angle of the liquid crystal layer is determined by a crossing angle in the rubbing directions on the upper and lower substrates and a chiral agent to be added to a liquid crystal material. In order that the twist angle may become 90°, a chiral agent having a pitch of about 60 μm is added.

Incidentally, the twist angle is set up in the vicinity of 90° (from 85 to 950) in the case of monitors of notebook PC and PC and liquid crystal display devices for TV and is set up at from 0 to 70° in the case of use as a reflection type display device such as mobile telephones. Furthermore, in an IPS mode or ECB mode, the twist angle is 0°. In the IPS mode, an electrode is disposed only on the lower substrate 13, and an electrical field parallel to the substrate surface is applied. Moreover, in an OCB mode, a twist angle does not exist, and a tilt angle is made large; and in a VA mode, the liquid crystal molecule 12 orients vertically to the upper and lower substrates.

Here, the size of the product (Δnd) of the thickness (d) of the liquid crystal layer and the anisotropy (Δn) changes the brightness at the time of white display. For this reason, in order to obtain the maximum brightness, its range is set up at every display mode.

In general, by performing lamination so as to make a crossing angle between an absorption axis 7 of the upper polarizing plate 6 and an absorption axis 18 of the lower polarizing plate 17 substantially orthogonal, a high contrast is obtained. In the liquid crystal cell, a crossing angle between the absorption axis 7 of the upper polarizing plate 6 and the rubbing direction of the upper substrate 10 varies depending upon the liquid crystal display mode. In the TN mode and IPS mode, the crossing angle is generally set up either parallel or vertical. In the OCB mode and ECB mode, the crossing angle is often set up at 45°. However, for the purpose of adjusting the color tone of the display color or viewing angle, the optimum value is different in every display mode, and therefore, the crossing angle is not limited to the foregoing ranges.

The liquid crystal display device in which the polarizing plate of the invention is used is not limited to the construction as shown in FIG. 2 but may contain other members. For example, a color filter may be disposed between the liquid crystal cell and the polarizer. Furthermore, viewing angle enlarging filters 8 and 15 as described previously can be separately disposed between the liquid crystal cell and the polarizing plate. The polarizing plates 6 and 17 and the viewing angle enlarging films 8 and 15 may be disposed in a laminated state as stuck with an adhesive or may be disposed as a so-called integrated elliptical polarizing plate in which the one-sided protective film in the side of the liquid crystal cell is used for enlarging the viewing angle.

Furthermore, in the case where the liquid crystal display device in which the polarizing plate of the invention is used as a transmission type, a cold cathode or hot cathode fluorescent tube, or a backlight using, as a light source, a luminescent diode, a field emission element, or an electroluminescent element can be disposed in the back side. Moreover, the liquid crystal display device in which the polarizing plate of the invention is used may be of, a reflection type. In such case, only one polarizing plate may be disposed in the viewing side, and a reflection film is disposed in the back side of the liquid crystal cell or on the inner surface of the lower substrate of the liquid crystal cell. As a matter of course, a front light using the foregoing light source may be provided in the viewing side of the liquid crystal cell.

EXAMPLE

The invention will be described with reference to Examples and Synthesis Examples, but the invention is not limited thereto.
[Synthesis of Retardation Raising Agent]

Synthesis Example 1

Synthesis of Exemplified Compound (A-1)

A reaction vessel equipped with a stirrer, a material feeder, a reflux condenser and a thermometer having a capacity of 1,000 ml was charged with 40.1 g (189 mmol) of 2,4,5-trimethoxybenzoic acid, 16.75 g (90 mmol) of 4,4'-dihydroxy-biphenyl, 200 ml of toluene, and 2 ml of dimethylformamide, and the reaction mixture was heated at 70° C. After that, 23.6 g (198 mmol) of thionyl chloride was slowly dropwise added thereto, and the mixture was heated at 70° C. for 2.5 hours with stirring. Thereafter, the reaction solution was cooled to room temperature, and 300 ml of methanol was added. A crystal precipitated was recovered by filtration to thereby obtain 48.4 g (yield: 94%) of a compound of the object as a white crystal. Incidentally, the compound was identified by $^1$H-NMR (400 MHz).
$^1$H-NMR (CDCl$_3$): δ3.93 (s, 6H), 3.95 (s, 6H), 3.99 (s, 6H), 6.58 (s, 2H), 7.28 (d, 4H), 7.62 (m, 6H)
The resulting compound had a melting point of from 227 to 229° C.

Synthesis Example 2

Synthesis of Exemplified Compound (A-2)

The same reaction vessel as used in Synthesis Example 1 was charged with 34 g (160 mmol) of 2,4,5-trimethoxybenzoic acid, 15 g (73 mmol) of 4,4'-dihydroxy-3-fluorobiphenyl, 110 ml of toluene, and 1.6 ml of dimethylformamide, and the reaction mixture was heated at 70° C. After that, 20.9 g (176 mmol) of thionyl chloride was slowly dropwise added thereto, and the mixture was heated at 70° C. for 2.5 hours with stirring. Thereafter, the reaction solution was cooled to room temperature, and 300 ml of methanol was added. A crystal precipitated was recovered by filtration to thereby obtain 37 g (yield: 86%) of a compound of the object as a white crystal. Incidentally, the compound was identified by $^1$H-NMR (400 MHz).
$^1$H-NMR (CDCl$_3$): δ3.93 (s, 6H), 3.95 (s, 6H), 4.00 (s, 6H), 6.59 (s, 2H), 7.26-7.45 (m, 5H), 7.63 (m, 4H)
The resulting compound had a melting point of from 197 to 199° C.

Synthesis Example 3

Synthesis of Exemplified Compound (A-3)

The same reaction vessel as used in Synthesis Example 1 was charged with 23.3 g (110 mmol) of 2,4,5-trimethoxybenzoic acid, 15 g (50 mmol) of 4,4'-dihydroxy-3-chlorobiphenyl, 75 ml of toluene, and 1.1 ml of dimethylformamide, and the reaction mixture was heated at 70° C. After that, 14.4 g (121 mmol) of thionyl chloride was slowly dropwise added thereto, and the mixture was heated at 80° C. for 2.5 hours with stirring. Thereafter, the reaction solution was cooled to room temperature, and 250 ml of methanol was added. A crystal precipitated was recovered by filtration to thereby obtain 26 g (yield: 85%) of a compound of the object as a white crystal. Incidentally, the compound was identified by $^1$H-NMR (400 MHz).
$^1$H-NMR (CDCl$_3$): δ3.90-4.00 (m, 18H), 6.59 (s, 2H), 7.26-7.70 (m, 9H)
The resulting compound had a melting point of from 168 to 170° C.

Synthesis Example 4

Synthesis of Exemplified Compound (A-4)

The same reaction vessel as used in Synthesis Example 1 was charged with 30.3 g (143 mmol) of 2,4,5-trimethoxybenzoic acid, 15 g (65 mmol) of 4,4'-dihydroxy-3-methylbiphenyl, 100 ml of toluene, and 1.4 ml of dimethylformamide, and the reaction mixture was heated at 70° C. After that, 18.7 g (157 mmol) of thionyl chloride was slowly dropwise added thereto, and the mixture was heated at 70° C. for 2.5 hours with stirring. Thereafter, the reaction solution was cooled to room temperature, and 300 ml of methanol was added. A crystal precipitated was recovered by filtration to thereby obtain 27.4 g (yield: 72%) of a compound of the object as a white crystal. Incidentally, the compound was identified by $^1$H-NMR (400 MHz).
$^1$H-NMR (CDCl$_3$): δ2.31 (s, 3H), 3.95 (s, 6H), 4.00 (s, 6H), 6.60 (s, 2H), 7.10 (m, 2H), 7.27 (m, 3H), 7.40 (m, 2H), 7.63 (d, 2H)
Mass spectrum: m/z 589 (M+H)$^+$
The resulting compound had a melting point of from 188 to 189° C.

Synthesis Example 5

Synthesis of Exemplified Compound (A-6)

The same reaction vessel as used in Synthesis Example 1 was charged with 5.72 g (26.9 mmol) of 2,4,5-trimethoxybenzoic acid, 3.5 g (27 mmol) of diisopropylethylamine, and 20 ml of tetrahydrofuran, and the reaction mixture was cooled with ice water. After that, 3.1 g (27 mmol) of methanesulfonyl chloride was slowly dropwise added thereto, after dropwise addition the mixture was stirred at room temperature for 2 hours, and then cooled with ice water. A solution containing 2.9 g (13.7 mmol) of bis(4-hydroxyphenyl)acetylene and 3.5 g (27 mmol) of diisopropylethylamine having been dissolved in 40 ml of tetrahydrofuran prepared in advance was slowly dropwise added to the reaction solution. After completion of the dropwise addition, the reaction solution was stirred at room temperature for 3 hours and at 50° C. for 1 hour. Thereafter, 160 ml of water was added thereto. The obtained crystal was recovered by filtration and recrystallized with 100 ml of methanol. A crystal precipitated was recovered by filtration to thereby obtain 3.0 g (yield: 19%) of a compound of the object as a white crystal. Incidentally, the compound was identified by $^1$H-NMR (400 MHz) and mass spectrum analysis.

¹H-NMR (CDCl₃): δ3.93 (s, 6H), 3.95 (s, 6H), 3.99 (s, 6H), 6.57 (s, 2H), 7.24 (m, 4H), 7.58 (m, 6H)

Mass spectrum: m/z 599 (M+H)⁺

The resulting compound had a melting point of from 201 to 203° C.

Synthesis Example 6

Synthesis of Exemplified Compound (A-7)

(6-1) Synthesis of 2,4,5-trimethoxybenzoic acid-4-ethynyl anilide

The same reaction vessel as used in Synthesis Example 1 was charged with 21.2 g (100 mmol) of 2,4,5-trimethoxybenzoic acid, 12.9 g (100 mmol) of diisopropylethylamine, and 126 ml of tetrahydrofuran, and the reaction mixture was cooled with ice water. After that, 11.4 g (100 mmol) of methanesulfonyl chloride was slowly dropwise added thereto, after dropwise addition the mixture was stirred at room temperature for 2 hours, and then cooled with ice water. A solution containing 11.7 g (100 mmol) of 4-ethylaniline and 12.9 g (100 mmol) of diisopropylethylamine having been dissolved in 42 ml of tetrahydrofuran prepared in advance was slowly dropwise added to the reaction solution. After completion of the dropwise addition, the reaction solution was stirred at room temperature for 6 hours. Thereafter, 200 ml of ethyl acetate was added, and the organic phase was washed with water, an aqueous solution of saturated sodium bicarbonate, a 0.5 mol/liter hydrochloric acid aqueous solution, and saturated brine in this order. Sodium sulfate was added to the organic phase, and the reaction mixture was subjected to dehydration. The sodium sulfate was filtered out, and the organic solvent was distilled off under reduced pressure. In the next place, 350 ml of methanol was added, and the mixture was recrystallized. A crystal precipitated was recovered by filtration to thereby obtain 15.0 g (yield: 48%) of a compound of the object as a white crystal.

(6-2) Synthesis of Exemplified Compound (A-7)

The same reaction vessel as used in Synthesis Example 1 was charged with 3.1 g (10 mmol) of 2,4,5-trimethoxybenzoic acid-4-ethynyl anilide obtained in the above step (6-1), 4.1 g (10 mmol) of 2,4,5-trimethoxybenzoic-4-iodophenyl, 5.56 ml (40 mmol) of triethylamine, and 15 ml of tetrahydrofuran, and the reaction solution was stirred at room temperature in a nitrogen atmosphere. After that, 22.8 mg (0.12 mmol) of cuprous chloride, 131 mg (0.5 mmol) of triphenylphosphine, and 70 mg (0.1 mmol) of (triphenylphosphine)palladium dichloride were added, and the mixture was stirred at 60° C. for 3 hours with heating. The reaction solution was then cooled to room temperature and 200 ml of water was added. The obtained crystal was filtered and recrystallized with 100 ml of methanol to thereby obtain 5.6 g (yield: 94%) of a compound of the object as a pale yellow crystal. Incidentally, the compound was identified by ¹H-NMR (400 MHz).

¹H-NMR (DMSO-d₆): δ3.92 (s, 3H), 3.93 (s, 3H), 4.05 (m, 9H), 4.15 (s, 3H), 6.96 (br, 2H), 7.46 (d, 2H), 7.55 (s, 1H), 7.62 (s, 1H), 7.69 (d, 2H), 7.76 (d, 2H), 7.98 (d, 2H), 10.30 (s, 1H)

The resulting compound had a melting point of from 216 to 218° C.

[Preparation of Cellulose Acylate Film]

Example 1-1

Preparation of Cellulose Acylate Film (CAF 1)

[Preparation of Cellulose Acylate Solution]

The following composition was put into a mixing tank and stirred to dissolve each component, whereby a cellulose acylate solution was prepared.

Composition of Cellulose Acylate Solution:

| | |
|---|---|
| Cellulose acetate (CA-1) degree of acetylation: 2.8 | 100.0 mass parts |
| Plasticizer: triphenyl phosphate | 6.0 mass parts |
| Plasticizer: biphenyl phosphate | 3.0 mass parts |
| Methylene chloride (first soln.) | 402.0 mass parts |
| Methanol (second soln.) | 60.0 mass parts |

Preparation of Matting Agent Solution:

The following composition was put into a disperser and stirred to dissolve each component, whereby a matting agent solution was prepared.

Composition of Matting Agent Solution:

| | |
|---|---|
| Silica particles having an average particle size of 20 nm "AEROSIL R972", manufactured by Nippon Aerosil Co., Ltd. | 2.0 mass parts |
| Methylene chloride (first soln.) | 75.0 mass parts |
| Methanol (second soln.) | 12.7 mass parts |
| Cellulose acylate solution | 10.3 mass parts |

[Preparation of Retardation Raising Agent Solution]

The following composition was put into a mixing tank and stirred to dissolve each component with heating, whereby a retardation raising agent solution was prepared.

Composition of Retardation Raising Agent Solution:

| | |
|---|---|
| Retardation raising agent (A-1) | 20.0 mass parts |
| Methylene chloride (first soln.) | 58.4 mass parts |
| Methanol (second soln.) | 8.7 mass parts |
| Cellulose acylate solution | 12.8 mass parts |

After filtering 94.3 mass parts of the above cellulose acylate solution, 1.3 mass parts of the matting agent solution, and 4.4 mass parts of the retardation raising agent solution, the components were mixed and cast with a band casting machine. The obtained web with a residual solvent content of 35 mass % was released from the band and laterally stretched to an extent of 25% of the stretching magnification at 140° C. with a tenter at a stretching rate of 30%/min, and to an extent of 23% of the stretching magnification, and then retained at 140° C. for 30 seconds. Subsequently, clips were eliminated, and the resulting film was dried at 140° C. for 40 minutes to produce a cellulose acylate film (CAF 1). The resulting cellulose acylate film had a residual solvent content of 0.2 mass % and a film thickness of 80 μm.

Examples 1-2 To 1-15 and Comparative Examples 1-1 and 1-2

Preparation of Cellulose Acylate Films (CAF 2 to 15 and CAFR 1 and 2)

Cellulose acylate films CAF 2 to 15 and CAFR 1 and 2 were prepared in the same manner as in Example 1-1 except that the kind of cellulose acylate, the kind and addition amount of retardation raising agent, stretching magnification, stretching rate, stretching magnification and time in the relaxation process were changed as shown in Table 2 below.

TABLE 2

Cellulose Acylate Film

| Example No. | Film No. | Kind of Cellulose Acylate | Retardation Raising Agent Kind | Addition Amount* (mass %) | Maximum Stretching Magnification (%) | Stretching Rate (%/min) | Relaxation Process Stretching Magnification (%) | Ratio to Maximum Stretching Magnification (%) | Time (sec) |
|---|---|---|---|---|---|---|---|---|---|
| Ex. 1-1 | CAF 1 | CA-1 | A-1 | 5.3 | 25 | 30 | 23 | 92 | 30 |
| Ex. 1-2 | CAF 2 | CA-1 | B-1 | 4.2 | 10 | 40 | 9 | 90 | 25 |
| Ex. 1-3 | CAF 3 | CA-1 | A-4 | 4.8 | 32 | 50 | 28 | 88 | 15 |
| Ex. 1-4 | CAF 4 | CA-1 | A-1/A-7 | 2.4/2.5 | 26 | 60 | 24 | 92 | 40 |
| Ex. 1-5 | CAF 5 | CA-2 | A-1/A-7 | 2.0/2.5 | 37 | 20 | 34 | 92 | 50 |
| Ex. 1-6 | CAF 6 | CA-3 | A-1/A-7 | 2.0/2.5 | 55 | 60 | 45 | 82 | 45 |
| Ex. 1-7 | CAF 7 | CA-4 | A-1 | 2.5 | 23 | 10 | 18 | 78 | 25 |
| Ex. 1-8 | CAF 8 | CA-2 | A-7 | 2.7 | 34 | 30 | 30 | 88 | 35 |
| Ex. 1-9 | CAF 9 | CA-1 | A-1/B-1 | 1.2/4.2 | 8 | 10 | 7 | 88 | 15 |
| Ex. 1-10 | CAF 10 | CA-1 | A-1 | 5.3 | 25 | 120 | 23 | 92 | 30 |
| Ex. 1-11 | CAF 11 | CA-1 | A-1 | 5.3 | 25 | 30 | 25 | 100 | 5 |
| Ex. 1-12 | CAF 12 | CA-1 | A-1 | 5.3 | 25 | 120 | 25 | 100 | 5 |
| Ex. 1-13 | CAF 13 | CA-1 | A-1/A-7 | 4.0/4.5 | 25 | 30 | 23 | 91 | 30 |
| Ex. 1-14 | CAF 14 | CA-1 | A106 | 2.4 | 25 | 30 | 23 | 92 | 30 |
| Ex. 1-15 | CAF 15 | CA-1 | Exemplary Cpd. (15) | 1.8 | 25 | 30 | 23 | 92 | 30 |
| Comp. Ex. 1-1 | CAFR 1 | CA-5 | Cpd. (I-2)*2 | 8.5 | 25 | 30 | 23 | 92 | 30 |
| Comp. Ex. 1-2 | CAFR 2 | CA-2 | Cpd. (10)*3 | 5.1 | 25 | 30 | 23 | 92 | 30 |

Addition Amount* Mass % based on the cellulose acylate

The details of the cellulose acylate and the retardation raising agent in Table 2 are shown in detail in Table 3 below. The distance between terminals of a molecule and polarizability anisotropy of a retardation raising agent were measured in the following manner.

[Distance Between Terminals of Molecule and Polarizability Anisotropy]

The distance between terminals of a molecule and polarizability anisotropy were computed with "Gaussian 03" (Rev. B. 03) (a software, manufactured by Gaussian, U.S.A.). The distance between terminals were computed as the distance between the remotest atoms after the structural optimization by the computation of B3LYP/6-3 IG*level. The polarizability anisotropy was obtained by computing the polarizability by the computation of the polarizability by B3LYP/6-311+G** using the optimized structure by B3LYP/6-3IG* level, and computed from the diagonal element after the obtained polarizability tensor was made diagonal.

TABLE 3

Cellulose Acylate

| No. | Degree of Acyl Substitution | Degree of Acetylation | Degree of Propionylation | Degree of Butyrylation |
|---|---|---|---|---|
| CA-1 | 2.80 | 2.80 | — | — |
| CA-2 | 2.70 | 1.80 | 0.9 | — |
| CA-3 | 2.40 | 1.80 | — | 0.6 |
| CA-4 | 2.86 | 2.86 | — | — |
| CA-5 | 2.87 | 2.87 | — | — |

TABLE 3-continued

Regardation Raising Agent

| No. | Distance between Terminals of Molecule | Rod-Like Polarizability Anisotropy ($\times 10^{-25}$ cm$^3$) | Plane Polarizability Anisotropy ($\times 10^{-25}$ cm$^3$) |
|---|---|---|---|
| A-1 | 2.62 | 404 | 301 |
| A-4 | 2.63 | 382 | 299 |
| A-7 | 2.89 | 642 | 441 |
| B-1 | 2.03 | 392 | 784 |
| A-106 | 46.1 | 1158 | 865 |
| Exemplary Cpd. (15) | 49.6 | 1387 | 1123 |
| Cpd. (1-2)*2 | 1.64 | 171 | 316 |
| Cpd. (10)*3 | 2.93 | 266 | 162 | exemplified compound (I-2) in JP-A-2003-344655 and exemplified compound (10) in JP-A-2002-363343 respectively, and having the structures shown below.

In the above Tables 2 and 3, exemplary compound (15) is exemplary compound (15) described in Table 1 above.

Compound (1-2) (exemplified in JP-A-2003-344655)

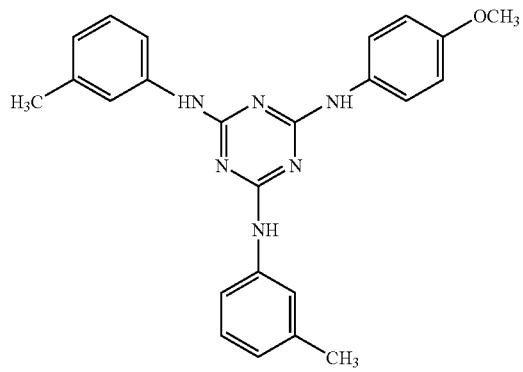

Compound (10) (exemplified in JP-A-2002-363343)

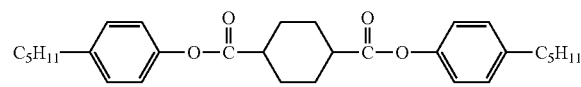

[Measurement of Optical Characteristics of Film]

Measurement was performed by using a birefringence meter "KOBRA 21ADH" (manufactured by Oji Scientific Instruments) at 25° C., 60% RH, and Re and Rth were measured at 11 points in the cross direction. The wavelength at measurement was 590 nm.

[Bleed-Out of Retardation Raising Agent]

Bleed-out of retardation raising agent was evaluated according to the following criteria.

A: Bleed-out did not occur at all throughout the film.

B: The area where bleed-out occurred accounted for less than 2% as area ratio.

C: The area where bleed-out occurred accounted for 2% or more and less than 5% as area ratio.

D: The area where bleed-out occurred accounted for 5% or more as area ratio.

The results of evaluations of prepared cellulose acylate films are shown in Table 4 below.

TABLE 4

| | | Retardation Value | | | | | |
| | | Central Area in the Cross Direction | | Standard Deviation of 11 Points in the Cross Direction | | Rth/Re Ratio at Central | |
| Example No. | Film No. | Re (nm) | Rth (nm) | Re (nm) | Rth (nm) | Area in the Cross Direction | Bleed-Out |
|---|---|---|---|---|---|---|---|
| Ex. 1-1 | 1 | 88 | 200 | 3.2 | 8 | 2.3 | B |
| Ex. 1-2 | 2 | 45 | 245 | 1.6 | 5 | 5.4 | C |
| Ex. 1-3 | 3 | 76 | 185 | 2.9 | 7 | 2.4 | B |
| Ex. 1-4 | 4 | 75 | 235 | 2.4 | 6 | 3.1 | B |
| Ex. 1-5 | 5 | 94 | 185 | 2.7 | 7 | 2.0 | B |
| Ex. 1-6 | 6 | 102 | 174 | 4.0 | 8 | 1.7 | B |
| Ex. 1-7 | 7 | 40 | 140 | 2.2 | 5 | 3.5 | B |
| Ex. 1-8 | 8 | 52 | 130 | 3.0 | 7 | 2.5 | B |
| Ex. 1-9 | 9 | 42 | 255 | 2.0 | 6 | 6.1 | A |
| Ex. 1-10 | 10 | 73 | 182 | 5.2 | 12 | 2.5 | B |
| Ex. 1-11 | 11 | 85 | 198 | 6.9 | 14 | 2.3 | B |
| Ex. 1-12 | 12 | 74 | 181 | 7.1 | 15 | 2.4 | B |
| Ex. 1-13 | 13 | 120 | 267 | 5.8 | 10 | 2.2 | B |
| Ex. 1-14 | 13 | 75 | 193 | 2.8 | 8 | 2.6 | B |
| Ex. 1-15 | 14 | 72 | 191 | 2.7 | 8 | 2.7 | B |
| Comp. Ex. 1-1 | 14 | 51 | 225 | 5.4 | 10 | 4.4 | D |
| Comp. Ex. 1-2 | 15 | 45 | 150 | 5.3 | 11 | 3.3 | D |

From the results in Table 4, it can be seen that the cellulose acylate films CAF 1 to 15 of the invention are high in the exhibition of retardation and little in bleed-out. Further, cellulose acylate films CAF 1 to 9, 14 and 15, prepared with specific ranges of stretching magnification, magnification rate and time, are little in the in-plane fluctuation as compared with CAF 10 to 13. In addition, by mixing a retardation raising agent having rod-like polarizability anisotropy of from $300 \times 10^{-25}$ cm$^3$ to $2,000 \times 10^{-25}$ cm$^3$ and the distance between terminals of a molecule of from 2 to 10 nm with a retardation raising agent having plane polarizability anisotropy of from $300 \times 10^{-25}$ cm$^3$ to $1,500 \times 10^{-25}$ cm$^3$ and the distance between terminals of a molecule of from 2 to 10 nm, bleed-out can be further effectively restrained (CAF 9).

[Preparation of Polarizing Plate]

Example 11-1

Saponification Treatment of Cellulose Acylate Film

The cellulose acylate film prepared in Example 1-1 (CAF 1) was immersed in a 1.3 mol/liter sodium hydroxide aqueous solution at 55° C. for 2 minutes, washed in a water-washing bath at room temperature, then neutralized with a 0.05 mol/liter sulfuric acid at 30° C., washed again in a water-washing bath at room temperature, and dried with hot air at 100° C. The surface of the cellulose acylate film (CAF 1) was thus saponified.

A commercially available cellulose triacetate film (FUJITAC TD80UF, manufactured by Fuji Photo Film Co., Ltd.) was saponified on the same condition and offered to the preparation of the following polarizing plate samples.

[Preparation of Polarizing Plate]

Iodine was absorbed onto a stretched polyvinyl alcohol film to prepare a polarizer. The cellulose acylate film (CAF 1) was stuck on one side of the polarizer using a polyvinyl alcohol based adhesive. The transmission axis of the polarizer and the slow axis of the cellulose acylate film were disposed parallel to each other.

In addition, FUJITAC TD80UF having been subjected to saponification treatment was stuck on the opposite side of the polarizer using a polyvinyl alcohol based adhesive.

There was thus prepared a polarizing plate (P 1-1).

Examples 11-2 To 11-15 and Comparative Examples 11-1 and 11-2

Polarizing plates (P 1-2 to 1-15) and (PR 1-1 and 1-2) were prepared in the same manner as above for cellulose acylate film (CAF 2 to 15) and (CAFR 1 and 2). The structures of the thus obtained polarizing plates are shown in Table 5 below.

TABLE 5

| Example No. | Polarizing Plate | Protective Film 1 Cellulose Acylate Film Preparation | Protective No. | Protective Film 2* |
|---|---|---|---|---|
| Example 11-1 | P1-1 | Example 1-1 | CAF 1 | "TD80UF" |
| Example 11-2 | P1-2 | Example 1-2 | CAF 2 | "TD80UF" |
| Example 11-3 | P1-3 | Example 1-3 | CAF 3 | "TD80UF" |
| Example 11-4 | P1-4 | Example 1-4 | CAP 4 | "TD80UF" |
| Example 11-5 | P1-5 | Example 1-5 | CAF 5 | "TD80UF" |
| Example 11-6 | P1-6 | Example 1-6 | CAF 6 | "TD80UF" |
| Example 11-7 | P1-7 | Example 1-7 | CAF 7 | "TD80UF" |
| Example 11-8 | P1-8 | Example 1-8 | CAF 8 | "TD80UF" |
| Example 11-9 | P1-9 | Example 1-9 | CAF 9 | "TD80UF" |
| Example 11-10 | P1-10 | Example 1-10 | CAF 10 | "TD80UF" |
| Example 11-11 | P1-11 | Example 1-11 | CAF 11 | "TD80UF" |
| Example 11-12 | P1-12 | Example 1-12 | CAF 12 | "TD80UF" |
| Comparative Example 11-1 | PR1-1 | Comparative Example 1-1 | CARF 1 | "TD80UF" |
| Comparative Example 11-2 | PR1-2 | Comparative Example 1-2 | CARF 2 | "TD80UF" |

Protective film 2*: FUJITAC TD808F (manufactured by Fuji Photo Film Co., Ltd.)

Example 21-1

Preparation and Evaluation of VA Liquid Crystal Display 1

[Preparation of Liquid Crystal Cell]

One mass part of octadecyldimethylammonium chloride (coupling agent) was added to 100 mass parts of a 3 mass % polyvinyl alcohol aqueous solution. The solution was spin coated on a glass substrate with ITO electrode and subjected to treatment by heating at, 160° C. and then to rubbing treatment, whereby a vertical orientation film was formed. The rubbing treatment was performed in the opposite direction of two glass substrates. Two glass substrates were faced to each other so that the cell gap (d) reached 5 μm. Liquid crystal compound mainly comprising ester and ethane (Δn: 0.08) was poured into the cell gas to prepare a vertical orientation liquid crystal cell. The product of Δn and d was 400 nm.

The polarizing plate prepared in Example 11-7 (P1-7) was moisture-conditioned in advance at 25° C. 60% RH, and then packaged in a moisture-proof bag and allowed to stand for 3 days. The bag was composed of lamination of polyethylene terephthalate/aluminum/polyethylene, and moisture permeability of the bag was $1 \times 10^{-5}$ g/m$^2$·day or lower.

Polarizing plate 7 was taken out under the atmosphere of 25° C., 60% RH, and stuck on both sides of the above prepared vertical orientation liquid crystal cell with an adhesive sheet, whereby a liquid crystal display was prepared.

The thus-prepared liquid crystal display was evaluated in the same manner by the method described in [characteristics of polarizing plate]. The liquid crystal display using the polarizing plate (P1-7) in the invention was broad in the viewing angle of tint and preferred.

Example 21-2

Preparation and Evaluation of VA Liquid Crystal Display 2

A liquid crystal display in FIG. 3 was prepared. From the side of a viewer (upper side), an upper polarizing plate, a VA mode liquid crystal cell (an upper substrate, a liquid crystal layer, a lower substrate), a lower side polarizing plate were laminated, and further a backlight light source was disposed. In the following example, a commercially available polarizing plate "HLC2-5618" (manufactured by Sanritz Corporation) was used for the upper side polarizing plate and the polarizing plate of the invention was used for the lower side polarizing plate.

[Preparation of Liquid Crystal Cell]

A liquid crystal cell, having a cell gap of 3.6 μm, was prepared by dropwise pouring a liquid crystal material having minus dielectric constant anisotropy ("MLC 6608", manufactured by Merck Ltd., Japan) between the substrates and sealed to form a liquid crystal layer between the substrates. The retardation of the liquid crystal layer (that is, the product $\Delta n \cdot d$ of the thickness of the liquid crystal layer d ($\mu$m) and the refractive index anisotropy $\Delta n$) was made 300 nm. The liquid crystal material was vertically orientated.

A commercially available super high contrast product "HLC2-5618" (manufactured by Sanritz Corporation) was used for the upper side polarizing plate 30 of the liquid crystal display (FIG. 3) using vertical orientation liquid crystal cell, and the polarizing plate (P1-1) prepared in Example 11-1 for the lower side polarizing plate 32. The polarizing plate was stuck each one film on the viewer side and the backlight side of VA mode cell 31 with an adhesive so that cellulose acylate film of the invention (CAF 1) came to the liquid crystal cell side. The polarizing plates were disposed in the crossed Nicols configuration so that the transmitting axis of the polarizing plate on the viewer side became up and down directions and the transmitting axis of the polarizing plate on the backlight side became right and left directions.

It has been confirmed that the liquid crystal display using the polarizing plate of the invention is broad in the angle of visibility of contrast and has superior display grade.

Example 12

Preparation of Polarizing Plate

[Preparation of Optical Compensation Sheet]
(Saponification Treatment of Cellulose Acylate Film)

The composition shown below was coated on the cellulose acylate film prepared in Example 1-9 (CAF 9) in a coating amount of 5.2 ml/m$^2$, and dried at 60° C. for 10 seconds. The surface of the film was washed with flowing water for 10 seconds, and the surface of the film was dried by blowing air at 25° C.

| Composition of saponification solution: | |
|---|---|
| Isopropyl alcohol | 818 mass parts |
| Water | 167 mass parts |
| Propylene glycol | 187 mass parts |
| "EMALEX" (manufactured by Nihon Emulsion Co.) | 10 mass parts |
| Potassium hydroxide | 67 mass parts |

(Preparation of Orientation Film)
A coating solution having the composition shown below was coated on the cellulose acylate film (CAF 9) subjected to saponification treatment with a #14 wire bar coater in a coating amount of 24 ml/m$^2$. The coated layer was dried with hot air at 60° C. for 60 seconds, further with air at 90° C. for 150 seconds.

Subsequently, rubbing treatment was carried out on the prepared cellulose acylate film (CAF 9) in the direction of the angle of 45° against the stretching direction (almost coincide with the slow axis)

| Composition of orientation film: | |
|---|---|
| Modified polyvinyl alcohol having the structure shown below | 20 mass parts |
| Water | 360 mass parts |
| Methanol | 120 mass parts |
| Glutaraldehyde (crosslinking agent) | 1.0 mass part |

Modified Polyvinyl Alcohol

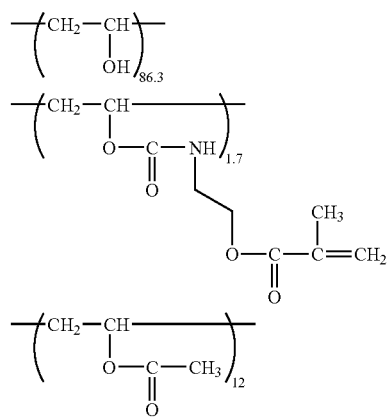

[Preparation of Optically Anisotropic Layer]
On the orientation film was coated a coating solution containing 214.2 mass parts of methyl ethyl ketone having dissolved therein 91 mass parts of dicotic compound having the structure shown below, 9 mass parts of ethylene oxide modified trimethylolpropane triacrylate "V#360" (manufactured by OSAKA ORGANIC CHEMICAL INDUSTRY LTD.), 1.5 mass parts of cellulose acetate butyrate "CAB 531-1" (manufactured by Eastman Chemical Japan Ltd.), 3 mass parts of a photo-polymerization initiator "Irgacure 907" manufactured by Ciba Geigy), and 1 mass part of a sensitizer "Kayacure DETX" (manufactured by Nippon Kayaku Co., Ltd.), with a #3 wire bar coater in a coating amount of 5.2 ml/m$^2$. The film was stretched on a metal frame, and heated in a thermostatic oven at 130° C. for 2 minutes to thereby orientate the discotic compound. Subsequently, the discotic compound was polymerized by UV irradiation for 1 minute with a high pressure mercury lamp at 90° C. at a dose of 120 W/cm. After that, the layer was allowed to be cooled until room temperature. An optically anisotropic layer was formed in this manner, thus an optical compensation sheet (WV2-2) was obtained.

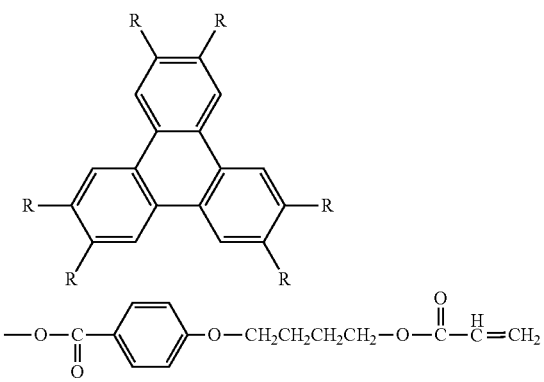

(Saponification Treatment of Optical Compensation Sheet)
Saponification treatment was carried out in the same manner as in Example 11-1.
[Preparation of Polarizing Plate]
(Preparation of Polarizer)
Iodine was absorbed onto a stretched polyvinyl alcohol film to prepare a polarizer. The cellulose acylate film (CAF 9)

side of the above prepared optical compensation sheet (WV2-2) was stuck on one side of the polarizer with a polyvinyl alcohol based adhesive, so that the slow axis of the cellulose acylate film (CAF 9) and the transmitting axis of the polarizer came to be parallel.

A commercially available cellulose triacetate film (FUJI-TAC TD80UF, manufactured by Fuji Photo Film Co., Ltd.) was subjected to saponification treatment in the same manner as in Example 11-1, and the film was stuck on the opposite side of the polarizer (the side on which the optical compensation sheet was not stuck) with a polyvinyl alcohol based adhesive. Thus, an ellipsoidal polarizing plate (P2-1) was formed.

Example 22

Preparation of Liquid Crystal Display

[Preparation of Liquid Crystal Cell of Bend Orientation]

A polyimide film was formed on a glass substrate with an ITO electrode as an orientation film and the orientation film was subjected to rubbing treatment. The obtained two glass substrates were arranged so as to face to each other and cell gas was set at 5.7 μm. A liquid crystal compound "ZLI 1132" (manufactured by Merck Ltd., Japan) having Δn of 0.1396 was poured into the cell gap to thereby prepare a liquid crystal cell of bend orientation.

[Preparation Of Liquid Crystal Display]

Two ellipsoidal polarizing plates (P2-1) were stuck with the prepared liquid crystal cell of bend orientation between. The optically anisotropic layer of the polarizing plate was arranged to face the cell substrate, and the direction of rubbing of the liquid crystal cell and the direction of rubbing of the optically anisotropic layer facing the liquid crystal cell were disposed to be anti-parallel.

It has been confirmed that the liquid crystal display using the polarizing plate of the invention is broad in the angle of visibility of contrast, is accompanied by little point defect, and shows preferred images.

INDUSTRIAL APPLICABILITY

The invention can provide a cellulose acylate film free from the occurrence of facial failure such as bleed-out and having desired retardation. Further, the invention can provide a liquid crystal display having high angle of visibility and high grade display by using a polarizing plate comprising the cellulose acylate film of the invention in the liquid crystal display.

The entire disclosure of each and every foreign patent application from which the benefit of foreign priority has been claimed in the present application is incorporated herein by reference, as if fully set forth.

The invention claimed is:

1. A cellulose acylate film comprising:
a cellulose acylate;
at least one first retardation raising agent in an amount of from 0.1 to 30 mass % based on the cellulose acylate; and
at least one second retardation raising agent in an amount of from 0.1 to 30 mass % based on the cellulose acylate,
wherein the at least one first retardation raising agent has a rod-like polarizability anisotropy represented by expression (1) of from $300 \times 10^{-25}$ cm$^3$ to $2,000 \times 10^{-25}$ cm$^3$, and a distance between terminals of a molecule of from 2 to 10 nm; and the at least one second retardation raising agent has a plane polarizability anisotropy represented by expression (2) of from $300 \times 10^{-25}$ cm$^3$ to $1,500 \times 10^{-25}$ cm$^3$, and a distance between terminals of a molecule of from 2 to 10 nm:

$$\Delta\alpha = \alpha - (\alpha y + \alpha z)/2 \qquad \text{Expression (1):}$$

$$\Delta\alpha = (\alpha x + \alpha y)/2 - \alpha z \qquad \text{Expression (2):}$$

wherein αx is the largest constituent of characteristic values obtained after a polarizability tensor is made diagonal; αy is the constituent next to the largest constituent of characteristic values obtained after a polarizability tensor is made diagonal; and αz is the smallest constituent of characteristic values obtained after a polarizability tensor is made diagonal, wherein the at least one first retardation raising agent having a rod-like polarizability anisotropy represented by expression (1) of from $300 \times 10^{-25}$ cm$^3$ to $2,000 \times 10^{-25}$ cm$^3$ and a distance between terminals of a molecule of from 2 to 10 nm is a compound represented by formula (1):

$$Ar^1-L^1-X-L^2-Ar^2 \qquad \text{Formula (1):}$$

wherein $Ar^1$ and $Ar^2$ each independently represents an aryl group or an aromatic heterocyclic ring; $L^1$ and $L^2$ each independently represents —C(=O)O— or —C(=O)NR— where R represents a hydrogen atom or an alkyl group; and X represents formula (2) or (3):

Formula (2):

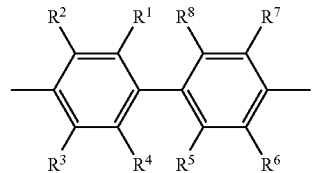

wherein $R^1$, $R^2$, $R^3$, $R^4$, $R^5$, $R^6$, $R^7$ and $R^8$ each independently represents a hydrogen atom or a substituent; and Formula (3):

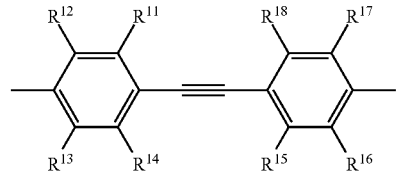

wherein $R^{11}$, $R^{12}$, $R^{13}$, $R^{14}$, $R^{15}$, $R^{16}$, $R^{17}$ and $R^{18}$ each independently represents a hydrogen atom or a substituent.

2. The cellulose acylate film according to claim 1, which has Re and Rth satisfying following relationships:

$$20 \leq Re \leq 200$$

$$70 \leq Rth \leq 400$$

$$1 \leq Rth/Re \leq 10$$

wherein Re represents an in-plane retardation at a wavelength of 590 nm; and Rth represents a retardation in a thickness direction at a wavelength of 590 nm.

3. A cellulose acylate film comprising:
a cellulose acylate;
at least one first retardation raising agent in an amount of from 0.1 to 30 mass % based on the cellulose acylate; and
at least one second retardation raising agent in an amount of from 0.1 to 30 mass % based on the cellulose acylate,
wherein the at least one first retardation raising agent has a rod-like polarizability anisotropy represented by expression (1) of from $300 \times 10^{-25}$ cm$^3$ to $2,000 \times 10^{-25}$ cm$^3$, and a distance between terminals of a molecule of from 2 to 10 nm; and the at least one second retardation raising agent has a plane polarizability anisotropy represented by expression (2) of from $300 \times 10^{-25}$ cm$^3$ to $1,500 \times 10^{-25}$ cm$^3$, and a distance between terminals of a molecule of from 2 to 10 nm:

$$\Delta\alpha = \alpha x - (\alpha y + \alpha z)/2 \quad \text{Expression (1)}$$

$$\Delta\alpha = (\alpha x + \alpha y)/2 - \alpha z \quad \text{Expression (2)}$$

wherein $\alpha x$ is the largest constituent of characteristic values obtained after a polarizability tensor is made diagonal; $\alpha y$ is the constituent next to the largest constituent of characteristic values obtained after a polarizability tensor is made diagonal; and $\alpha z$ is the smallest constituent of characteristic values obtained after a polarizability tensor is made diagonal,
wherein the at least one first retardation raising agent having a rod-like polarizability anisotropy represented by expression (1) of from $300 \times 10^{-25}$ cm$^3$ to $2,000 \times 10^{-25}$ cm$^3$ and a distance between terminals of a molecule of from 2 to 10 nm is a compound represented by formula (4):

Formula (4)

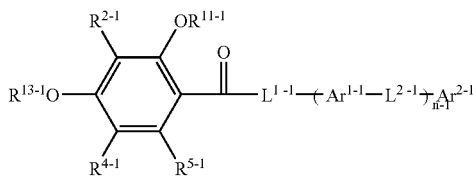

wherein $R^{2-1}$, $R^{4-1}$ and $R^{5-1}$ each independently represents a hydrogen atom or a substituent; $R^{11-1}$ and $R^{13-1}$ each independently represents a hydrogen atom or an alkyl group; $L^{1-1}$ and $L^{2-1}$ each independently represents a single bond or a divalent connecting group; $Ar^{1-1}$ represents an arylene group or an aromatic heterocyclic ring; $Ar^{2-1}$ represents an arylene group or an aromatic heterocyclic ring; n-1 represents an integer of at least 3; and $L^{2-1}$ and $Ar^{1-1}$, both existing in a number of n−1, may be the same or different; $R^{11-1}$ and $R^{13-1}$ are different from each other; and when $R^{13-1}$ represents the alkyl group, the alkyl group representing $R^{13-1}$ does not contain a hetero atom.

4. The cellulose acylate film according to claim 1,
wherein the at least one retardation raising agent having a plane polarizability anisotropy represented by expression (2) of from $300 \times 10^{-25}$ cm$^3$ to $1,500 \times 10^{-25}$ cm$^3$ and a distance between terminals of a molecule of from 2 to 10 nm is a compound represented by formula (6):

Formula (6):

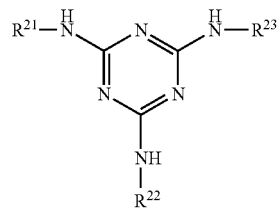

wherein $R^{21}$, $R^{22}$ and $R^{23}$ each independently represents an alkyl group, an alkenyl group, an aromatic ring group or a heterocyclic group.

5. A process for producing a cellulose acylate film according to claim 1, the process comprising:
stretching the cellulose acylate film at a stretching rate of 100% or less per a minute at a stretching magnification of from 3 to 200%; and
retaining the stretched cellulose acylate film at a stretching magnification of from 50 to 99% of the maximum stretching magnification for from 1 to 120 seconds.

6. The cellulose acylate film according to claim 1, which is produced by a process comprising:
stretching the cellulose acylate film at a stretching rate of 100% or less per a minute at a stretching magnification of from 3 to 200%; and
retaining the stretched cellulose acylate film at a stretching magnification of from 50 to 99% of the maximum stretching magnification for from 1 to 120 seconds.

7. A polarizing plate comprising:
a polarizer; and
at least two protective films disposed on both sides of the polarizer,
wherein at least one of the at least two protective films is a cellulose acylate film according to claim 1.

8. The polarizing plate according to claim 7, which further comprises an optically anisotropic layer on at least one side of the at least two protective films.

9. The polarizing plate according to claim 7,
wherein a retardation film is disposed on at least one side of the at least two protective films.

10. A liquid crystal display comprising:
a liquid crystal cell; and
two polarizing plates disposed on both sides of the liquid crystal cell,
wherein at least one of the two polarizing plates is a polarizing plate according to claim 7.

* * * * *

UNITED STATES PATENT AND TRADEMARK OFFICE
CERTIFICATE OF CORRECTION

| | | |
|---|---|---|
| PATENT NO. | : 8,017,199 B2 | Page 1 of 1 |
| APPLICATION NO. | : 11/666972 | |
| DATED | : September 6, 2011 | |
| INVENTOR(S) | : Nobutaka Fukagawa et al. | |

It is certified that error appears in the above-identified patent and that said Letters Patent is hereby corrected as shown below:

On the Title Page

Item (75) Inventors:   "Osamu Ochida" should read:   Osamu Uchida.

Signed and Sealed this
Twenty-eighth Day of February, 2012

David J. Kappos
*Director of the United States Patent and Trademark Office*